(12) United States Patent
Cochran et al.

(10) Patent No.: US 12,134,673 B2
(45) Date of Patent: Nov. 5, 2024

(54) THERMOPLASTIC POLYMERS SYNTHESIZED FROM DEPOLYMERIZED LIGNIN VIA FREE RADICAL POLYMERIZATION

(71) Applicant: Iowa State University Research Foundation, Inc., Ames, IA (US)

(72) Inventors: Eric W. Cochran, Ames, IA (US); Xianglan Bai, Ames, IA (US); Wangda Qu, Ames, IA (US); Yuerui Huang, Ames, IA (US); Yixin Luo, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

(21) Appl. No.: 18/413,501

(22) Filed: Jan. 16, 2024

(65) Prior Publication Data
US 2024/0199786 A1    Jun. 20, 2024

Related U.S. Application Data

(62) Division of application No. 16/779,018, filed on Jan. 31, 2020, now Pat. No. 11,912,805.
(Continued)

(51) Int. Cl.
*C08F 293/00* (2006.01)
*C01B 32/05* (2017.01)
(Continued)

(52) U.S. Cl.
CPC .......... *C08F 293/005* (2013.01); *C01B 32/05* (2017.08); *C08J 11/12* (2013.01);
(Continued)

(58) Field of Classification Search
CPC .............. C08F 293/005; C08F 2438/01; C08F 2438/03; C01B 32/05; C08J 11/12;
(Continued)

(56) References Cited

U.S. PATENT DOCUMENTS

| 11,912,805 B2 * | 2/2024 | Cochran | C01B 32/05 |
| 2017/0015775 A1 * | 1/2017 | Holmberg | C07C 69/54 |

(Continued)

OTHER PUBLICATIONS

Souto, et al., Lignin-based carbon fiber: a current overview, Mater. Res. Express 2018; 5: 072001, pp. 1-30 (Year: 2018).*
(Continued)

*Primary Examiner* — Daniel C. McCracken
(74) *Attorney, Agent, or Firm* — Troutman Pepper Hamilton Sanders LLP (Rochester)

(57) ABSTRACT

One aspect of the present application relates to a method of synthesizing a thermoplastic polymer. This method includes providing a depolymerized lignin product comprising monomers and oligomers and producing lignin (meth)acrylate monomers and oligomers from the depolymerized lignin product. A thermoplastic lignin (meth)acrylate polymer is then formed by free radical polymerization of the lignin (meth)acrylate monomers and oligomers. The present application also relates to a branched chain thermoplastic lignin (meth)acrylate polymer which includes a chain transfer agent. The thermoplastic lignin based polymers of the present application can be used to prepare carbon fibers, and engineering thermoplastics. Mixtures of lignin (meth)acrylate monomers and oligomers are also disclosed.

15 Claims, 21 Drawing Sheets

Related U.S. Application Data

(60) Provisional application No. 62/800,214, filed on Feb. 1, 2019.

(51) Int. Cl.
  *C08J 11/12* (2006.01)
  *D01F 9/12* (2006.01)
  *D01F 11/12* (2006.01)

(52) U.S. Cl.
  CPC .............. *D01F 9/12* (2013.01); *D01F 11/122* (2013.01); *D01F 11/125* (2013.01); *C08F 2438/01* (2013.01); *C08F 2438/03* (2013.01); *C08J 2397/02* (2013.01)

(58) Field of Classification Search
  CPC ....... C08J 2397/02; D01F 9/12; D01F 11/122; D01F 11/125; D01F 9/16; D01D 5/38
  See application file for complete search history.

(56) References Cited

U.S. PATENT DOCUMENTS

| | | | |
|---|---|---|---|
| 2019/0144590 A1* | 5/2019 | Epps, III | C09J 133/08 429/308 |
| 2020/0255572 A1 | 8/2020 | Cochran et al. | |

OTHER PUBLICATIONS

Fang, et al., Manufacture and application of lignin-based carbon fibers (LCFs) and lignin-based carbon nanofibers (LCNFs), Green Chem. 2017; 19: 1794-1827 (Year: 2017).*

Oligomer, accessed online at: https://en.wikipedia.org/wiki/Oligomer on Jan. 5, 2023 (Year: 2023).*

Holmberg, et al., RAFT polymerization and associated reactivity ratios of methacrylate-functionalized mixed bio-oil constitutents, Polym. Chem. 2015; 6: 5728-5739 (Year: 2015).*

Holmberg, et al., Softwood Lignin-Based Methacrylate Polymers with Tunable Thermal and Viscoelastic Properties, Macromolecules 2016; 49: 1286-1295 (Year: 2016).*

Holmberg, et al., Syringyl Methacrylate, a Hardwood Lignin-Based Monomer for High-Tg Polymeric Materials, ACS Macro Lett. 2016; 5: 574-578 (Year: 2016).*

Qu et al., "Controlled Radical Polymerization of Crude Lignin Bio-oil Containing Multihydroxyl Molecules for Methacrylate Polymers and the Potential Applications," ACS Sustainable Chem. Eng. 7:9050-9060 (2019).

Frank et al., "Carbon Fibers: Precursor Systems, Processing, Structure, and Properties," Angew. Chem. Int. Ed. 53 (21):5262-5298 (2014).

Baker et al., "On the Characterization and Spinning of an Organic-Purified Lignin Toward the Manufacture of Low-Cost Carbon Fiber," J. Appl. Polym. Sci. 124:227-234 (2012).

Baker et al., "Recent Advances in Low-Cost Carbon Fiber Manufacture from Lignin," J. Appl. Polym. Sci. 130 (2):713-728 (2013).

Fang et al., "Manufacture and Application of Lignin-Based Carbon Fibers (LCFs) and Lignin-Based Nanofibers (LCNFs)," Green Chem. 19:1794-1827 (2017).

Lebo et al., "Lignin," Kirk-Othmer Encyclopedia of Chemical Technology, Copyright John Wiley & Sons, Inc., 15:1-32 (2001).

Jenkins et al., "Glossary of Basic Terms in Polymer Science," Pure & Appl. Chem. 68(12):2287-2311 (1996).

Rodríguez-Olalde et al., "Simulation of Syngas Production from Lignin Using Guaiacol as a Model Compound," Energies, 8:6705-6714 (2015).

Wang, "Lignin Acrylate Derivatives and Their Behaviors in Free Radical Copolymerizations," Thesis submitted to the Faculty of the Virginia Polytechnic Institute and State University in partial fulfillment of the requirements for the degree of Master of Science, Sep. 1986. (Year: 1986).

Holmberg, et al., "RAFT Polymerization and Associated Reactivity Ratios of Methacrylate-Functionalized Mixed Bio-Oil Constitutents," Polym. Chem. 6:5728-5739 (2015).

Holmberg, et al., "Softwood Lignin-Based Methacrylate Polymers with Tunable Thermal and Viscoelastic Properties," Macromolecules 49:1286-1295 (2016).

Holmberg, et al., "Syringyl Methacrylate, a Hardwood Lignin-Based Monomer for High-Tg Polymeric Materials," ACS Macro Lett. 5:574-578 (2016).

* cited by examiner

R: OCH₃ or H

THERMOPLASTIC POLYMERS SYNTHESIZED FROM DEPOLYMERIZED LIGNIN VIA FREE RADICAL POLYMERIZATION

This application is a divisional of U.S. patent application Ser. No. 16/779,018, filed Jan. 31, 2020, which claims the priority benefit of U.S. Provisional Patent Application Ser. No. 62/800,214, filed Feb. 1, 2019, which are hereby incorporated by reference in their entirety.

This invention was made with government support under 2018-67021-27717 awarded by the United States Department of Agriculture, National Institute of Food and Agriculture. The government has certain rights in the invention.

FIELD OF THE APPLICATION

The present application relates to thermoplastic polymers synthesized from depolymerized lignin by free radical polymerization.

BACKGROUND OF THE APPLICATION

Lignin is the second most abundant biopolymer next to cellulose (Kai et al., "Towards Lignin-Based Functional Materials in a Sustainable World," *Green Chem.* 18(5):1175-1200 (2016)). Isolated lignin is abundantly available as byproduct from pulp and paper industry, as well as emerging biorefineries (Ragauskas et al., "Lignin Valorization: Improving Lignin Processing in the Biorefinery," *Science* 344(6185):1246843 (2014)). According to a Department of Energy report (Liu et al., "Processing, Structure, and Properties of Lignin- and CNT-Incorporated Polyacrylonitrile-Based Carbon Fibers," *ACS Sustainable Chem. Eng.* 3(9):1943-1954 (2015)), 1.3 billion tons of lignocellulosic biomass is available for biorefineries in the US alone, which could produce more than 225 million tons of lignin. Lignin is currently burned as low-grade boiler fuel with an estimated value below $50 per ton. Thus, value-added products from lignin play a critical role in sustaining biorefineries. To date, significant research effort has been dedicated to lignin valorization. In addition to biofuels and chemicals, lignin has also been used to produce green polymers (Thakur et al., "Progress in Green Polymer Composites from Lignin for Multifunctional Applications: A Review," *ACS Sustainable Chem. Eng.* 2(5):1072-1092 (2014)), carbon fibers (Baker and Rials, "Recent Advances in Low-Cost Carbon Fiber Manufacture from Lignin," *J. Appl Polym. Sci.* 130(2):713-728 (2013)), and composites (Gordobil et al., "Kraft Lignin as Filler in PLA to Improve Ductility and Thermal Properties," *Ind. Crops Prod.* 72:46-53 (2015)). However, lignin has several drawbacks when it was used as a feedstock material. For instance, the molecular structure of lignin depends on both biomass species and lignin extraction methods (Kai et al., "Towards Lignin-Based Functional Materials in a Sustainable World," *Green Chem.* 18(5):1175-1200 (2016)). Therefore, the properties of lignin, such as glass transition temperature, molecular weight and dispersity vary by lignin type. Dispersity of lignin is usually high due to fragmentation and re-condensation during the lignin extraction processes (Kai et al., "Towards Lignin-Based Functional Materials in a Sustainable World," *Green Chem.* 18(5):1175-1200 (2016)). Lignin also has low reactivity, low thermal stability and poor solvent solubility (Frank et al., "Carbon Fibers: Precursor Systems, Processing, Structure, and Properties," *Angew. Chem., Int. Ed.* 53(21):5262-5298 (2014); Qu et al., "Potential of Producing Carbon Fiber from Biorefinery Corn Stover Lignin with High Ash Content.," *J. Appl. Polym. Sci.* 135(4):45736 (2018)). Unlike cellulose and most synthetic polymers, lignin is a randomly cross-linked macromolecular network lacking in defined molecular orientation.

Alternatively, lignin-derived phenolic compounds could be used as feedstock to take advantage of its higher reactivity and reduced heterogeneity compared to lignin (Gordobil et al., "Kraft Lignin as Filler in PLA to Improve Ductility and Thermal Properties," *Ind. Crops Prod.* 72:46-53 (2015)). While the molecular sizes are significantly reduced compared to parent lignin, various functional groups on their molecules could serve as reactive sites for many interesting reactions. Therefore, a broad range of polymeric materials could be obtained from lignin-derived phenolic compounds. For example, Mahmood et al. used a solvent-liquefied lignin to synthesize a biobased polyurethane that has better compression modulus and strength than sucrose-based polyurethane (Mahmood et al., "Hydrolytic Liquefaction of Hydrolysis Lignin for the Preparation of Bio-Based Rigid Polyurethane Foam," *Green Chem.* 18(8):2385-2398 (2016). Qu et al. repolymerized lignin-derived bio-oil in the presence of sulfuric acid to produce a melt-spinnable polymer with glass transition temperature ($T_g$) of 101° C. (Qu et al., "Repolymerization of Pyrolytic Lignin for Producing Carbon Fiber with Improved Properties," *Biomass Bioenergy* 95:19-26 (2016)). The resulting polymer was further processed to yield carbon fiber with tensile strength up to 1.04 GPa and modulus up to 122 GPa. More often, however, purified phenolic monomers such as vanillin, syringol, guaiacol and eugenol thereof have been used as model monomers to demonstrate the potential of lignin-derived biopolymers (Mialon et al., "Biorenewable Polyethylene Terephthalate Mimics Derived from Lignin and Acetic Acid," *Green Chem.* 12(10):1704 (2010); Stanzione et al., "Lignin-Based Bio-Oil Mimic as Biobased Resin for Composite Applications," *ACS Sustainable Chem. Eng.* 1(4):419-426 (2013); Holmberg et al., "Softwood Lignin-Based Methacrylate Polymers with Tunable Thermal and Viscoelastic Properties," *Macromolecules* 49(4):1286-1295 (2016); Holmberg et al., "Syringyl Methacrylate, a Hardwood Lignin-Based Monomer for High-Tg Polymeric Materials," *ACS Macro Lett.* 5(5):574-578 (2016)). For example, Mialon et al. produced poly(dihydroferulic acid) from vanillin and reported its thermal properties to be similar to that of polyethylene terephthalate (Mialon et al., "Biorenewable Polyethylene Terephthalate Mimics Derived from Lignin and Acetic Acid," *Green Chem.* 12(10):1704 (2010)). In another study, Stanzione et al. polymerized methacrylated phenolic monomers to produce thermoset resins (Stanzione et al., "Lignin-Based Bio-Oil Mimic as Biobased Resin for Composite Applications," *ACS Sustainable Chem. Eng.* 1(4):419-426 (2013)). They further concluded that the phenolic monomers could replace petroleum-based styrene in the synthesis of vinyl ester resins. Holmberg et al. also synthesized thermoplastic polymers from esterified syringol and guaiacol-based monomers through radical polymerization (Holmberg et al., "Softwood Lignin-Based Methacrylate Polymers with Tunable Thermal and Viscoelastic Properties," *Macromolecules* 49(4):1286-1295 (2016); Holmberg et al., "Syringyl Methacrylate, a Hardwood Lignin-Based Monomer for High-Tg Polymeric Materials," *ACS Macro Lett.* 5(5):574-578 (2016)).

Phenolic monomer-derived thermoset and thermoplastic polymers are potentially highly attractive value-added products, as they can serve as alternatives of petroleum-based polymers in many applications (Llevot et al., "From Lignin- Derived Aromatic Compounds to Novel Biobased Polymers," *Macromol. Rapid Commun.* 37(1):9-28 (2016)). However, obtaining selective phenolic monomers from lignin at high purity and reasonable cost is often very difficult based on state-of-the art techniques. Due to its amorphous structure, lignin usually depolymerizes to yield crude bio-oil which is a complex mixture containing hundreds of phenolic monomers and oligomers varied in molecular weight and chemical functionality (Bayerbach and Meier, "Characterization of the Water-Insoluble Fraction from Fast Pyrolysis Liquids (Pyrolytic Lignin). Part IV: Structure Elucidation of Oligomeric Molecules," *J. Anal. Appl. Pyrolysis* 85(1-2):98-107 (2009); Bai et al., "Formation of Phenolic Oligomers during Fast Pyrolysis of Lignin," *Fuel* 128:170-179 (2014)). Compounding the difficulty of the selective production of a narrower range of monomers is the challenge and cost associated with the isolation and purification of monomers from the crude bio-oil. Although recent advances in depolymerization technologies report increased monomer yields and selectivity (Wang et al., "From Tree to Tape: Direct Synthesis of Pressure Sensitive Adhesives from Depolymerized Raw Lignocellulosic Biomass," *ACS Cent. Sci.* 4(6):701-708 (2018); Sun et al., "Complete Lignocellulose Conversion with Integrated Catalyst Recycling Yielding Valuable Aromatics and Fuels," *Nat. Catal.* 1(1):82-92 (2018)), higher-quality products were often accompanied by significantly higher product costs associated with purchasing solvent, catalyst and hydrogen gas, as well as operating at high-pressure reactors. Additionally, tedious postprocessing is often required, which involves the separation of liquid and solid residue, solvent recovery, catalyst regeneration and monomer extraction.

In previous studies, a few model monomers were mixed to mimic lignin bio-oil or pure monomers were extracted from lignin-based bio-oil prior to polymer syntheses (Stanzione et al., "Lignin-Based Bio-Oil Mimic as Biobased Resin for Composite Applications," *ACS Sustainable Chem. Eng.* 1(4):419-426 (2013); Holmberg et al., "Softwood Lignin-Based Methacrylate Polymers with Tunable Thermal and Viscoelastic Properties," *Macromolecules* 49(4):1286-1295 (2016); Wang et al., "From Tree to Tape: Direct Synthesis of Pressure Sensitive Adhesives from Depolymerized Raw Lignocellulosic Biomass," *ACS Cent. Sci.* 4(6): 701-708 (2018); Renders et al., "Sustainable Bisphenols from Renewable Softwood Lignin Feedstock for Polycarbonates and Cyanate Ester Resins," *Green Chem.* 19(11): 2561-2570 (2017)). Therefore, such feedstocks are far simpler than crude bio-oil that has complex compositions. This limitation is especially pronounced in (meth)acrylate derivatives used in radical polymerization, where the feedstock monomers in the previous studies are strictly monofunctional (i.e., single hydroxyl molecules) and thus yield linear thermoplastic polymers (Stanzione et al., "Lignin-Based Bio-Oil Mimic as Biobased Resin for Composite Applications," *ACS Sustainable Chem. Eng.* 1(4):419-426 (2013); Holmberg et al., "Softwood Lignin-Based Methacrylate Polymers with Tunable Thermal and Viscoelastic Properties," *Macromolecules* 49(4):1286-1295 (2016); Wang et al., "From Tree to Tape: Direct Synthesis of Pressure Sensitive Adhesives from Depolymerized Raw Lignocellulosic Biomass," *ACS Cent. Sci.* 4(6):701-708 (2018)). On the other hand, crude bio-oil derived lignin (meth)acrylates will necessarily be comprised of a distribution of monomers and oligomers bearing from one to several radically polymerizable sites (i.e., multiple hydroxyls in a molecule). Molecules with more than one polymerizable site are commonly referred to as "crosslinkers", given their ability to interconnect two or more growing polymer chains. Such unions lead at first to branched polymers, eventually interconnecting to a pervasive macroscopic polymer network, a process known as gelation. The theory of Flory and Stockmayer describes the statistics of this process and provides a well-known relationship between the average functionality of the monomers and the extent of reaction at which gelation should occur, the "gel point" (Flory, P. J., "Molecular Size Distribution in Three Dimensional Polymers. I. Gelation 1.," *J. Am. Chem. Soc.* 63(11):3083-3090 (1941); Flory, P. J., "Molecular Size Distribution in Three Dimensional Polymers. Vl. Branched Polymers Containing A-R-Bf-1 Type Units," *J. Am. Chem. Soc.* 74(11):2718-2723 (1952); Stockmayer, W. H., "Theory of Molecular Size Distribution and Gel Formation in Branched Polymers: II. General Cross Linking," *J. Chem. Phys.* 12(4):125-131 (1944); Stockmayer and Fixman, "Dilute Solutions of Branched Polymers," *Ann. N.Y. Acad. Sci.* 57(4):334-352 (1953); Flory, P. J., "Molecular Size Distribution in Three Dimensional Polymers. Ill. Tetrafunctional Branching Units," *J. Am. Chem. Soc.* 63(11):3096-3100 (1941)).

No work has been reported directly using pyrolytic lignin (PL) itself as a starting material to synthesize chain-like linear or lightly branched polymers. The model compounds that have been used are disadvantageous, because they are expensive and do not adequately represent the complexity of actual PL. Actual PL is composed of up to hundreds of multiple phenolic monomers and oligomers, in addition to small amounts of other compounds such as light aliphatics (Bayerbach et al., "Characterization of the Water-Insoluble Fraction From Fast Pyrolysis Liquids (Pyrolytic Lignin) Part IV: Structure Elucidation of Oligomeric Molecules," *Journal of Analytical and Applied Pyrolysis* 85(1):98-107 (2009); Qu et al., "Repolymerization of Pyrolytic Lignin for Producing Carbon Fiber with Improved Properties," *Biomass and Bioenergy* 95:19-26 (2016)). As a result, the number of functional groups, reactivity, and polymerization strategies are likely to be quite different than those of the model compounds. Additionally, the hydroxyl moieties of the model compounds are in precisely defined positions on the chemical structure, while the hydroxyl type (e.g., primary, secondary, phenolic, etc . . . ) and quantity in true PL can only be described in statistical terms. Therefore, it is of great importance to investigate the performance of actual PL upon polymerization.

The phenolic alcohol abundant in lignin chemistry serves as the primary functional handle for derivatization. Many strategies have been employed to produce chemically functionalized lignin, dating back to 1940s reports of Kraft lignin esters ranging from lignin acetate to lignin stearate (U.S. Pat. No. 2,429,102 to Lewis & Brauns). Beginning in the 1970s, there was a significant increase in efforts to valorize the Kraft lignin produced by the pulping industry. Etherification with alkylene oxides, particularly ethylene or propylene oxide, yields primary or secondary —OH functionality that can be readily incorporated into thermosetting polyurethane formulations (Wu & Glasser, "Engineering Plastics from Lignin. I. Synthesis of Hydroxypropyl Lignan," *J. Appl. Polym. Sci.* 29(4):1111-1123 (1984)). This functionality also disrupts strong molecular interactions, reducing brittleness and melt viscosity. Esterification, especially acetylation, is a common practice for improving lignin solubility and is most often achieved through reaction with acid chloride or acid anhydride (Glasser & Jain, "Lignin Derivatives," *Holzforsch* 47:225-233 (2009)). Navaeu was evidently the first to report functionalization with acrylate groups using both methacrylic anhydride and methacryloyl chloride in 1975

(Naveau, H. P., "Methacrylic Derivatives of Lignin," *Cellul. Chem. Technol* 9:71-77 (1975). Most recent examples of lignin acrylates have used this approach of (meth)acrylate esterification (Bunker & Wool, "Synthesis and Characterization of Monomers and Polymers for Adhesives from Methyl Oleate," *J. Polym. Sci. Part A: Polym. Chem.* 40(4):451-458 (2002); Stanzione III et al., "Vanillin-Based Resin for Use in Composite Applications," *Green Chem* 14:2346-2352 (2012); Stanzione et al., "Lignin Model Compounds as Bio-Based Reactive Diluents for Liquid Molding Resins," *ChemSusChem* 5(7):1291-1297 (2012)). While effective, these approaches are not scalable due to the separations required with anhydride-based esterification and cost/hazard associated with methacryloyl chloride. To date, the derivatization of low-$M_n$ lignin has largely been confined to model lignin compounds such as guaiacol or vanillin, which are chemically well-defined monomers that are unable to represent the multifunctional and complex character of any real lignin product.

A significant fraction of the efforts to use lignin as a polymeric material has centered on its use in thermosets (Thakur et al., "Process in Green Polymer Composites from Lignin for Multifunctional Applications: A Review," *ACS Sustain. Chem. Eng.* 2:1072-1092 (2014); Raquez et al., "Thermosetting (Bio)Materials Derived from Renewable Resources: A Critical Review," *Prog. Polym. Sci.* 35:48-509 (2010); Glasser & Wang, "Derivatives of Lignin and Lignin-like Models with Acrylate Functionality," *ACS Symposium Series, American Chemical Society* 397(41):515-522 (1989); Glasser, "Cross-Linking Options for Lignins," *Adhesives from Renewable Resources*, 385(4):43-54 (1989); Thielemans & Wool, "Lignin Esters for Use in Unsaturated Thermosets: Lignin Modification and Solubility Modeling," *Biomacromolecules* 6(4):1895-1905 (2005); Peng & Riedl, "The Chemorheology of Phenol-Formaldehyde Thermoset Resin and Mixtures of the Resin with Lignin Fillers," *Polymer* 35(6):1280-1286 (1994)). Perhaps the most familiar application is the family of phenol-formaldehyde resins used in the manufacture of wood composites (Glasser et al., "Hydroxy Propylated Lignin-Isocyanate Combinations as Bonding Agents for Wood and Cellulosic Fibers," *J. Adhes.* 14(3-4):233-255 (1982); Peng & Riedl, "The Chemorheology of Phenol-Formaldehyde Thermoset Resin and Mixtures of the Resin with Lignin Fillers," *Polymer* 35(6):1280-1286 (1994)), which has inspired other studies exploiting phenol-formaldehyde chemistry (Doherty et al., "Studies on Polymers and Composites from Lignin and Fiber Derived from Sugar Cane," *Polym. Adv. Technol.* 18:673-678 (2007)). A host of other crosslinking chemistries are available (Glasser, "Cross-Linking Options for Lignins," *Adhesives from Renewable Resources*, 385(4):43-54 (1989)), with the prominent strategy being etherification to polyol for inclusion in polyurethane formulations (Thakur et al., "Process in Green Polymer Composites from Lignin for Multifunctional Applications: A Review," *ACS Sustain. Chem. Eng.* 2:1072-1092 (2014); Glasser & Jain, "Lignin Derivatives," *Holzforsch* 47:225-233 (2009); Glasser et al., "Hydroxy Propylated Lignin-Isocyanate Combinations as Bonding Agents for Wood and Cellulosic Fibers," *J. Adhes.* 14(3-4):233-255 (1982)). Thermosets from lignin (meth) acrylates have also been produced using either radical or cationic polymerization mechanisms (Norgren & Edlund, "Lignin: Recent Advances and Emerging Applications," *Curr. Opin. Colloid Interface Sci.* 19:409-416 (2014); Stanzione III et al., "Vanillin-Based Resin for Use in Composite Applications," *Green Chem* 14:2346-2352 (2012); Glasser & Wang, "Derivatives of Lignin and Ligninlike Models with Acrylate Functionality," *ACS Symposium Series, American Chemical Society* 397(41):515-522 (1989); Thielemans & Wool, "Lignin Esters for Use in Unsaturated Thermosets: Lignin Modification and Solubility Modeling," *Biomacromolecules* 6(4):1895-1905 (2005); Naveau, H. P., "Methacrylic Derivatives of Lignin," *Cellul. Chem. Technol* 9:71-77 (1975)).

Plasticized lignin has been long-considered as a thermoplastic polymer, but thermoplastic lignin is not a chain-molecule and does not have a molar mass typical of useful thermoplastic elastomers or engineering thermoplastics (Wang et al., "Lignin-Based Thermoplastic Materials," *ChemSusChem* 9(8):770-783 (2016)). Holmberg produced a series of strictly monofunctional methacrylate derivatives of well-defined lignin-like compounds including vanillin, guaiacol, eugenol and creosol and evaluated the properties of the resulting thermoplastic polymers and block copolymers formed using RAFT polymerization (Holmberg et al., "Biobased Building Blocks for the Rational Design of Renewable Block Polymers," *Soft Matter* 10(38):7405-7424 (2014); Holmberg et al., "A Facile Method for Generating Designer Block Copolymers from Functionalized Lignin Model Compounds," *ACS Sustain. Chem. Eng.* 2(4):569-573 (2014)). There are no instances of thermoplastic chain-like polymers formed from technical lignin products or depolymerized variants thereof, owing to their intrinsically multifunctional character, that without special care, leads exclusively to thermoset materials.

The present application is directed to overcoming these and other deficiencies in the art.

SUMMARY OF THE APPLICATION

One aspect of the present application relates to a method of synthesizing a thermoplastic polymer. This method includes providing a depolymerized lignin product comprising monomers and oligomers and producing lignin (meth) acrylate monomers and oligomers from the depolymerized lignin product. A thermoplastic lignin (meth)acrylate polymer is then formed by free radical polymerization of the lignin (meth)acrylate monomers and oligomers.

A further aspect of the present application relates to a method of forming carbon fibers. The method includes producing a carbon fiber precursor by subjecting the lignin (meth)acrylate polymer product to a thermal treatment and extruding the thermally treated carbon fiber precursor to form carbon fibers.

Another aspect of the present application relates to a branched chained thermoplastic lignin (meth)acrylate polymer including a chain transfer agent.

A final aspect of the present application relates to a mixture of lignin (meth)acrylate monomers and oligomers with acetate groups, wherein the lignin acrylate oligomers have an acrylic content of 1 to N acrylic units per oligomer, wherein N is the number average content of alcohol, ester, and phenolic groups in the mixture of the depolymerized lignin monomers and oligomers.

The objectives of the present application are to investigate the RAFT polymerization of (meth)acrylated red oak lignin bio-oil and to explore the potential applications of the resultant polymers. The lignin bio-oil was produced by pyrolyzing biomass. Compared to other depolymerization technologies, pyrolysis is considered a highly cost-effective way to produce bio-oil. During pyrolysis, dry biomass is heated to moderate temperature under inert environment and atmospheric pressure and there is no need for catalyst, reactive gases and solvent. Since pyrolysis vapor is quenched to become bio-oil, no liquid-solid isolation is needed during postprocessing (Mohan et al., "Pyrolysis of Wood/Biomass for Bio-Oil: A Critical Review," *Energy Fuels* 20(3):848-889 (2006), which is hereby incorporated by reference in its entirety). Pyrolysis-based bio-oil is often complex mixtures of monomers and oligomers including multi-hydroxyl molecules. In the study, the average number of methacrylate groups per molecule was controlled as a key independent variable; insufficient functionalization should lead to poor yield and sluggish polymerization kinetics, whereas overly functionalized bio-oils are expected to rapidly reach the gel point. Additionally, the radical inhibitory character of residual phenolic groups was probed in partially methacrylated lignin by acetylation. The produced polymers were characterized, and their potential applications, mainly as carbon fiber precursors, were explored.

In this application, (meth)acrylate polymers with different thermal and viscoelastic properties were synthesized from red oak lignin bio-oil. The bio-oil, also called pyrolytic lignin (PL), consisted of various phenolic monomers and oligomers with average hydroxyl content of 3.04 mol/mol. The PL was first esterified with different amounts of methacryloyl chloride and acetyl chloride to form PL methacrylates and then subjected to reversible addition-fragmentation chain transfer polymerization. Polymerization of fully methacrylated PL caused gelation to yield a cross-linked polymer. On the other hand, gel-point suppression occurred in the polymerization of partially methacrylated PL to yield a thermoplastic polymer with glass transition temperature ($T_g$) of 161° C. and thermal decomposition temperature ($T_d$) of 241° C. In comparison, the functionalization of PL by partial methacrylation and subsequent acetylation resulted in a polymer with $T_g$ of 130° C. and $T_d$ of 250° C. Unlike other biobased methacrylate polymers that cannot withstand high temperatures and volatilize, the polymers produced from this study retained 25-28% mass when heated to 1000° C. The latter polymer was also melt-spinnable and demonstrated highly attractive properties as an ideal carbon fiber precursor. Other than its narrow molecular weight distribution and high isothermal stability, this lignin-based polymer also had a linear molecular orientation that is critical in producing high-quality carbon fiber.

BRIEF DESCRIPTION OF THE DRAWINGS

FIG. 7A shows the TGA curves of the PLMAPs under a nitrogen environment. FIG. 7B shows the TGA curves of PLMAPs under an air environment.

FIG. 9A shows a frequency sweep, and FIG. 9B shows the isothermal sweep of PLMAP3 at 210° C.

FIG. 12A shows examples of the structures of phenolic compounds found in PL. The plausible structure of dimers and trimers are based on Llevot et al., "From Lignin-Derived Aromatic Compounds to Novel Biobased Polymers," *Macromol. Rapid Commun.* 37(1):9-28 (2016). FIG. 12B shows exemplary structures in the three methods for functionalization, illustrated using representative phenolic monomer and oligomers.

FIG. 15A shows the possible chain structure of PLMAP3 displaying its molecular linearity. FIG. 15B shows the methacrylate backbone with examples of possible pendant structures in PLMAP3.

FIG. 17A is the GPC trace of the lignin bio-oil. FIG. 17B is the $^1H$-NMR spectrum of the lignin bio-oil.

FIG. 19A shows the FTIR spectra of lignin bio-oil and the functionalized LBAs with different degrees of acrylation. FIG. 19B shows the FTIR spectra of polymerized LBAP-1.5 with formed with differing AIBN concentrations.

FIG. 22A shows the TGA curves under $N_2$ for the polymerized LBAPs. FIG. 22B shows the DTG curves under $N_2$ for the polymerized LBAPs. FIG. 22C shows the TGA curves under $O_2$ for the polymerized LBAPs. FIG. 22C shows the DTG curves under $O_2$ for the polymerized LBAPs.

FIG. 23A shows the complex viscosity ($\eta^*$) changes during isochronal temperature scan. FIG. 23B shows the tan $\delta$ profiles during an isochronal temperature scan. FIG. 23C shows the $\eta^*$ changes during a frequency sweep.

DETAILED DESCRIPTION OF THE APPLICATION

Figure 1:
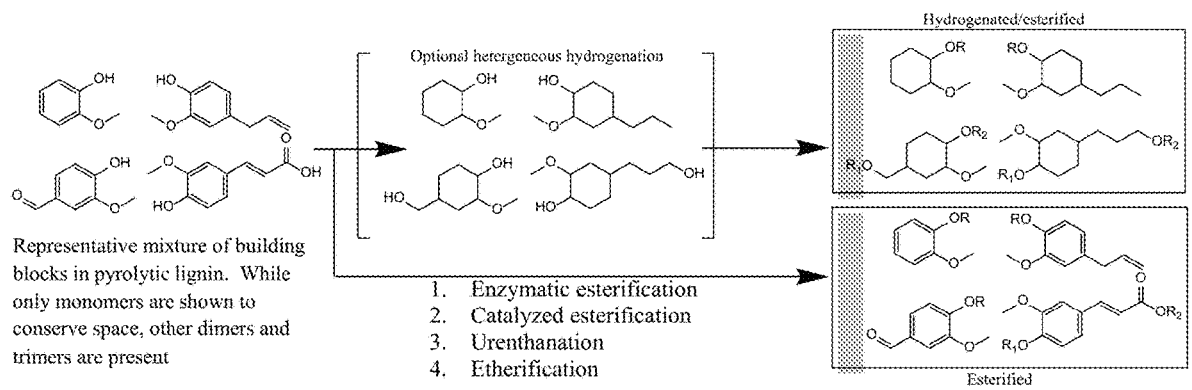
FIG. 1 is a graphical representation of low Mw phenolic oil being converted to polymerizable phenolic units via optional catalytic hydrogenation of non-aromatic unsaturation and esterification of phenolic and carboxylic —OH. Phenolic groups can be esterified directly with chemical or enzymatic catalysis, or can be urethanated with functionalized isocyanates. Alternatively, they can be etherified to primary hydroxyl with ethylene oxide and then esterified. R groups are selected from a mixture of acrylate, methacrylate, alcohol or acetate.

The present application relates to a method of synthesizing a thermoplastic polymer. This method includes providing a depolymerized lignin product comprising monomers and oligomers and producing lignin (meth)acrylate monomers and oligomers from the depolymerized lignin product. A thermoplastic lignin (meth)acrylate polymer is then formed by free radical polymerization of the lignin (meth)acrylate monomers and oligomers.

As used herein, the term "(meth)acrylate" refers to materials that are prepared from acrylates, methacrylates, or derivatives thereof.

The term "glass transition temperature" or "$T_g$" refers to the temperature at which a polymeric material transitions from a glassy state (e.g., brittleness, stiffness, and rigidity) to a rubbery state (e.g., flexible and elastomeric). The $T_g$ can be determined, for example, using techniques such as Differential Scanning calorimetry (DSC) or Dynamic Mechanical Analysis (DMA).

As used herein, the term "thermoplastic" refers to polymeric material that flows when heated and then returns to its original state when cooled to room temperature. However, under some conditions (e.g., applications where solvent resistance or higher temperature performance is desired), the thermoplastic polymers can be covalently crosslinked. Upon crosslinking, the materials lose their thermoplastic characteristics and become thermoset materials.

As used herein, the term "thermoset" refers to polymeric materials that become infusible and insoluble upon heating and that do not return to their original chemical state upon cooling. Thermoset materials tend to be insoluble and resistant to flow.

"Lignin" is a polyphenolic material comprised of methoxylated phenyl propane units linked by ether and carbon-carbon bonds. Lignins can be highly branched and can also be crosslinked. Lignins can have significant structural variation that depends, at least in part, on the plant source involved. Lignin fills spaces in the cell wall and between cellulose, hemicellulose, and, if present, pectin components.

As used herein, the term "natural lignin" refers to lignin in its natural state, in plant material.

Natural lignin is a naturally occurring amorphous complex cross-linked organic macromolecule that comprises an integral component of all plant biomass. The chemical structure of lignin is irregular in the sense that different structural units (e.g., phenylpropane units) are not linked to each other in any systematic order. Extracting native lignin from lignocellulosic biomass during pulping generally results in lignin fragmentation into numerous mixtures of irregular components. Furthermore, the lignin fragments may react with any chemicals employed in the pulping process. Consequently, the generated lignin fractions can be referred to as lignin derivatives and/or technical lignins. As it is difficult to elucidate and characterize such complex mixture of molecules, lignin derivatives are usually described in terms of the lignocellulosic plant material used, and the methods by which they are generated and recovered from lignocellulosic plant material, i.e., hardwood lignins, softwood lignins, and annual fiber lignins.

Natural lignins are partially depolymerized during the pulping processes into lignin fragments which dissolve in the pulping liquors and are subsequently separated from the cellulosic pulps. Post-pulping liquors containing lignin and polysaccharide fragments, and other extractives are commonly referred to as "black liquors" or "spent liquors," depending on the pulping process. Such liquors are generally considered a by-product, and it is common practice to combust them to recover some energy value in addition to recovering the cooking chemicals. However, it is also possible to precipitate and/or recover lignin derivatives from these liquors. Each type of pulping process used to separate cellulosic pulps from other lignocellulosic components produces lignin derivatives that are very different in their physico-chemical, biochemical, and structural properties.

One form of lignin which is suitable for use in accordance with the present application is kraft lignin which is produced in the sulphate (kraft) cooking process (Vishtal et al., "Challenges in Industrial Applications of Technical Lignins" *BioResources* 6(3):3547-3568 (2011), which is hereby incorporated by reference in its entirety). Most of the lignin in the biomass is dissolved in a solution of sodium hydroxide and sodium sulfide, and degraded into fragments of varying molecular weight, which are soluble in alkali solutions. Id. The solutions are later neutralized. Id. It contains an increased amount of phenolic hydroxyl groups, and may be further characterized by the formation of some biphenyl and other condensed structures, formation of quinine and catechol structures, increased amount of carboxyl groups, and high ash content. Id. This process may also be referred to as alkaline extraction process.

Another form of lignin which is suitable for use in accordance with the present application is soda lignin which is produced during the soda or soda-anthraquinone pulping process, mainly from annual crops such as flax, straws, and bagasse, as well as some hardwoods. Vishtal et al., "Challenges in Industrial Applications of Technical Lignins" *BioResources* 6(3):3547-3568 (2011), which is hereby incorporated by reference in its entirety. Unlike the kraft process, the cooking liquor and resulting lignin derivative is sulphur-free. Id. Soda lignin from non-wood plants may be characterized by increased p-hydroxyl units and carboxyl groups, as well as high silica and nitrogen contents. Id.

Lignosulphonates are also useful in accordance with the present application and are produced during sulphite cooking, in which wood is delignified by means of $HSO_3^-$ and $SO_3^{2-}$ ions. Vishtal et al., "Challenges in Industrial Applications of Technical Lignins" *BioResources* 6(3):3547-3568 (2011), which is hereby incorporated by reference in its entirety. Lignin is sulphonated, degraded, and solubilized during the process. Id. Lignosulphonates may be characterized by a variety of functional groups including phenolic hydroxyl groups, carboxylic groups, and sulphur containing groups. Id. These and other structural features provide unique colloidal properties. Id.

Organosolv lignin is also useful in accordance with the present application and is produced through a pulping process in which an organic solvent or mixture of organic solvents and water is used as a cooking medium. Vishtal et al., "Challenges in Industrial Applications of Technical Lignins" *BioResources* 6(3):3547-3568 (2011), which is hereby incorporated by reference in its entirety. Solvents may include acetic acid, formic acid, ethanol, or peroxiorganic acids. Id. Organosolv lignin is separated via solubilization, leading to a less modified lignin with a higher homogeneity than lignosulphonates or alkali lignins. Id. It may be characterized as having low molecular weight and high chemical purity, poor solubility, and many reactive side chains available for further chemical reactions. Id. FormicoFib™, Alcell®, Acetosolv, Organocell, and ASAM are examples of commercialized registered organosolv processes. Id.

Hydrolysis lignin is also useful in accordance with the present application and is produced during dilute acid hydrolysis of wood. Vishtal et al., "Challenges in Industrial Applications of Technical Lignins" *BioResources* 6(3): 3547-3568 (2011), which is hereby incorporated by reference in its entirety. It may be characterized by higher activity than lignosulphonates and kraft lignin, increased amount of condensed structures with high molecular weight, and high sorption. Id. Hydrolysis lignin may be further classified by the type of hydrolysis process (i.e. enzymatic hydrolysis lignin or acid hydrolysis lignin), and by the origin (i.e. softwood, hardwood, and non-wood). Id. Acid hydrolysis may utilize either organic (i.e. formic, acetic) or inorganic (i.e. sulphuric, hydrochloric) acids. Id.

Supercritical hydrolysis uses supercritical water to break down cellulose into usable sugars. Thomas et al., "A Supercritical Water Approach to Cellulosic Sugars: Lifecycle Energy, Greenhouse Gas and Water Implications" *Renmatix LCA* (2012), which is hereby incorporated by reference in its entirety. Lignin is found in the solid fraction and is further extracted using cellulose hydrolysis in the following manner: the solid fraction is mixed with water, heated, and then treated with supercritical water. Id. The output is a cellulose liquor and lignin. Id.

Ionic liquid lignins are comprised of organic salts that remain as liquids at relatively low temperatures, and several such ionic liquids have been found to fractionate lignocellulosic materials. Vishtal et al., "Challenges in Industrial Applications of Technical Lignins" *BioResources* 6(3): 3547-3568 (2011), which is hereby incorporated by reference in its entirety. The properties of ionic liquid lignin are similar to organosolv lignin. Id. Lignin can be recovered from the ionic liquid through precipitation, and the ionic liquid can be recycled. Id.

It is possible to deconstruct complex lignin into smaller and simpler phenolic units through fast pyrolysis or hydrothermal liquefaction of lignin within short times (Bridgwater, "Review of Fast Pyrolysis of Biomass and Product Upgrading," *Biomass Bioenergy* 38:68-94 (2012); Kang et al., "Hydrothermal Conversion of Lignin: A Review," *Renew. Sustain. Energy Rev.* 27:546-558 (2013), which are hereby incorporated by reference in their entirety). In fast pyrolysis, lignocellulosic biomass or isolated lignin is rapidly heated to temperatures around 450-600° C. for less than two seconds, with or without a catalyst. The arising vapor is quenched to obtain pyrolytic oil as the major product (Laird et al., "Review of the Pyrolysis Platform for Coproducing Bio-Oil and Biochar," *Biofuels Bioprod. Biorefining* 3(5): 547-562 (2009), which is hereby incorporated by reference in its entirety). Pyrolytic oil of lignin is a mixture of aromatic compounds (mainly phenolics) monomers and oligomers. According to previous technoeconomic analysis, fast pyrolysis is an economically attractive technology to convert biomass that can be easily scaled (Brown & Brown, "Techno-Economics of Advanced Biofuels Pathways," *RSC Adv.* 3:5758-5764 (2013); Zhang et al., "Sustainable Process Design and Synthesis of Hydrocarbon Biorefinery Through Fast Pyrolysis and Hydroprocessing," *AIChE J.* 60:980-994 (2014), which are hereby incorporated by reference in their entirety). Pyrolysis is also the most established and straightforward method from a separations perspective (Bridgwater et al., "An Overview of Fast Pyrolysis of Biomass," *Org. Geochem.* 30(12):1479-1493 (1999), which is hereby incorporated by reference in is entirety). During fast pyrolysis, aryl ether and unstable carbon-carbon bonds are cleaved; subsequent hydrodealkylation leads to rupture of the alkyl side chain groups linked to aromatic rings. Side chain cleavages and eliminations through dehydration, decarboxylation, decarbonylation and demethoxylation, as well as radical coupling reactions occur. As a result, the complex and irregular polymer network of lignin is nearly completely destroyed (Azadi et al., "Liquid Fuels, Hydrogen and Chemicals from Lignin: A Critical Review," *Renew. Sustain. Energy Rev.* 21:506-523 (2013), which is hereby incorporated by reference in its entirety). The resulting products are smaller phenolics molecules such as: phenol, methoxy phenols, vinylphenols, alkylated methyl phenols, phenolic aldehydes and ketones. However, vinylphenols, phenolic aldehydes and some other compounds tend to repolymerize after pyrolysis (Patwardhan et al., "Understanding the Fast Pyrolysis of Lignin," *ChemSusChem* 4(11):1629-1636 (2011); Kim et al., "Quantitative Investigation of Free Radicals in Bio-Oil and Their Potential Role in Condensed-Phase Polymerization," *ChemSusChem* 8(5):894-900 (2015), which are hereby incorporated by reference in their entirety). The liquid product resulting from biomass pyrolysis is commonly referred to as "pyrolysis oil," "bio-fuel oil," or simply "bio-oil." Fast pyrolysis of biomass produces bio-oil, gas, and char. The gas stream containing $H_2$, CO, $CO_2$, and hydrocarbons can be used to provide the heat required for the pyrolysis. Char that is produced can be burned to provide heat for the pyrolysis, returned to the soil to enhance soil fertility, or recovered for sale (as activated carbon).

A process for the formation of pyrolytic lignin is disclosed in U.S. Patent Publication US20170240934A1, which is hereby incorporated by reference in its entirety.

In hydrothermal liquefaction, lignin is depolymerized in heated solvents under pressure to yield liquefied products. While many solvents have been studied to date, water and alcohols (e.g., methanol, ethanol) are preferred solvents because of their availability, low environmental impact and cost (Kang et al., "Hydrothermal Conversion of Lignin: A Review," *Renew. Sustain. Energy Rev.* 27:546-558 (2013), which is hereby incorporated by reference in its entirety). The reaction times of hydrothermal liquefaction usually span from minutes up to hours. Hydrothermal decomposition occurs at milder temperatures (<350° C.) and has potential to produce higher liquid yields than that with fast pyrolysis. Previously, Cheng et al. converted an alkali lignin in 50/50 (v/v) water and ethanol co-solvent at 250° C. to produce 96% of phenolic oil (Cheng et al., "Hydrothermal Degradation of Alkali Lignin to Bio-Phenolic Compounds in Sub/Supercritical Ethanol and Water-Ethanol Co-Solvent," *Polym. Degrad. Stab.* 97(6):839-848 (2012), which is hereby incorporated by reference in its entirety). Ye et al. also converted a corn stover lignin in 35/65 (v/v) waterethanol at similar temperature to produce 70% of liquid product containing simpler phenolic monomers, such as vinylphenols, ethylphenol, guaiacol, ethylguaiacol and syringol (Ye et al., "Effect of Reaction Conditions on Hydrothermal Degradation of Cornstalk Lignin," *J. Anal.*

*Appl. Pyrolysis* 94:190-195 (2012), which is hereby incorporated by reference in its entirety). In general, the phenolic oil produced from hydrothermal liquefaction is more stable than if produced from fast pyrolysis. This is because the solvents can act as hydrogen donors to stabilize free radicals produced during lignin decomposition and saturate reactive vinyl C═C and carbonyl C═O groups. However, the average molecular weights of the resulting phenolic oils are usually much higher than that of the pyrolysis based phenolic oil due to higher contents of oligomers. Compared to whole lignin, these phenolic oils have several promising advantages as the precursor for chain-based polymer synthesis.

In one embodiment of the present application, the depolymerized lignin product is formed by a method selected from the group consisting of: fast pyrolyzing, solvolysis processing, hydrothermal liquefaction, kraft cooking, soda pulping, hydrolysis, super critical hydrolysis, organosolv processing, and sulfite cooking, to produce the depolymerized lignin product comprising monomers and oligomers.

Technical lignin is a randomly cross-linked particle-like polymer with poorly-defined structure. This architecture renders it incompatible with many other polymers and solvents, and prevents chain entanglements that give synthetic polymers many of their desirable properties. In comparison, lignin-derived phenolic oil is soluble in most polar solvents and features better compatibility and reactivity with other polymers. Due to the reduced structural complexity and significantly smaller molecular sizes, these phenolic monomers and oligomers also provide better flexibility and control for targeted chemical modification. Moreover, the composition and properties of the phenolic oil can be further tailored by adjusting lignin deconstruction method and fractioning the oil as described above. Overall, the advantages of the lignin-derived phenolic oil compared to lignin make it a much more versatile starting material for synthesizing chain-like branched thermoplastic polymers.

In accordance with the present application, the provided depolymerized lignin product is dissolved in a solvent. The solvent is used to dissolve the depolymerized lignin in the formation of the (meth)acrylated lignin monomers and oligomers. The monomers and oligomers of depolymerized lignin are dissolved in the solvent to control the concentration and reactivity of the (meth)acylation and acylation reactions. Exemplary solvents used to dissolve the depolymerized lignin product include: methylene chloride, toluene, dioxane, THF, chloroform, cyclohexane, dimethyl sulfoxide, dimethyl formamide, acetone, acetonitrile, n-butanol, n-pentanol, chlorobenzene, diethylether, tert-butanol, 1,2,-dichloroethylene, diisopropylether, ethanol, ethylacetate, ethylmethylketone, heptane, hexane, isopropylalcohol, isoamylalcohol, methanol, pentane, n-propylalcohol, pentachloroethane, 1,1,2,2,-tetrachloroethane, 1,1,1,-trichloroethane, tetrachloroethylene, tetrachloromethane, trichloroethylene, water, xylene, benzene, nitromethane, glycerol, and mixtures thereof.

As used herein, a "(meth)acrylic" compound is a compound comprising a (meth)acryloyl group, whereby it is noted that a (meth)acrylol group, by definition, comprises an unsaturated bond. As used herein the term "acryloyl group" refers to an enone (also known as an α,β-unsaturated carbonyl) with the structure $H_2C=CH-C(=O)-$, or optionally, a methyacryloyl group, having the structure $H_2C=C(CH_3)-C(=O)-$. Depolymerized lignin possesses an aromatic structure with pendent alcohol groups. These alcohol groups are reacted with a compound having an (meth) acrylol functionality to form a (meth)acrylate, having the ester structure $H_2C=C(CH_3)-C(=O)-O-$ or $H_2C=CH-C(=O)-O-$. As will be apparent to one of skill in the art, the unsaturated double bond of the newly pendent acrylic group is polymerized during the controlled radical polymerization of the depolymerized lignin monomers and oligomers into the thermoplastic polymers of the present application.

Production of lignin (meth)acrylate monomers and oligomers is carried out by reacting the depolymerized lignin product with a compound having a (meth)acryloyl group. In a more specific example, the lignin acrylate monomers and oligomers are produced by reacting the depolymerized lignin product with a compound having an acryloyl group.

The depolymerized lignin (meth)acrylates are multifunctional, comprising mixtures that contain number-average-phenolic-group-per-molecule values ranging from slightly over 1 up to 4. However, this is far less than current industrially produced lignin. The resultant monomers are 3-4 times larger than conventional petrochemically-derived acrylate monomers having an average molar mass of <500 Da, but they are small enough that they can effectively serve as property-tuning pendant groups of a long-chain acrylic backbone.

The (meth)acrylic monomers and oligomers are formed by the reaction of the depolymerized lignin compounds with acrylic derivatives such as acryloyl halides (such as acyloyl chloride), acrylic acid, acrylic anhydrides, or alkyl acrylates in the presence of suitable acid, base, or a metal catalyst, as are well known in the art. Conventionally, methacrylate esters and acrylate esters are prepared via a direct esterification reaction by reacting methacrylic acid or acrylic acid, usually in excess, with an alcohol or a polyol in the presence of an azeotroping solvent for water removal, typically a hydrocarbon solvent, an esterification catalyst and a polymerization inhibitor. However, other esterification reactions can also be utilized, such as transesterification reactions. Further examples of esterification reaction for the formation of (meth)acrylic compounds can be found in U.S. Pat. Nos. 6,175,037; 4,665,217; 4,187,383; 7,199,211; and 5,510,514, which are hereby incorporated by reference in their entirety.

Other approaches like isocyanate/acrylate hybrids have been used to produce acrylate-bearing lignins by urethanation at high conversion and yield under mild conditions with simple metal catalysts (Glasser & Wang, "Derivatives of Lignin and Ligninlike Models with Acrylate Functionality," *ACS Symposium Series, American Chemical Society* 397 (41):515-522 (1989), which is hereby incorporated by reference in its entirety); both phenolic and alkoxy-extended lignins were successfully modified in this fashion. Etherification with ethylene oxide quantitatively substitutes phenolic —OH with primary alcohol (Wu & Glasser, "Engineering Plastics from Lignin. I. Synthesis of Hydroxypropyl Lignan," *J. Appl. Polym. Sci.* 29(4):1111-1123 (1984), which is hereby incorporated by reference in its entirety), which can then be processed with catalytic Fisher esterification or enzymatic transesterification (Stamatis et al., "Enzymatic Synthesis of Hydrophilic and Hydrophobic Derivatives of Natural Phenolic Acids in Organic Media," *J. Mol. Catal. B Enzym.* 11(4):323-28 (2001), which is hereby incorporated by reference in its entirety). Eshghi reported efficient direct esterification of phenols using a $P_2O_5/SiO_2$ catalyst system (Eshghi et al. "$P_2O_5/SiO_2$ as an Efficient Reagent for Esterification of Phenols in Dry Media," *Synth. Commun.* 31(5): 771-774 (2001), which is hereby incorporated by reference in its entirety). FIG. 1 succinctly summarizes the lignin derivatization processes that can be utilized in the present application.

In an additional embodiment of the present application, the method of synthesizing the thermoplastic depolymerized lignin based polymer includes transforming the alcohol groups in the lignin (meth)acrylate monomers and oligomers into acetate groups prior to the forming of the lignin (meth) acrylate polymer. This transforming can be carried out by reacting the lignin (meth)acrylate monomers and oligomers under esterification conditions, with an acetyl chloride, acetic acid, or an acetyl ester, prior to the forming of a lignin (meth)acrylate polymer.

The addition of the acetate groups to the depolymerized lignin (meth)acrylate monomers and oligomers is done to help tune the reactivity of the monomers and oligomers for polymerization. Any remaining alcohol groups left after the acrylation process, described supra, can be reacted with any number of well known acylation conditions, forming acetate groups with the ester structure $CH_3$—C(=O)—O—. The acetate groups prevent any remaining pendent alcohols of the depolymerized lignin monomers and oligomers from reacting during the polymerization process. Common acylation reactions utilize acetic anhydride, acyl halides (such as acyl chloride), or acetic acid in direct esterification, or transesterification reactions. Further examples of acylation reactions are disclosed in U.S. Pat. Nos. 8,431,709; 4,996,307; 4,540,743; 5,756,321; and 6,171,819, which are hereby incorporated by reference in their entirety.

To upgrade lignin fragments into valuable radically polymerizable monomers, several factors must be considered. Firstly, the average number of polymerizable (meth) acrylate groups per molecule strongly controls the tendency of the polymerization to branch and ultimately gelation to a thermoset material (International Patent Application No. PCT/US2017/045340 to Cochran et al.; Yan et al., "Gel Point Suppression in RAFT Polymerization of Pure Acrylic Cross-Linker Derived from Soybean Oil," *Biomacromolecules* 17(8):2701-2709 (2016), which are hereby incorporated by reference in their entirety); to facilitate thermoplastic formation there would ideally be only one acrylate group per monomer. However, because (meth)acrylate groups will be statistically distributed, the average degree of (meth) acrylation must be slightly greater than unity to minimize the quantity of inert material. Secondly, phenolic groups strongly inhibit radically mediated chemistry; indeed, phenolic molecules like hydroquinone or BHT are very commonly employed as stabilizers or preservatives for monomers and polymers. This implies that radically polymerizable lignin-based monomers should not have residual phenolic —OH; that is, all —OH should be converted to either acrylate or an inert functional group. Thirdly, the properties of the derivative polymers will depend on the substituents chosen. Acrylic backbones tend to polymerize more easily than methacrylic backbones, and tend to have lower $T_g$ values. Inert substituents, e.g. acetate vs. propionate, will also influence properties. Finally, fully hydrogenated lignin fragments can be used to achieve higher chemical stability and different properties.

In one aspect of the present application, the lignin acrylate oligomers have an acrylic content of 1.001 to N acrylic units per oligomer. Furthermore, the lignin methacrylate oligomers have a methacrylic content of 1 to N methacrylic units per oligomer. In both of these aspects of the present application, N is the number average content of alcohol, ester, and phenolic groups in the mixture of the depolymerized lignin monomers and oligomers.

In step growth polymerization and free radical polymerization, the gel point occurs in the early stages of polymerization with exceedingly low levels of crosslinkers. However, controlled radical polymerization strategies such as atom transfer radical polymerization (ATRP) or reversible addition-fragmentation chain transfer (RAFT) polymerization are known to produce more homogeneous networks that undergo gelation at far later stages of polymerization (Norisuye et al., "Comparison of the Gelation Dynamics for Polystyrenes Prepared by Conventional and Living Radical Polymerizations: A Time-Resolved Dynamic Light Scattering Study," *Polymer* 46(6):1982-1994 (2005); Rosselgong et al., "Synthesis of Highly Branched Methacrylic Copolymers: Observation of Near-Ideal Behavior Using RAFT Polymerization," *Macromolecules* 42(16):5919-5924 (2009); U.S. Patent Application Publication No. 20150337078 to Cochran et al., published Nov. 6, 2015, which are hereby incorporated by reference in their entirety), enabling the production of thermoplastic branched polymers with molecular weights as high as 3M g/mol from monomers with average functionalities over two vinyl groups per monomer. This observation suggests that methods such as ATRP or RAFT could be used to upgrade (meth)acrylated phenolic monomers derived from bio-oils to branched thermoplastic polymers that exhibit many of the desirable mechanical and thermal properties sought from the linear polymers produced from model phenolic monoacrylates. On the other hand, although methacrylation of all the esterificable sites in the phenolic monomers and oligomers will ensure the bio-oil is radically polymerizable, having too many polymerizable sites on per molecule may promote crosslinking and could result in gelation even with ATRP or RAFT. This problem may be avoidable by controlling the extent of methacrylation to limit the crosslinking and branching.

In accordance with the process of the present application, the (meth)acrylate monomers and oligomers are polymerized. One suitable polymerization technique is the free radical polymerization known as the RAFT process. The materials prepared herein are the first examples of chain-like thermoplastic polymers produced from functionalized depolymerized lignin as a monomer, repolymerized using reversible addition-fragmentation chain transfer (RAFT) polymerization (Moad, "The Emergence of RAFT Polymerization," *Aust. J. Chem.* 59(10):661-662 (2006); Moad et al., "Living Radical Polymerization by the RAFT Process—A First Update," *Aust. J. Chem.* 59(10):669-692 (2006); Moad et al., "Living Radical Polymerization by the RAFT Process—A Second Update," *Aust. J. Chem.* 62(11): 1402-1472 (2009); Moad et al., "Living Radical Polymerization by the RAFT Process—A Third Update," *Aust. J. Chem.* 65(8):985-1076 (2012), which are hereby incorporated by reference in their entirety).

Radical Addition-Fragmentation Chain Transfer polymerization limits the number of initiation sites and drastically reduces the rate of polymer-to-polymer chain transfer and termination reactions, and also introduces the capability of producing custom chain architectures such as block copolymers (BCPs) and statistical copolymers. This degree of control is superior to that offered by other controlled radical polymerization methods—that is, polymers of higher molar mass may be obtained over a shorter period of time with less rigorous purification.

Figure 2:
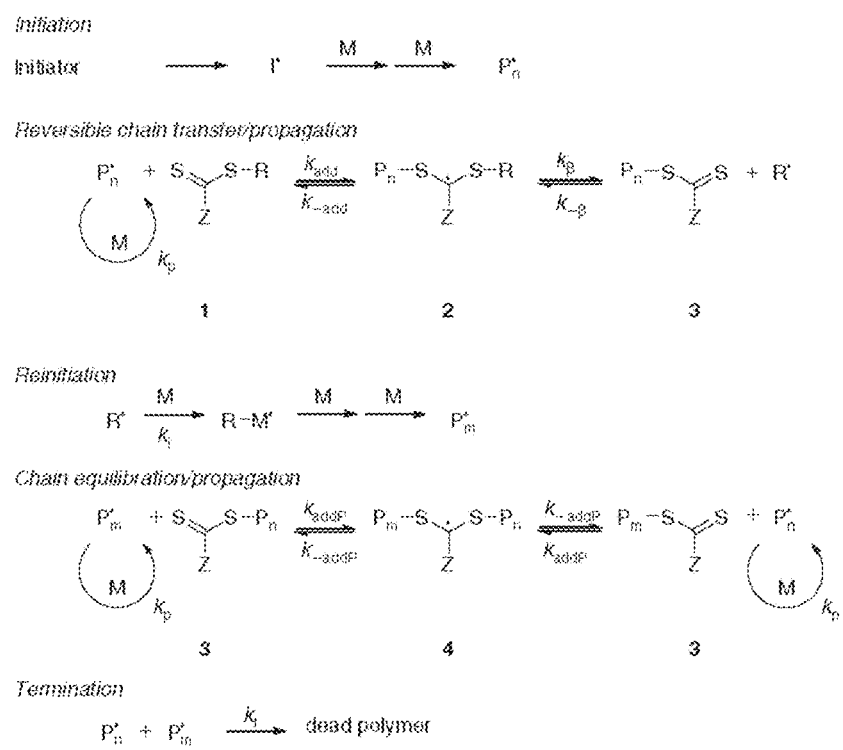
FIG. 2 is a schematic drawing illustrating the Radical Addition-Fragmentation Chain Transfer (RAFT) polymerization mechanism, described in Moad et al., "Living Radical Polymerization by the Raft Process—a First Update," *Australian Journal of Chemistry* 59: 669-92 (2006), which is incorporated herein by reference in its entirety.

RAFT polymerization is a type of living polymerization or controlled polymerization, utilizing a chain transfer agent (CTA). A conventional RAFT polymerization mechanism, consisting of a sequence of addition-fragmentation equilibria, is shown in FIG. 2 (Moad et al., "Living Radical Polymerization by the Raft Process—a First Update," *Australian Journal of Chemistry* 59: 669-92 (2006), which is incorporated herein by reference in its entirety). As depicted, the RAFT polymerization reaction starts with initiation. Initiation is accomplished by adding an agent capable of decomposing to form free radicals; the decomposed free radical fragment of the initiator attacks a monomer yielding a propagating radical ($P^{\bullet}_n$), in which additional monomers are added producing a growing polymer chain. In the propagation step, the propagating radical ($P^{\bullet}_n$) adds to a chain transfer agent (CTA), such as a thiocarbonylthio compound (RSC(Z)=S, 1), followed by the fragmentation of the intermediate radical (2) forming a dormant polymer chain with a thiocarbonylthio ending ($P_nS(Z)C=S$, 3) and a new radical ($R^{\bullet}$). This radical ($R^{\bullet}$) reacts with a new monomer molecule forming a new propagating radical ($P^{\bullet}_m$). In the chain propagation step, ($P^{\bullet}_n$) and ($P^{\bullet}_m$) reach equilibrium and the dormant polymer chain (3) provides an equal probability to all polymers chains to grow at the same rate, allowing polymers to be synthesized with narrow polydispersity. Termination is limited in RAFT and, if occurring, is negligible. For traditional monomers which contain only one polymerizable species, targeting a specific molecular weight in RAFT can be calculated by multiplying the ratio of monomer consumed to the concentration of CTA used by the molecular weight of the monomer. When applied to monomers containing species with two or more polymerizable moieties, branched polymers may form that further increase the molecular weight.

The initiating agents often are referred to as "initiators." Suitable initiators depend greatly on the details of the polymerization, including the types of monomers being used, the type of catalyst system, the solvent system, and the reaction conditions. A typical radical initiator can be azo compounds, which provide a two-carbon centered radical. Radical initiators such as benzoyl peroxide, azobisisobutyronitrile (AIBN), 1,1' azobis(cyclohexanecarbonitrile) or (ABCN), or 4,4'-Azobis(4-cyanovaleric acid) (ACVA); redox initiator such as benzoyl peroxide/N,N-dimethylaniline; microwave heating initiator; photoinitiator such as (2,4,6-trimethylbenzoyl)-diphenylphosphine oxide; gamma radiation initiator; or Lewis Acids such as scandium(III) triflate or yttrium (III) triflate, are typically used in RAFT polymerization.

RAFT polymerization can use a wide variety of CTA agents. Suitable CTA agents should be capable of initiating the polymerization of the monomers (styrene and AESO) and achieve a narrow polydispersity in the process. For RAFT polymerization to be efficient, the initial CTA agents should have a reactive C=S double bond; the intermediate radical should fragment rapidly without side reactions; the intermediate should partition in favor of products, and the expelled radicals ($R^{\bullet}$) should efficiently re-initiate polymerization. A suitable CTA agent is a thiocarbonylthio compound (ZC(=S)SR:

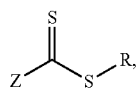

where R is free radical leaving group and Z is a group that modifies addition and fragmentation rates of RAFT polymerization. Exemplary CTA agents include, but are not limited to, a dithioester compound (where Z=aryl, heteraryl, or alkyl), a trithiocarbonate compound (where Z=alkylthio, arylthio, or heteroarylthio), a dithiocarbamate compound (where Z=arylamine or heterarylamine or alkylamine), and a xanthate compound (where Z=alkoxy, aryloxy, or heteroaryloxy), that are capable or reversible association with polymerizable free radicals. Z can also be sulfonyl, phosphonate, or phosphine. A more extensive list of suitable CTA agents (or RAFT agents) can be found in Moad et al., "Living Radical Polymerization by the Raft Process—a First Update," *Australian Journal of Chemistry* 59: 669-92 (2006); Moad et al., "Living Radical Polymerization by the Raft Process—a Second Update," *Australian Journal of Chemistry* 62(11):1402-72 (2009); Moad et al., "Living Radical Polymerization by the Raft Process—a Third Update," *Australian Journal of Chemistry* 65: 985-1076 (2012); Skey et al., "Facile one pot synthesis of a range of reversible addition-fragmentation chain transfer (RAFT) agents." *Chemical Communications* 35: 4183-85 (2008), which are hereby incorporated by reference in their entirety. A CTA agent's effectiveness depends on the monomer being used and is determined by the properties of the free radical leaving group R and the Z group. These groups activate and deactivate the thiocarbonyl double bond of the RAFT agent and modify the stability of the intermediate radicals (Moad et al., "Living Radical Polymerization by the Raft Process—a Second Update," *Australian Journal of Chemistry* 62(11):1402-72 (2009), which is hereby incorporated by reference in its entirety). Typical CTA agents used are 1-phenylethyl benzodithioate or 1-phenylethyl 2-phenylpropanedithioate.

In in some RAFT polymerization processes, the chain transfer agent used is a telechelic chain transfer agent, which typically is based on trithiocarbonate functionality. Polymers produced from the chain transfer agent based on trithiocarbonate functional group retain the CTA functionality in the statistical center of the chain, as opposed to polymers produced by a dithiocarbonate-based CTA, which retain the CTA functionality at the end of the polymeric chain. The telechelic chain transfer agent is capable of adding polymer blocks symmetrically from the interior where the trithiocarbonate functionality is located, i.e., polymerizing monomers from both ends, forming symmetrical architecture or polymer blocks. For example, the RAFT process begins with the chain transfer of a growing A radical to a functional trithiocarbonate, as shown in Scheme 1.

Scheme 1. Schematic showing the transfer of the initial radical to the trithiocarbonate CTA, in the start of the RAFT polymerization process.

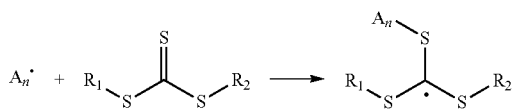

The formed radical intermediate is stable against coupling or disproportion reactions with other free radicals. As shown in Scheme 2 infra, one of the thioate groups reversibly fragments allowing propagation of one of the three arms.

Scheme 2. Schematic showing of the basic propagation mechanism of RAFT polymerization using a trithiocarbonate CTA

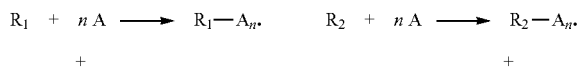

-continued

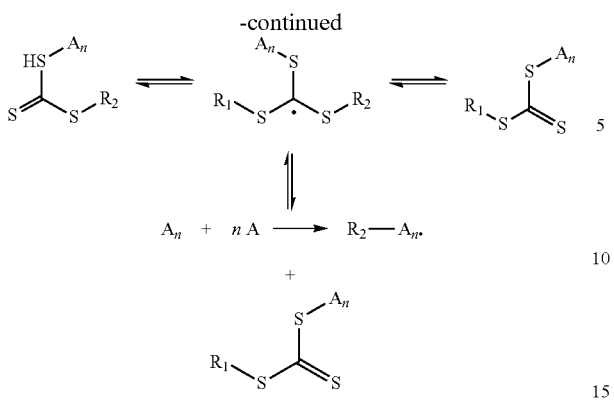

See also Scheme 3 infra for the basic mechanism of RAFT polymerization using a telechelic chain transfer agent.

(RAFT) Agents." *Chemical Communications* 35: 4183-85 (2008), which is hereby incorporated by reference in its entirety. A typical telechelic chain transfer agent is dibenzyl carbonotrithioate

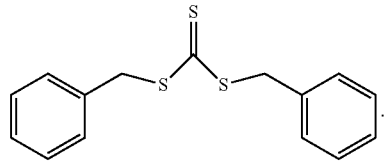 [SMILES: S=C(SCc1ccccc1)SCc1ccccc1]

Further examples of RAFT polymerization can be found in U.S. Pat. No. 9,650,463, which is hereby incorporated by reference in its entirety.

Another aspect of the present application relates to a branched chained thermoplastic lignin (meth)acrylate poly-

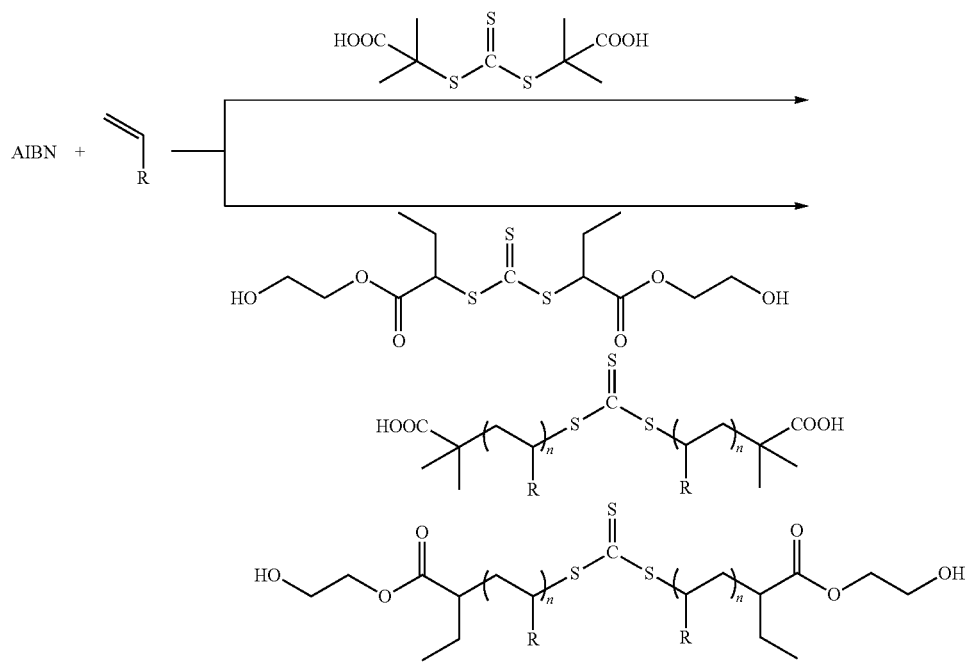

Scheme 3. Schematic showing of the basic mechanism of RAFT polymerization using a telechelic chain transfer agent. AIBN is exemplary chain initiator, azobisisobtyronitrile; and ⟶ is an exemplary monomer unit, a vinyl monomer (Tasdelen et al., "Telechelic Polymers by Living and Controlled/Living Polmeriztion Methods," *Progress in Polymer Science* 36 (4), 455-567 (2011) which is hereby incorporated by reference in its entirety).

Suitable telechelic CTA agents include any trithiocarbonate compound (e.g.,

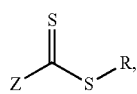

where Z=alkylthio, arylthio, or heteroarylthio and R is free radical leaving group). A more extensive list of suitable telechelic CTA agents (trithiocarbonate compounds) can be found in Skey et al., "Facile One Pot Synthesis of a Range of Reversible Addition-Fragmentation Chain Transfer mer including a chain transfer agent. Exemplary chain transfer agents include thiocarbonylthio compounds, dithioester compounds, trithiocarbonate compounds, dithiocarbamate compounds, or xanthate compounds capable of reversible association with polymerizable free radicals.

Due to the difference in the ease of polymerization, different chain transfer agents are utilized for methacrylic and acrylic substituted depolymerized lignin monomers and oligomers. When polymerizing a depolymerized lignin product with methacrylate groups 2-cyanopropan-2-yl methyl carbonotrithioate can be utilized as the chain transfer agent; while ethyl (3-oxobutan-2-yl) carbonotrithioate can be utilized for the polymerization of acrylic substituted depolymerized lignin monomers and oligomers.

In another embodiment of the present application, the method of synthesizing a thermoplastic polymer from depolymerized lignin utilizes Atom Transfer Radical Polymerization (ATRP) as the method of polymerization.

Atom transfer radical polymerization (ATRP) is a catalyzed, reversible redox process that achieves controlled polymerization via facile transfer of labile radicals (e.g., halide radicals) between growing polymer chains and a catalyst (Davis et al., "Atom Transfer Radical Polymerization of tert-Butyl Acrylate and Preparation of Block Copolymers," *Macromolecules* 33:4039-4047 (2000); Matyjaszewski et al., "Atom Transfer Radical Polymerization," *Chemical Reviews* 101:2921-2990 (2001), which are hereby incorporated by reference in their entirety). In ATRP, chain termination and transfer reactions are essentially eliminated by keeping the free radical concentration small. Briefly, the mechanism by which ATRP operates may be summarized as:

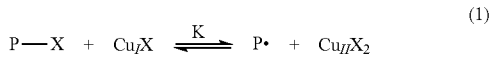

(1)

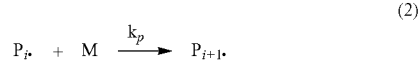

(2)

In Equation (1), the labile radical X may be a halogen (e.g., Br, Cl) attached to end of a polymer P. The catalyst, CuBr, reversibly abstracts this halogen, forming a polymer-free radical (P·). The equilibrium achieved between inert polymers and active polymer-free radicals strongly favors the left side ($K \ll 10^{-8}$). Equation (2) is the standard free radical propagation reaction between a polymer of length i and a monomer M. The small free radical concentration ensured by equation (1) virtually eliminates termination reactions, and the halogen functionality is retained on polymers produced. This allows for the production of block copolymers from nearly any monomer amenable to conventional free radical polymerization.

The ATRP polymerization reaction starts with initiation. Initiation is accomplished by adding an agent capable of decomposing to form free radicals; the decomposed free radical fragment of the initiator attacks a monomer yielding a monomer-free radical, and ultimately produces an intermediate capable of propagating polymerization. These agents often are referred to as "initiators." The initiation is typically based on the reversible formation of growing radicals in a redox reaction between various transition metal compounds and an initiator. Suitable initiators depend greatly on the details of the polymerization, including the types of monomers being used, the type of catalyst system, the solvent system and the reaction conditions. Simple organic halides are typically used as model halogen atom transfer initiators.

In ATRP, the introduction of a catalyst system to the reaction media is required to establish the equilibrium between active states (active polymer free radicals for the growth of the polymer) and dormant states (the formed inert polymer). The catalyst is typically a transition metal compound being capable of participating in a redox cycle with the initiator and a dormant polymer chain. The transition-metal compound used herein is a transition-metal halide. Any transition metal that can participate in a redox cycle with the initiator and dormant polymer chain, but does not form a direct C-metal bond with the polymer chain, is suitable in the present application. The exemplary transition metal includes $Cu^{1+}$, $Cu^{2+}$, $Fe^{2+}$, $Fe^{3+}$, $Ru^{2+}$, $Ru^{3+}$, $Ru^{4+}$, $Ru^{5+}$, $Ru^{6+}$, $Cr^{2+}$, $Cr^{3+}$, $Mo^{0}$, $Mo^{+}$, $Mo^{2+}$, $Mo^{3+}$, $W^{2+}$, $W^{3+}$, $Mn^{3+}$, $Mn^{4+}$, $Rh^{+}$, $Rh^{2+}$, $Rh^{3+}$, $Rh^{4+}$, $Re^{2+}$, $Re^{3+}$, $Re^{4+}$, $Co^{+}$, $Co^{2+}$, $Co^{3+}$, $V^{2+}$, $V^{3+}$, $V^{4+}$, $V^{5+}$, $Zn^{+}$, $Zn^{2+}$, $Au^{+}$, $Au^{2+}$, $Au^{3+}$, $Hg^{+}$, $Hg^{2+}$, $Pd^{0}$, $Pd^{+}$, $Pd^{2+}$, $Pt^{0}$, $Pt^{+}$, $Pt^{2+}$, $Pt^{3+}$, $Pt^{4+}$, $Ir^{0}$, $Ir^{+}$, $Ir^{2+}$, $Ir^{3+}$, $Ir^{4+}$, $Os^{2+}$, $Os^{3+}$, $Os^{4+}$, $Nb^{2+}$, $Nb^{3+}$, $Nb^{4+}$, $Nb^{5+}$, $Ta^{3+}$, $Ta^{4+}$, $Ta^{5+}$, $Ni^{0}$, $Ni^{+}$, $Ni^{2+}$, $Ni^{3+}$, $Nd^{0}$, $Nd^{+}$, $Nd^{2+}$, $Nd^{3+}$, $Ag^{+}$, and $Ag^{2+}$.

The ligand serves to coordinate with the transition metal compound such that direct bonds between the transition metal and growing polymer radicals are not formed, and the formed copolymer are isolated. The ligand can be any N—, O—, P—or S-containing compound that coordinates with the transition metal to form a σ-bond, any C-containing compound that coordinates with the transition metal to form a π-bond, or any C-containing compound that coordinates with the transition metal to form a C-transition metal σ-bond but does not form a C—C bond with the monomers under the polymerizing conditions.

The state of the art of ATRP has been reviewed by Matyjaszewski et al., "Atom Transfer Radical Polymerization," *Chemical Reviews* 101:2921-2990 (2001), which is hereby incorporated by reference in its entirety. More details for selection of initiators, catalysts/ligand system for ATRP reaction can be found in U.S. Pat. No. 5,763,548 to Matyjaszewski et al. and U.S. Pat. No. 6,538,091 to Matyjaszewski et al., which are hereby incorporated by reference in their entirety.

Further examples of ATRP can be found in U.S. Pat. No. 9,932,435, which is hereby incorporated by reference in its entirety.

A further aspect of the present application relates to a method of forming carbon fibers. The method includes producing a carbon fiber precursor by subjecting the lignin (meth)acrylate polymer product to a thermal treatment and extruding the thermally treated carbon fiber precursor to form carbon fibers. The production of the carbon fiber precursor involves heating the lignin (meth)acrylate polymer at a temperature of 100° C. to 230° C. Furthermore, the extruding is carried out a temperature of 100° C. to 230° C. In a further aspect of the present application, the method of forming the carbon fibers includes oxidizing and carbonizing the carbon fibers.

It is critical for the spinnability of the thermoplastic depolymerized lignin polymers into carbon fibers, that the polymers can actually be melted. The thermal treatment, supra, should be able to melt the thermoplastic depolymerized lignin polymers so that they may be extruded out of a spinneret. The thermoplastic lignin polymers must melt at a sufficiently low enough temperature that they may be spun, but not so low of a temperature that they are unable to go through the oxidative process without fusing together (Baker et al., "On the Characterization and Spinning of an Organic-Purified Lignin Toward the Manufacture of Low-Cost Carbon Fiber," *J Appl Polym Sci.* 124:227-234 (2012), which is hereby incorporated by reference in its entirety). The production of a carbon fiber of integrity (without having fused together, or become misshapen) depends on the ability to induce crosslinking in the polymer so that the $T_g$ of the polymer is maintained above the oxidation temperature during thermal ramping. Id. Typically the fibers are stabilized via an oxidative process at a temperature of 200-280° C. under air or an oxygen atmosphere (Fang et al., "Manufacture and Application of Lignin-Based Carbon Fibers (LCFs) and Lignin-Based Carbon Nanofibers (LCNFs)" *Green Chem.* 19:1749-1827 (2017), which is hereby incorporated by reference in its entirety). After oxidation, the lignin polymer based fibers are oxidized and condensed forming a crosslinked structure. Id. The fibers then proceed through a carbonization process to remove impurities in the fibers, and more fully crosslink the fiber. Id.

The formation of carbon fibers through melt spinning is well known in the art, and is disclosed in U.S. Pat. Nos. 5,149,517; 5,156,831; 4,606,872; 5,213,677; 4,005,183; 5,037,589; 4,628,001; and 4,606,808, which are hereby incorporated by reference in their entirety. In general, melt spinning entails melting the polymer of interest with heating in a spinning cylinder having a spinneret. The molten polymer is extruded out of the spinneret by pressurizing with a gas or by pressing with a piston into a filament which is wound up on a drum rotating at a constant velocity to give a continuous length polymer filament. The thus prepared filament is then subjected to an infusibilization treatment by heating in air up to a temperature of about 300° C., followed by carbonization in an inert gas into a carbon fiber. If desired, the carbon fiber is converted into a graphitized fiber by the calcination at a temperature of 2000° C., or higher. Other methods of forming of carbon fibers include dry-spinning, wet-spinning, and electro-spinning.

One embodiment of the present application relates to a carbon fibered prepared by producing a carbon fiber precursor, by subjecting the lignin (meth)acrylate polymer product to a thermal treatment and extruding the thermally treated carbon fiber precursor to form carbon fibers.

It is understood that the terms "carbon filaments", "carbon whiskers", "carbon fibers", and "carbon fibrils", are sometimes used interchangeably by those in the art, all of which, however, are herein contemplated by the present application. The elongated forms can be of any morphology, such as straight, branched, twisted, spiral, helical, coiled, ribbon-like, etc. and have a length of a few nanometers (nm) to several hundred microns.

The use of carbon fibers in reinforcing plastic and metal matrices has gained considerable commercial acceptance where the exceptional properties of the reinforced composite materials, such as their high strength to weight ratios, clearly offset the generally high costs associated with preparing them. It is generally accepted that large scale use of carbon fibers as a reinforcing material would gain even greater acceptance in the marketplace if the costs associated with the formation of the fibers could be substantially reduced. Much of the commercially available carbon fiber today is obtained by carbonizing synthetic polymers, such as poly-acrylonitrile. The high cost of such carbon fibers is due in part to the high cost of the polyacrylonitrile fiber being carbonized, the low yield of carbon fiber resulting therefrom and the processing steps necessary to maintain a desirable physical structure of the atoms in the fiber which will impart adequate strength to the resultant carbon fiber.

Further uses of carbon fibers include use as an electrode material in electrical energy storage devices. For example, carbon can be used as a component of the electrode in primary batteries, primary fuel cells, secondary fuel cells, secondary batteries and capacitors. The carbon material functions as a current collector and/or as a reactive material to form new compounds which have different structures and properties than the original carbon material, and most recently, as semiconductor materials which form salts with ions of the electrolyte. Examples of carbon fiber-based electrodes and batteries are described, for example, in U.S. Pat. Nos. 4,865,931; 5,518,836; 4,830,938; 4,952,466; and 4,929,521.

A final aspect of the present application relates to a mixture of lignin (meth)acrylate monomers and oligomers with acetate groups, wherein the lignin acrylate oligomers have an acrylic content of 1 to N acrylic units per oligomer. In one embodiment of the present application, the lignin methacrylate oligomers have a methacrylic content of 1 to N methacrylic units per oligomer. In another embodiment of the present application, the lignin (meth)acrylate oligomers have an acetate content of 1 to N acetate units per oligomer. In each of the above embodiments, N is the number average content of alcohol, ester, and phenolic groups in the mixture of the depolymerized lignin monomers and oligomers. In a further embodiment of the present application, the lignin (meth)acrylate oligomers have a number averaged molecular weight ranging from 1 Da to 10,000 Da.

Lignin, being a renewable and low-cost polymer, has many potential applications for the substitution of petroleum-based polymers. However, lignin has a random structure which varies based on extraction conditions. In this work, tunable lignin-based polymers were successfully synthesized via Reversible Addition-Fragmentation chain transfer polymerization of actual lignin derived phenolic oil (pyrolytic lignin). Pyrolytic lignin was functionalized with different amount of methacryloyl chloride and acetyl chloride, and then three typical polymers, namely PLMAP1, PLMAP2, and PLMAP3 were produced to investigate their molecular, thermal, and rheological properties. In further investigation, pyrolytic lignin was also functionalized with different amount of acryloyl chloride and acetyl chloride, and multiple polymers produced (LBAPs). Their molecular, thermal, and rheological properties were also studied. This work was the first to report synthesizing tunable lignin-based polymers directly from actual pyrolytic lignin via RAFT polymerization.

In a further embodiment of the present application the polymer is a lignin methacrylate polymer, or a lignin acrylate polymer.

In one aspect of the present application, the lignin (meth)acrylate polymer has a $T_g$ ranging from 0° C. to 300° C. Additionally, the lignin (meth)acrylate polymer can have a number averaged molecular weight ranging from 1 kDa to 10,000 kDa. Furthermore, the lignin (meth)acrylate polymer can have an amount of fixed carbon ranging from 1% to 50%.

An additional aspect of the present application relates to an engineering thermoplastic composition including the thermoplastic polymer formed by the methods disclosed herein.

Preferences and options for a given aspect, feature, embodiment, or parameter of the technology described herein should, unless the context indicates otherwise, be regarded as having been disclosed in combination with any and all preferences and options for all other aspects, features, embodiments, and parameters of the technology.

EXAMPLES

The following Examples are presented to illustrate various aspects of the present application, but are not intended to limit the scope of the claimed invention.

Materials for Examples 1-9

The lignin bio-oil used in this study was provided by the BioCentury Research Farm of Iowa State University. The process for producing the bio-oil is described elsewhere (Rover et al., "Stabilization of Bio-Oils Using Low Temperature, Low Pressure Hydrogenation," *Fuel* 153:224-230 (2015)). Briefly, red oak (*Quercus rubra*) was fast pyrolyzed at 500° C. in a fluidized reactor equipped with a condenser train. The recovered bio-oil was washed with cold water to isolate lignin bio-oil, also called pyrolytic lignin (PL). Methylene chloride (DCM), triethylamine (TEA), methacryloyl chloride (MC), acetyl chloride (AC), sodium bicarbonate, 1,4-dioxane and 2,2-azobisisobutyronitrile (AIBN) were purchased from Sigma Aldrich. The as-received AIBN was purified and recrystallized in methanol and stored at −20° C. prior to use. Chain transfer agent was synthesized in the lab (2-cyanopropan-2-yl methyl carbonotrithioate, CYCART) (WO2018009830A1 to Cochran et al., published Jan. 11, 2018, which is hereby incorporated by reference in its entirety) and stored at −20° C. All the phenolic monomers used for calibrations were purchase from Sigma Aldrich.

Example 1—Pyrolytic Lignin Functionalization with Methacrylate

The polymer synthesis included two steps: esterification of PL followed by RAFT polymerization of the esterified PL. In this study, the PL esterification was carried out using three different methods. The amounts of MC and AC used for each case are summarized in Table 1. In the first method, hydroxyl groups in PL were fully methacrylated; in the second method, hydroxyl groups were partially methacrylated; in the third method, hydroxyl groups were also partially methacrylated and the residual hydroxyl groups were subsequently acetylated. Typical functionalization process of PL is described as below: 15 g of PL was dissolved in 300 mL of DCM and then stirred vigorously for 30 mins. Next, TEA was added in the solvent followed by adding an equal amount mole of MC dropwise. The sample was left inside a fume hood at room temperature for overnight reaction. Next, 200 mL of deionized (DI) water was added into the solution and stirred for 30 mins. Afterwards, the functionalized PL (PL methacrylate, PLMA) in DCM was collected using a separating funnel. In the case of acetylation, the methacrylated PL was further acetylated with an excess amount of AC and equal mole of TEA to eliminate residual hydroxyls. Finally, the PLMA was washed with DI water again, followed by washing with sodium bicarbonate solution (8 g/100 mL) twice to remove remaining acid. The PLMA in DCM was first rotary evaporated and further dried in a vacuum oven overnight to eliminate DCM. Based on the amount of MC and AC added, three PLMAs, denoted as PLMA1, PLMA2, and PLMA3 were obtained.

TABLE 1

Functionalization processes for obtaining PLMAs

|  |  | PLMA1 | PLMA2 | PLMA3 |
|---|---|---|---|---|
|  |  | (mol/mol PL) | | |
| Step 1 | MC | 3.04 | 1 | 1 |
|  | TEA | 3.04 | 1 | 1 |
| Step 2 | AC | 2 | 0 | 4 |
|  | TEA | 2 | 0 | 4 |

Example 2—Polymerization of Lignin Methacrylate

Five grams of PLMAs produced from the above processes were dissolved in 15 mL of 1,4-dioxane in a flask. AIBN (1 wt %) and CTA were added to the solution. The molar ratio of PL to CTA was 35, based on the PL number average molecular weight as determined by Gel Permeation Chromatography (Table 2). The flask was then sealed and purged with argon for 30 mins. After purging, the flask was transferred to an oil bath at 90° C. for polymerization. The reaction was conducted for 4 hrs. After reaction, the solutions were cooled to room temperature and then vacuum dried at room temperature overnight to eliminate 1,4-dioxane. The PL methacrylate polymers (PLMAP1, PLMAP2, and PLMAP3) were then precipitated in methanol twice and further dried in the vacuum oven. The yield of the polymer was calculated by dividing the mass of the final PLMAPs over the initial mass of PLMAs.

TABLE 2

Quantified compositions of PL

| Compounds | Yield (%) |
|---|---|
| Phenol[1] | 0.10 |
| 2-Methoxy phenol[2] | 0.14 |
| 2-Methoxy-5-methylphenol[3] | 0.11 |
| 2,5-Dimethyl phenol[1] | 0.10 |
| 4-Ethyl-2-methoxy-phenol[2] | 0.03 |
| 2-Methoxy-4-vinylphenol[2] | 0.37 |
| 3-Allyl-6-methoxyphenol[2] | 0.18 |
| 2-Methoxy-4-propyl phenol[2] | 0.53 |
| 2,6-Dimethoxy phenol[3] | 0.35 |
| Trans-isoeugenol[2] | 1.31 |
| 1,2,4-Trimethoxybenzene | 0.12 |
| 2,6-dimethoxy-4-(2-propenyl) phenol[3] | 0.47 |
| 4-hydroxy-3,5-dimethoxy benzaldehyde[3] | 0.13 |
| 1-(4-hydroxy-3,5-dimethoxyphenyl) ethenone[3] | 0.08 |
| Sum of total monomers | 4.02 |
| Phenolic oligomers* (GC/MS non-identifiable compounds) | 95.98 |

[1]H-type;
[2]G-type;
[3]S-type;
*By difference.

Characterization Methods

Example 3—Fourier Transform Infrared (FTIR) Spectroscopy

Fourier Transform Infrared (FTIR) analysis was conducted using a Thermo Scientific Nicolet iS10 (Thermo Fisher Scientific Inc., Waltham, MA) equipped with a Smart iTR accessory. The wave numbers of the FTIR analysis ranged from 750 $cm^{-1}$ to 4000 $cm^{-1}$. Each sample was scanned 32 times at a resolution of 4 $cm^{-1}$ and interval of 1 $cm^{-1}$. The FTIR spectra of PL, PLMA1, PLMA2, and PLMA3 can be seen in FIG. 3.

Example 4—Gas Chromatography/Mass Spectrometry (GC/MS)

Figure 4:
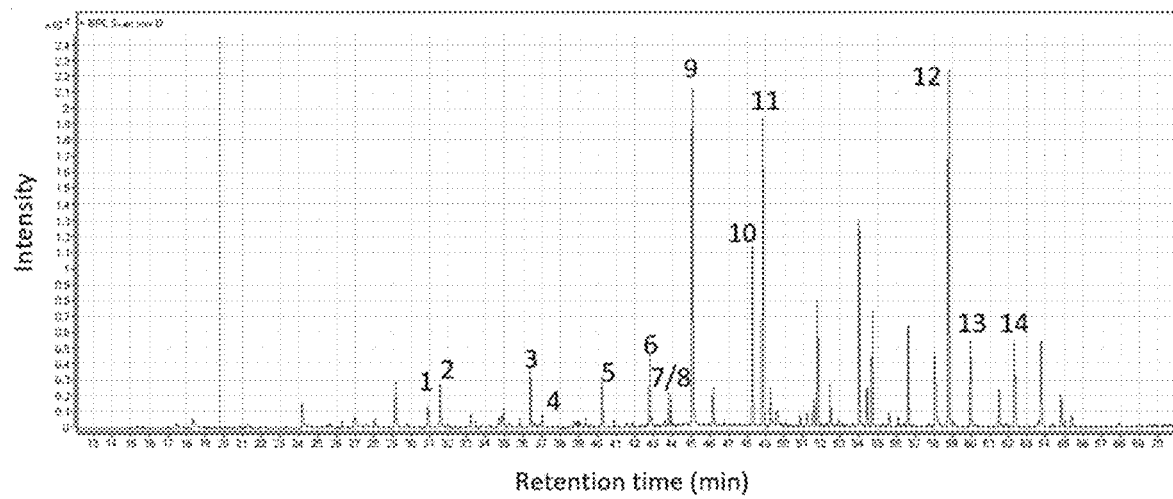
FIG. 4 a Gas Chromatography/Mass Spectrometry chromatogram of pyrolytic lignin, with phenolic monomers identified. The GC/MS detectable phenolic monomers in PL include: 1: Phenol; 2: 2-methoxy phenol; 3: 2-methoxy-5-methylphenol; 4: 3,5-dimethyl phenol; 5: 3,4-dimethyl phenol; 6: 2-methoxy-4-vinylphenol; 7: 3-Allyl-6-methoxyphenol; 8: 2-methoxy-4-propyl phenol; 9: 2,6-dimethoxy phenol; 10: trans-isoeugenol; 11: 1,2,4-Trimethoxybenzene; 12: 2,6-dimethoxy-4-(2-propenyl) phenol; 13: 4-hydroxy-3,5-dimethoxy benzaldehyde; 14: 1-(4-hydroxy-3,5-dimethoxyphenyl) ethanone.

An Agilent 7890B gas chromatograph (GC) with Agilent 5977A mass-selective-detector (MSD) and flame ionization detector (FID) system was used to identify the monomer composition in PL. The capillary column used in the GC was a ZB-1701 (60 m×250 mm×0.25 mm). The injection temperature at the GC was 250° C. The oven temperature was kept at 40° C. for 3 mins and then ramped to 280° C. at 3° C./min. The yields of phenolic monomers in PL were determined based on calibration curves of standard chemicals. An exemplary chromatogram of PL appears in FIG. 4.

Example 5—Gel Permeation Chromatography (GPC)

Figure 5:
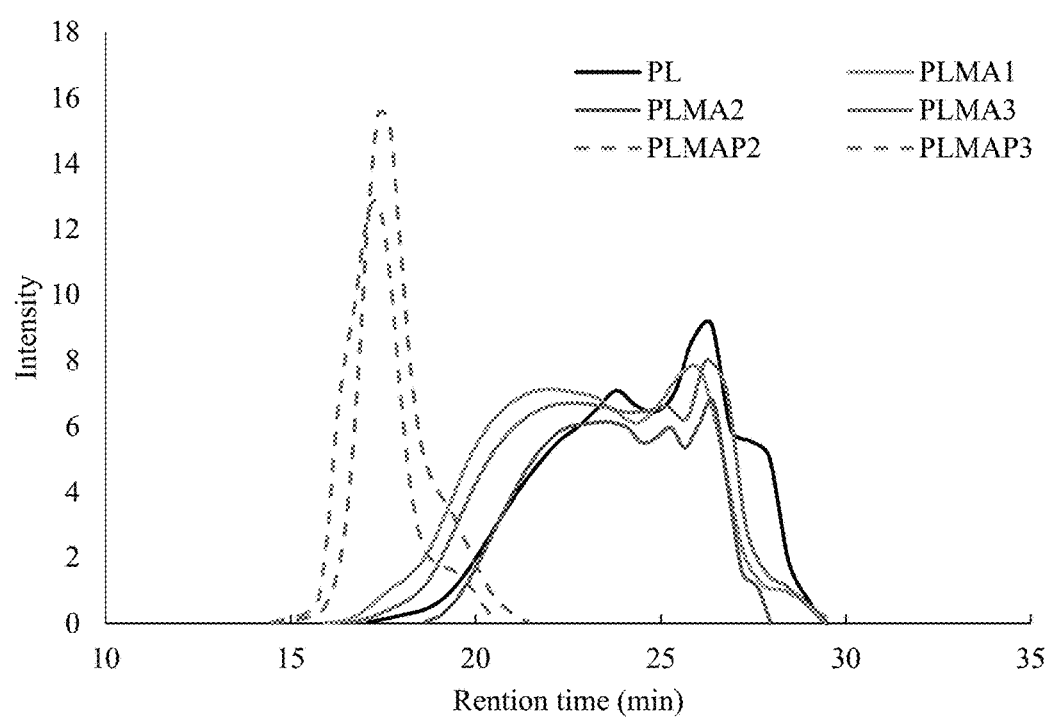
FIG. 5 is the Gel permeation chromatography (GPC) chromatograms of PL, functionized PL (PLMA1, PLMA2, PLMA3) and PL polymers (PLMAP2 and PLMAP3).

Gel permeation chromatography (GPC) analysis was conducted using Dionex Ultimate 3000 series high performance liquid chromatography (HPLC) equipped with a Shodex Refractive Index (RI) and Diode Array Detectors (DAD). A UV detector (254 nm) was used to detect the peaks. A GPC column was calibrated with six monodisperse polystyrene standards ranging from 162 g/mol to 45120 g/mol. Tetrahydrofuran (THF) was used as both the solvent and eluent in the column. The viscosity measurement was conducted using a Malvern 270 Dual detector. The GPC chromatograms of PL, functionalized PL, and PLMAP2 and PLMAP3 are shown in FIG. 5.

Example 6—Differential Scanning Calorimetry (DSC)

Figure 6:
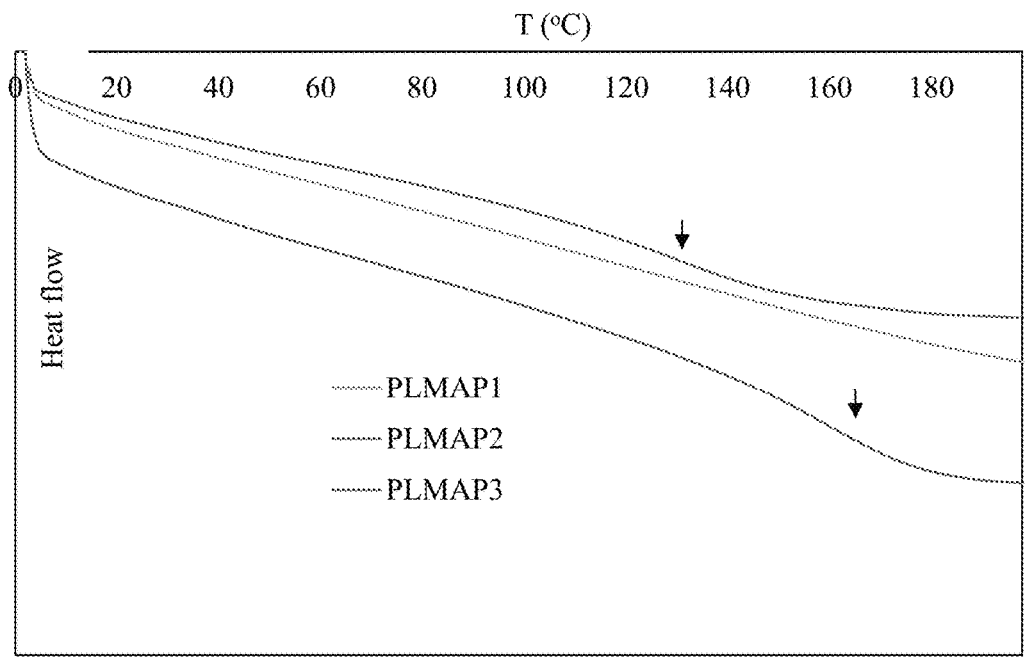
FIG. 6 is the Differential Scanning calorimetry (DSC) curves for the PL polymers PLMAP1, PLMAP2, and PLMAP3.

Glass transition temperature, $T_g$, was determined using a differential scanning calorimeter (DSC, Q2000, TA instruments). First, about 5 mg of sample was rapidly heated to 200° C. and then cooled to 0° C. to eliminate thermal history. Subsequently, the sample was reheated to 200° C. at a heating rate of 10° C./min to determine $T_g$. Nitrogen with a flow rate of 50 mL/min was used as the purge gas. The midpoint $T_g$ of the polymer was determined using the TA software. The DSC curves for the PLMAPs are shown in FIG. 6.

Example 7—Thermogravimetric Analysis (TGA)

Thermal stability of PLMAPs was determined using a thermal gravimetric analyzer (TGA/DSC 1 STARe system, Mettler Toledo). About 10 mg samples were first dried in the vacuum oven at 40° C. overnight and then pyrolyzed by the TGA at 10° C./min using nitrogen (FIG. 7A) or air gas (FIG. 7B) with a flow rate of 100 mL/min until the temperature reached 1000° C. The thermal decomposition temperature ($T_d$) was defined as the temperature corresponding to a 5% of mass loss.

Example 8—Melt-State Rheological Study

Figure 8A:
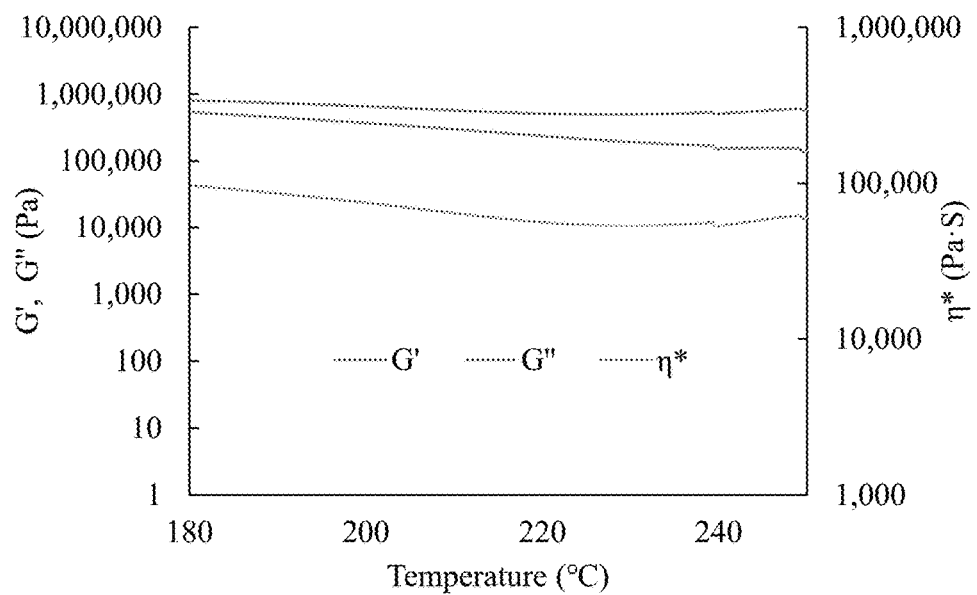
FIGS. 8A-8C are the rheological plots of PLMAP1, PLMAP2, and PLMAP3, respectively. G'-storage modulus; G"-loss modulus; η*-complex viscosity.
Figure 8B:
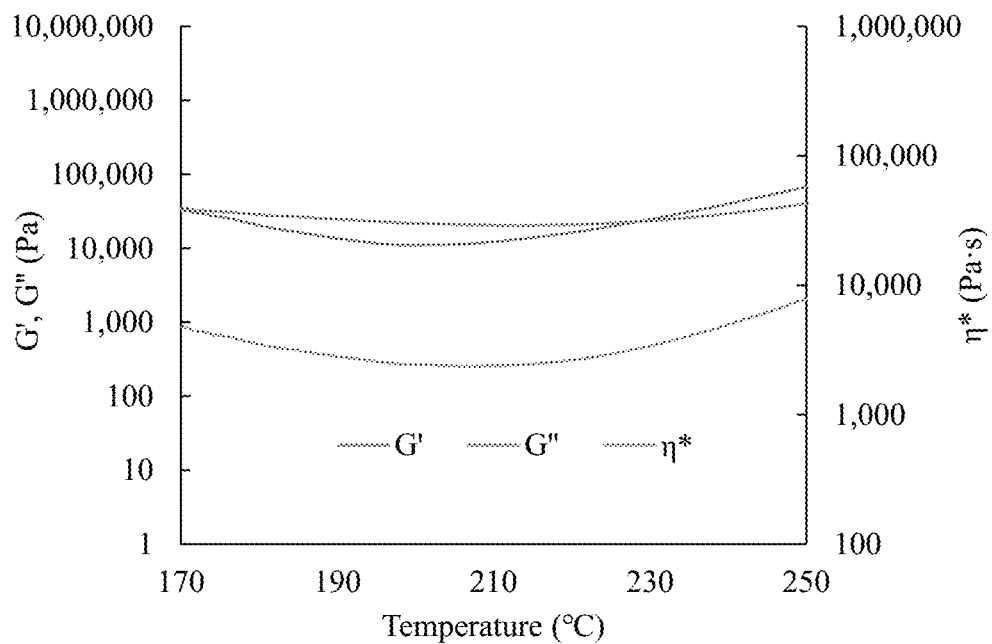
Figure 8C:
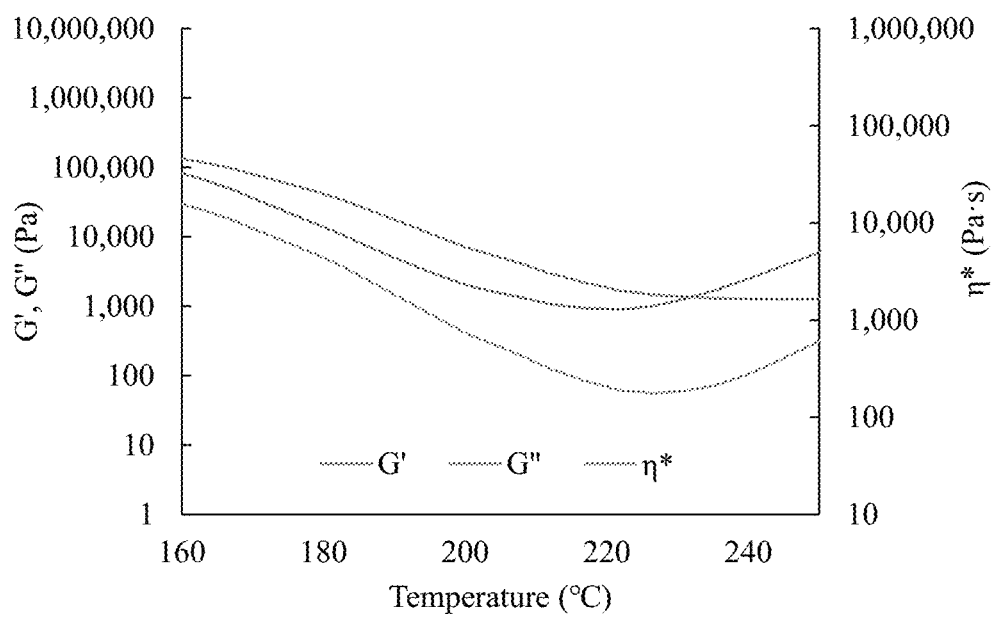
Figure 9A:
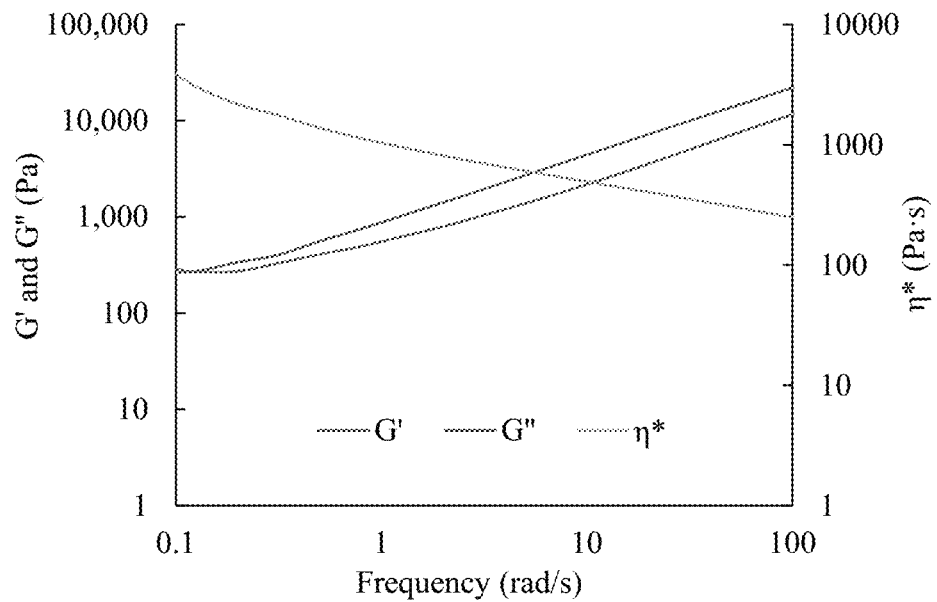
FIGS. 9A-9B are rheological plots for PLMAP3.
Figure 9B:
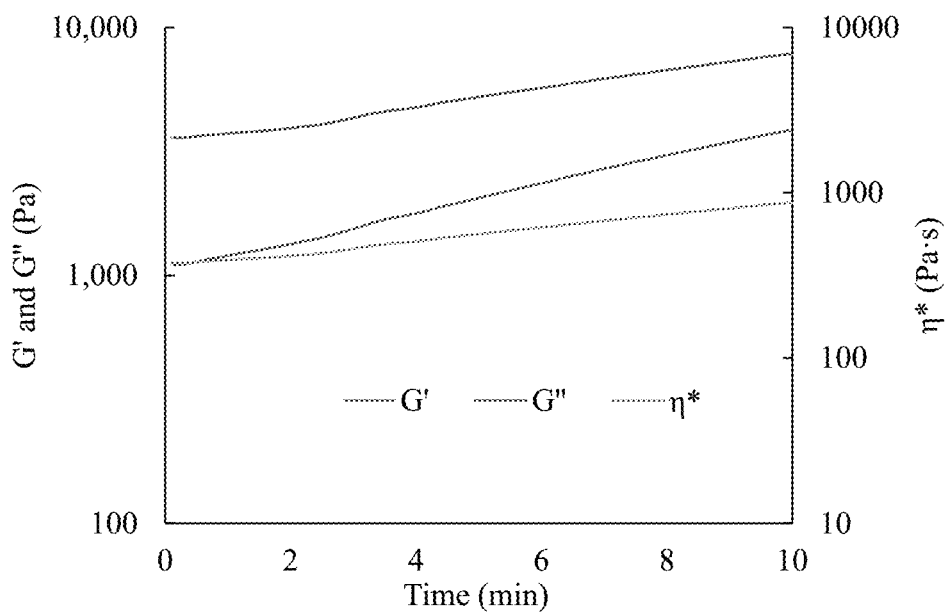

Rheology analysis of the PLMAPs was performed using a Discovery hybrid rheometer (DHR-2, TA Instruments) with 25 mm parallel-plate geometry. Temperature ramps were conducted with a maximum temperature of 250° C., fixed angular frequency of 10 rad/s and strain of 1.25%. The rheological plots of the PLMAPs are shown in FIGS. 8A-8C. For PLMAP3, frequency sweeps at 210° C. were conducted for angular frequencies between 0.1 and 100 rad/s at fixed strain of 1.25% (FIG. 9A). Isothermal time sweep was conducted at 210° C. (FIG. 9B).

Example 9—Nuclear Magnetic Resonance (NMR) Spectroscopy $^1$H NMR spectroscopy of PL and PLMAs was conducted using Bruker Biospin Advance 600 MHz, and CDCl$_3$ as solvent with 4-nitrobenzaldehyde as internal standard (IS). PL was fully acetylated with acetyl chloride prior to the analysis. For quantification of C=C, the peak difference between 6-7 ppm for acetylated PL and PLMAs were used. The integration of peaks, masses of PLMAs and IS, were provided in FIGS. 10A-10D and Table 3. $^1$H-$^{13}$C correlation NMR (2D NMR) spectroscopy of the acetylated PL with DMSO as solvent was also conducted and analyzed according to reference (McClelland et al., "Functionality and Molecular Weight Distribution of Red Oak Lignin Before and After Pyrolysis and Hydrogenation," *Green Chem.* 19(5):1378-1389 (2017), which is hereby incorporated by reference in its entirety). The 2D NMR spectrum of acetylated PL is shown in FIG. 11.

TABLE 3

Datasheet used for quantification of added C=C for PLMAs

| | Mw (Da) | Mass (mg) | Internal standard (mg) | Peak area (6-7 ppm) | C=C in PLMAs (mol/mol) |
|---|---|---|---|---|---|
| PL* | 600* | 24.75 | 4.02 | 5.07 | — |
| PLMA1 | 1046 | 23.5 | 3.99 | 8.88 | 3.58 |
| PLMA2 | 561 | 23.97 | 2.83 | 11.06 | 0.78 |
| PLMA3 | 803 | 24.12 | 4.05 | 6.51 | 1.26 |

*PL after acetylation

Discussion of Examples 1-9

Characterizations of Pyrolytic Lignin

The PL was a highly viscous liquid at room temperature with a good solubility in several different polar solvents such as THF, acetone, and methanol. This differentiates PL from technical lignin as usually lignin has to be esterified to enhance its solvent solubility (Dodd et al., "Characterization of Fractions Obtained from Two Industrial Softwood Kraft Lignins," *ACS Sustainable Chem. Eng.* 3(1):103-110 (2015), which is hereby incorporated by reference in its entirety). Since carbohydrate-derived compounds were removed during water washing of bio-oil, PL consists of various phenolics derived from lignin (McClelland et al., "Functionality and Molecular Weight Distribution of Red Oak Lignin Before and After Pyrolysis and Hydrogenation," *Green Chem.* 19(5):1378-1389 (2017), which is hereby incorporated by reference in its entirety). The weight average molecular weight ($M_w$) of PL was 566 g/mol and its dispersity was 2.44 (the GPC chromatogram is given in FIG. 5). In comparison, the $M_w$ of red oak lignin were 1769~5364 g/mol, depending on lignin isolation method (Zhou et al., "Lignin Valorization Through Thermochemical Conversion: Comparison of Hardwood, Softwood and Herbaceous Lignin," *ACS Sustainable Chem. Eng.* 4:6608-6617 (2016), which is hereby incorporated by reference in its entirety). Since lignin is made of three monolignols (i.e., P-coumaryl alcohol, coniferyl alcohol and sinapyl alcohol) with their respective molecular weights of 150, 180 and 210 g/mol (Bayerbach et al., "Characterization of the Water-Insoluble Fraction from Fast Pyrolysis Liquids (Pyrolytic Lignin)," *J. Anal. Appl. Pyrolysis* 77(2):95-101 (2006), which is hereby incorporated by reference in its entirety), the weight average degree of polymerization of the PL is about 3. From the GC/MS chromatogram of PL (given in FIG. 4), phenolic monomers containing hydroxyl, methoxyl, methyl, propanol, vinyl and/or aldehyde groups were identified, and their yields were given in Table 2. As shown, the yields of total monomers were only 4.02% of PL, with relative contents of S, G and H-type monomers to be 31%, 64% and 5%, respectively. The rest of the fraction that accounts for 95.98% of PL mass could not be detected by the GC, which is composed of mainly lignin-derived phenolic oligomers containing multi-hydroxyls per molecules. The GC chromatography is capable of only detecting the compounds with low molecular weights (<200 g/mol) and with sufficient volatility. Thus, most lignin-derived phenolic oligomers are not identifiable by GC/MS due to their larger molecular weights and low volatility despite that they are abundantly present in PL (Bayerbach and Meier, "Characterization of the Water-Insoluble Fraction from Fast Pyrolysis Liquids (Pyrolytic Lignin). Part IV: Structure Elucidation of Oligomeric Molecules," *J. Anal. Appl. Pyrolysis* 85(1-2):98-107 (2009), which is hereby incorporated by reference in its entirety). Even some compound peaks showed up in the GC/MS chromatogram, their exact molecular structures cannot be determined based on current NIST database library. The plausible structures of the oligomers in PL are previously suggested and given in the literature (Bayerbach et al., "Characterization of the Water-Insoluble Fraction from Fast Pyrolysis Liquids (Pyrolytic Lignin)," *J. Anal. Appl. Pyrolysis* 77(2):95-101 (2006), which is hereby incorporated by reference in its entirety).

The complexity of PL composition is further evident from the FTIR and NMR results. In the FTIR spectrum of PL given in FIG. 3, the broad peak appearing at near 3400 cm$^{-1}$ corresponds to hydroxyls. Peaks representing methyl/methylene (2842-3000 cm$^{-1}$), carbonyls (1738 cm$^{-1}$), esters (1221 cm$^{-1}$), and ether bonds (1080 cm$^{-1}$) were also observed. The 2D-NMR spectrum of PL is given in FIG. 11. From the spectrum, aromatic ($\delta_C$-$\delta_H$ 100-150/6-7.5 ppm), syringyls 2/6 (S and S'), guaiacyls 2/5/6 (G) derived units, benzaldehydes (X3) and cinnamaldehyde (X2) units were identified. In addition to the above, oxygenated aliphatic groups ($\delta_C$-$\delta_H$ 50-100/3-4 ppm) attached to aromatic rings were also identified (McClelland et al., "Functionality and Molecular Weight Distribution of Red Oak Lignin Before and After Pyrolysis and Hydrogenation," *Green Chem.* 19(5):1378-1389 (2017); Fernandez-Costas et al., "Structural Characterization of Kraft Lignins from Different Spent Cooking Liquors by 1D and 2D Nuclear Magnetic Resonance Spectroscopy," *Biomass Bioenergy* 63:156-166 (2014), which are hereby incorporated by reference in their entirety). The $^1$H-NMR spectra shown in FIG. 10A was used to quantify the contents of phenolic hydroxyls ($\delta$ 2.20-2.35 ppm), aliphatic hydroxyls ($\delta$ 2.00-2.10 ppm) and methoxyls ($\delta$ 3.75-4.00 ppm). The contents of phenolic hydroxyls and aliphatic hydroxyls were 2.58 mol/mol and 0.46 mol/mol, giving the total amount of hydroxyls in average PL molecules to be 3.04 mol/mol. For the PL compounds, aromatic hydroxyls could include phenolic and catecholic hydroxyls, and aliphatic hydroxyls include hydroxyls on both primary and secondary alcohols. The amount of methoxy groups in PL was 1.59 mol/mol although syringol unit is predominant in hardwood lignins. The amount of methoxyls was reduced in PL due to demethoxylation during lignin pyrolysis (Zhou et al., "Lignin Valorization Through Thermochemical Conversion: Comparison of Hardwood, Softwood and Herbaceous Lignin," *ACS Sustainable Chem. Eng.* 4:6608-6617 (2016), which is hereby incorporated by reference in its entirety). The GPC and $^1$H-NMR results of PL are summarized in Table 4.

TABLE 4

GPC and $^1$H NMR results of PL

| GPC | | | $^1$H NMR (mol/mol PL) | | |
|---|---|---|---|---|---|
| $M_w$ (g/mol) | $M_n$ (g/mol) | Dispersity | Phenolic OH | Aliphatic OH | Methoxyl |
| 566 | 231 | 2.44 | 2.58 | 0.46 | 1.59 |

Functionalization of PL to PLMs

Figure 12A:
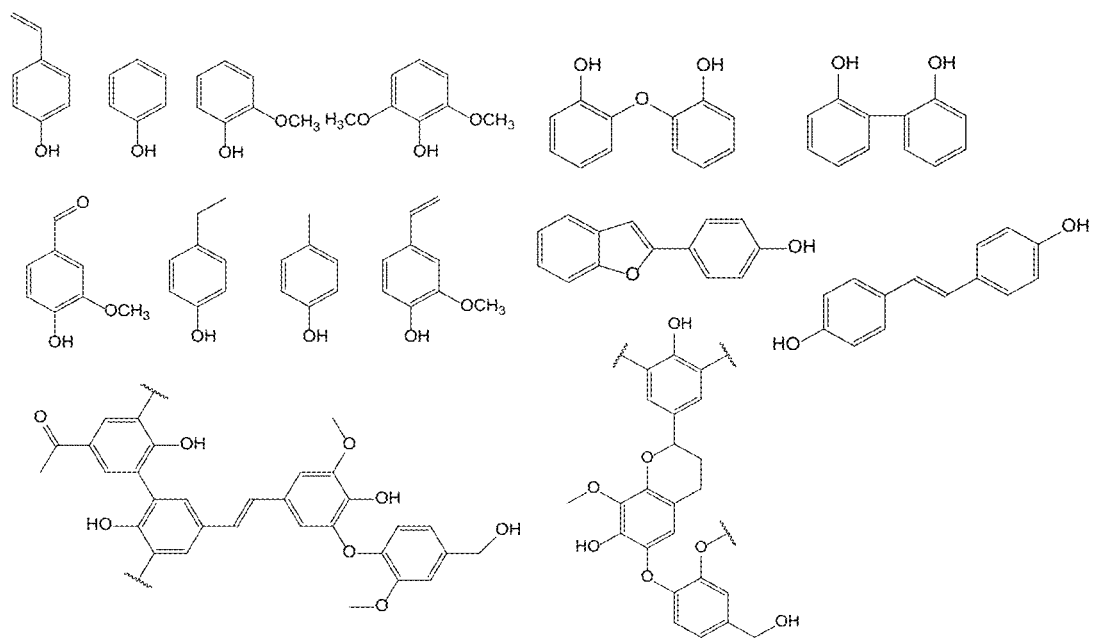
FIGS. 12A-12B show the proposed structures of PL and the PLMAs.
Figure 12B:
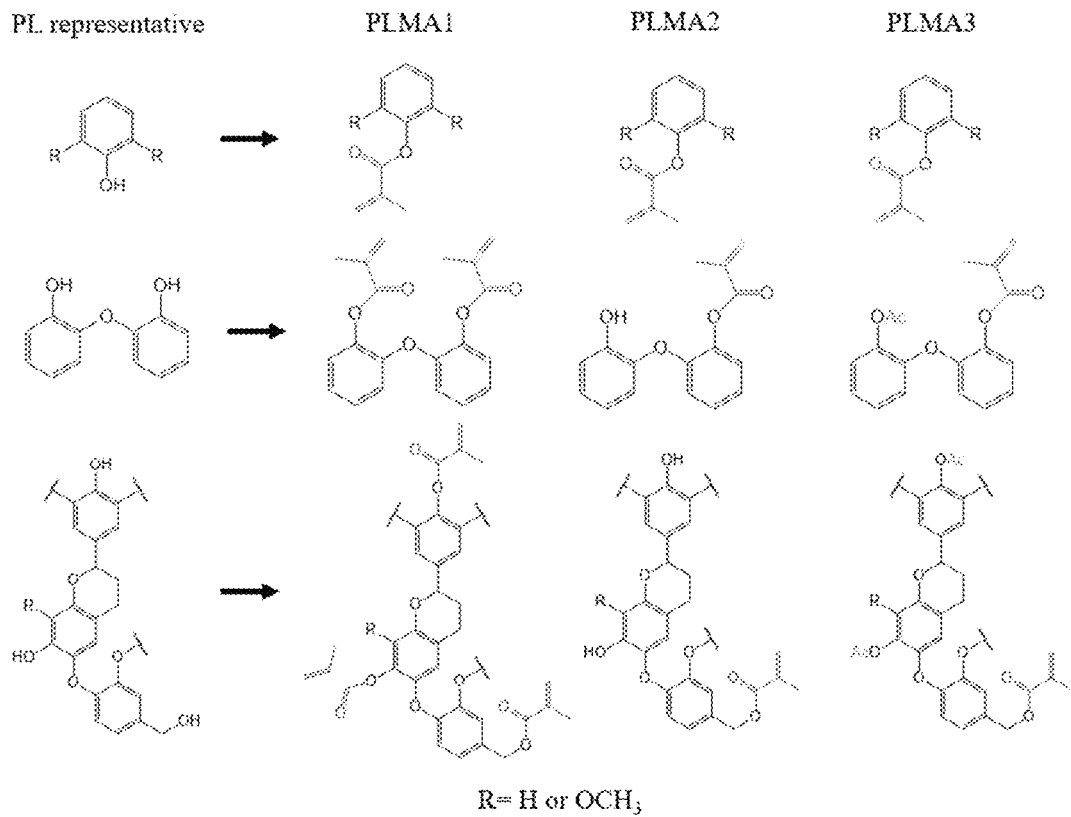

The abundant hydroxyl groups in PL serve as the most accessible sites for esterification. Lignin esterification with methacrylate has been reported as early as 1975 using either methacrylic anhydride or methacryloyl chloride (Naveau, Methacrylic derivatives of lignin," *Cellulose Chemistry and Technology* (1975), which is hereby incorporated by reference in its entirety), and several subsequent reports have followed these approaches for lignin esterification (Holmberg et al., "Biobased Building Blocks for the Rational Design of Renewable Block Polymers," *Soft Matter* 10(38): 7405-7424 (2014); Stanzione et al., "Lignin Model Compounds as Bio-Based Reactive Diluents for Liquid Molding Resins," *ChemSusChem* 5(7):1291-1297 (2012); Thielemans and Wool, "Lignin Esters for Use in Unsaturated Thermosets: Lignin Modification and Solubility Modeling," *Biomacromolecules* 6(4):1895-1905 (2005); Holmberg et al., "Biobased Building Blocks for the Rational Design of Renewable Block Polymers," *Soft Matter* 10(38):7405-7424 (2014), which are hereby incorporated by reference in their entirety). We have found that the acid chloride route most efficiently yields the desired products without necessitating significant subsequent purification steps; it should be noted that an optimized and sustainable esterification process would be desirable for translation to commercial practice. The reaction schemes of typical monomers and oligomers in PL (whose structures are shown in FIG. 12A) based on the three proposed functionalization methods are illustrated in FIG. 12B. All resulting PLMAs were flowable at room temperature, but their viscosity increased compared to PL. Their respective molecular weights are given in Table 5 (their GPC chromatograms can be found in FIG. 5). The $M_w$ of PLMA1, fully methacrylated, increased to over 1000 g/mol due to the substitution of hydroxyls with methacrylic groups. PLMA2, partially methacrylated, had similar $M_w$ as that of PL but a decreased dispersity. Since hydroxyls of PL were partially esterified, it is possible that some hydroxyl-containing molecules with stronger polarity remained as DCM insoluble. Only less polar molecules were dissolved and recovered as PLMA2, thus reporting the reduced $M_w$ and dispersity. The $M_w$ of PLMA3, corresponding to partial methacrylation followed by acetylation, increased to over 800 g/mol due to the introduction of both methacrylate and acetyl groups. Since the hydroxyls were fully esterified, the polarities of all species were reduced and all the molecules after esterification were able to be dissolved in DCM and recovered as PLMA3.

TABLE 5

GPC and $^1$H NMR results of PLMAs

| | PLMA1 | PLMA2 | PLMA3 |
|---|---|---|---|
| | GPC | | |
| $M_w$ (g/mol) | 1046 | 561* | 803 |
| $M_n$ (g/mol) | 399 | 355* | 361 |
| Dispersity | 2.62 | 1.58* | 2.22 |
| | $^1$H NMR | | |
| Calculated C=C (mol/mol) | 3.58 | 0.78 | 1.26 |

*DCM soluble fraction only

Figure 3:
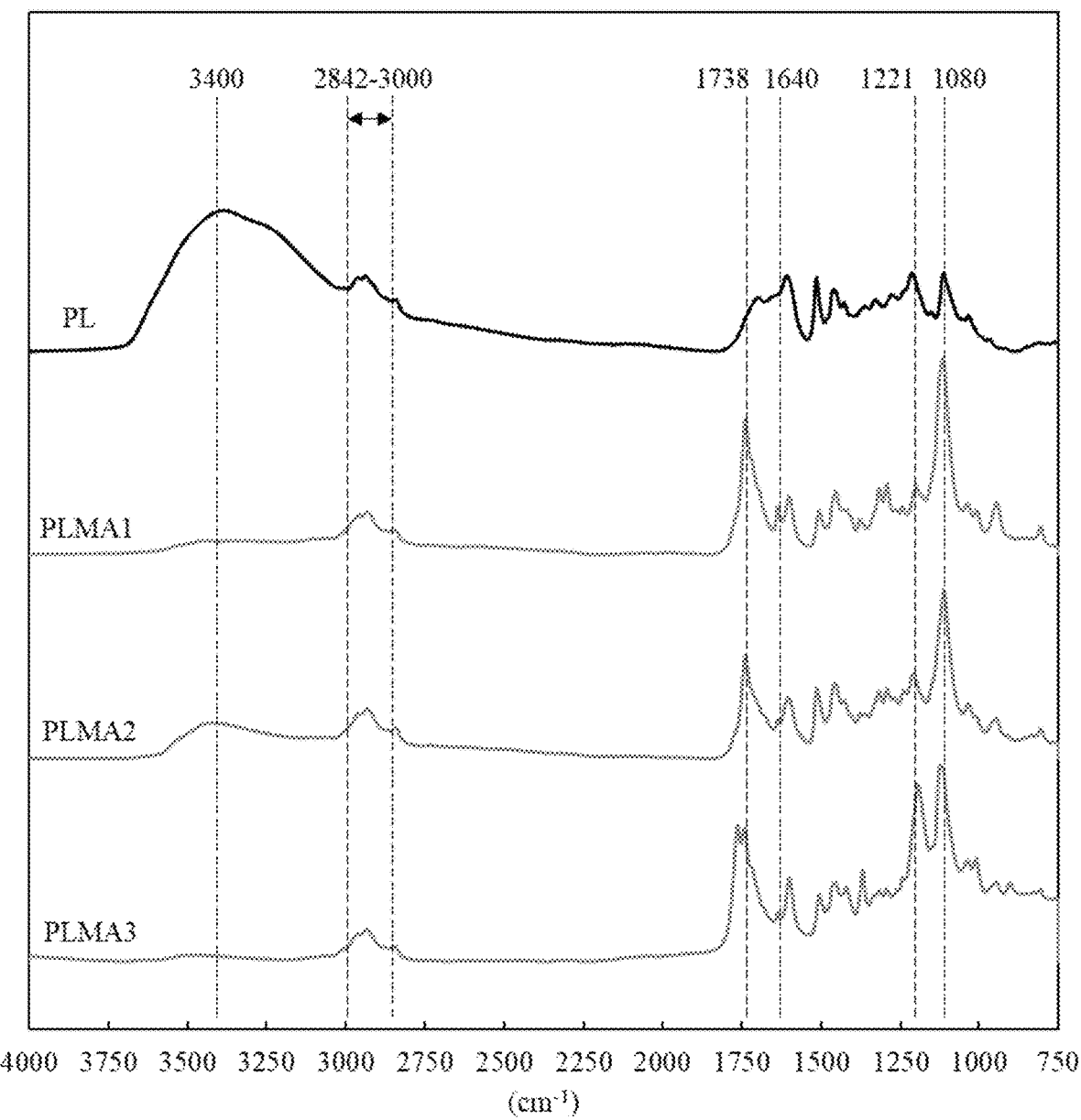
FIG. 3 is the Fourier-transform infrared spectroscopy (FTIR) spectra of pyrolytic lingnin, and the methacrylated pyrolitic lignin monomers and oligomers (PLMAs).

FTIR spectra of PLMAs are also shown in FIG. 3 to compare with the spectra of PL. The peaks at 3400 cm$^{-1}$ indicative of hydroxyl dramatically decreased for both PLMA1 and PLMA3, which imply a thorough functionalization. In comparison, this peak was much more pronounced in PLMA2 since some of hydroxyl groups were intentionally left unesterified. In the spectra, the appearance of peaks at 1750 cm$^{-1}$ (C=O), 1240 cm$^{-1}$ (acetyl-O-aromatics), and 1080 cm$^{-1}$ (C—O) are indicative of successful introduction of methacrylates (and acetyls in PLMA3). The peak at 1640 cm$^{-1}$ is a good indicator of C=C bonds (Stanzione et al., "Lignin-Based Bio-Oil Mimic as Biobased Resin for Composite Applications," *ACS Sustainable Chem. Eng.* 1(4):419-426 (2013), which is hereby incorporated by reference in its entirety). This peak was not identifiable in PL, probably because of its low abundancy, but it became noticeable in all the PLMAs. The C=C peak was most intense at PLMA1 due to a higher extent of hydroxyl substitution by methacrylate. PLMA2 and PLMA3 showed smaller C=C peaks since they were both partially methacrylated.

Figure 10A:
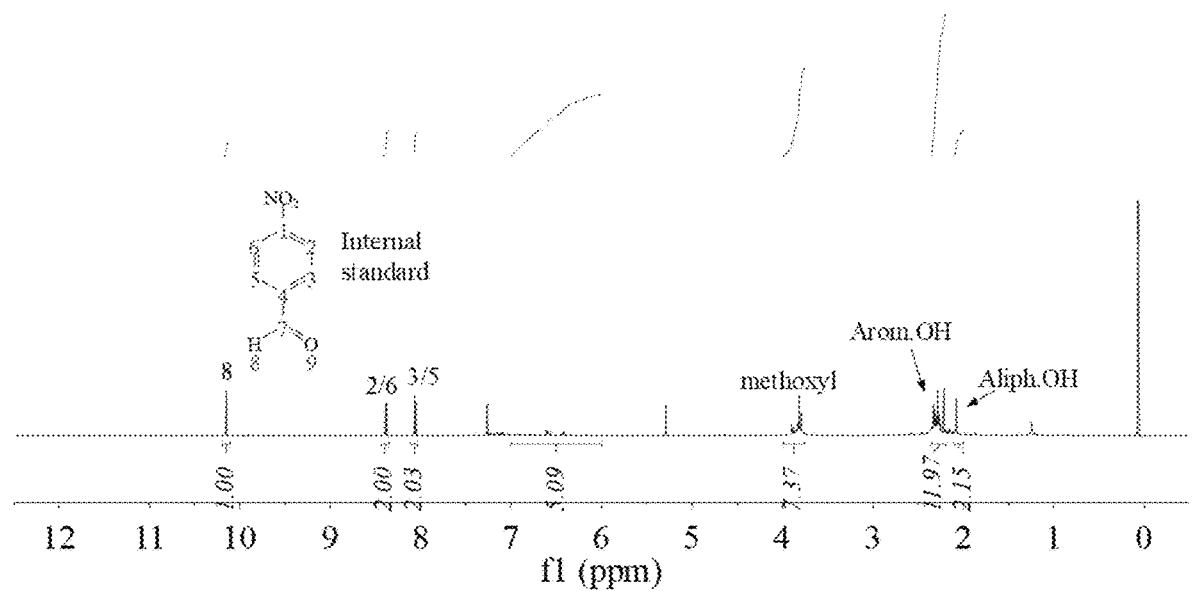
FIGS. 10A-10D are proton NMR spectra of acetylated PL (FIG. 10A); PLMA1 (FIG. 10B); PLMA2 (FIG. 10C); and PLMA3 (FIG. 10D).
Figure 10B:
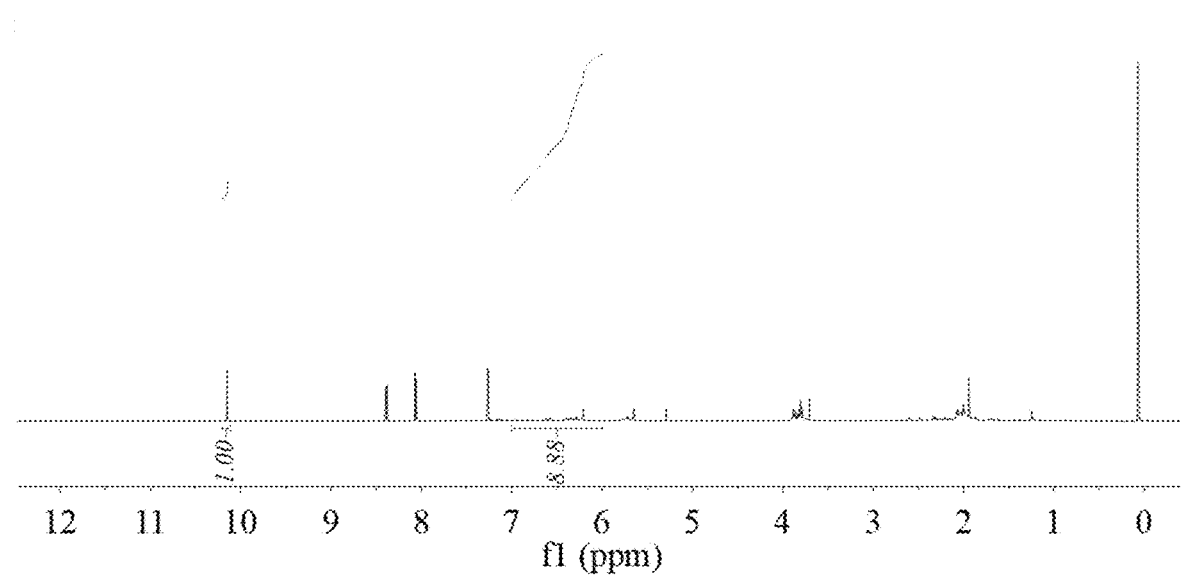
Figure 10C:
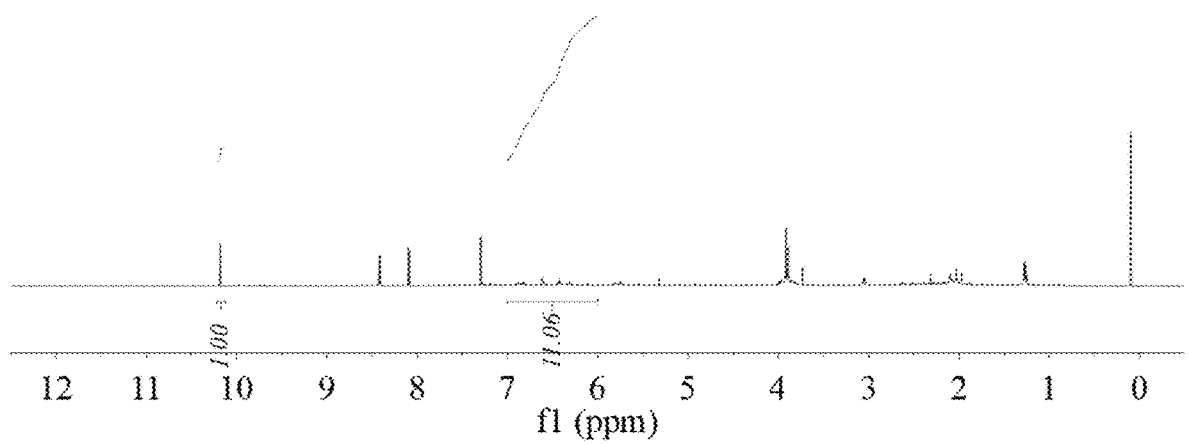
Figure 10D:
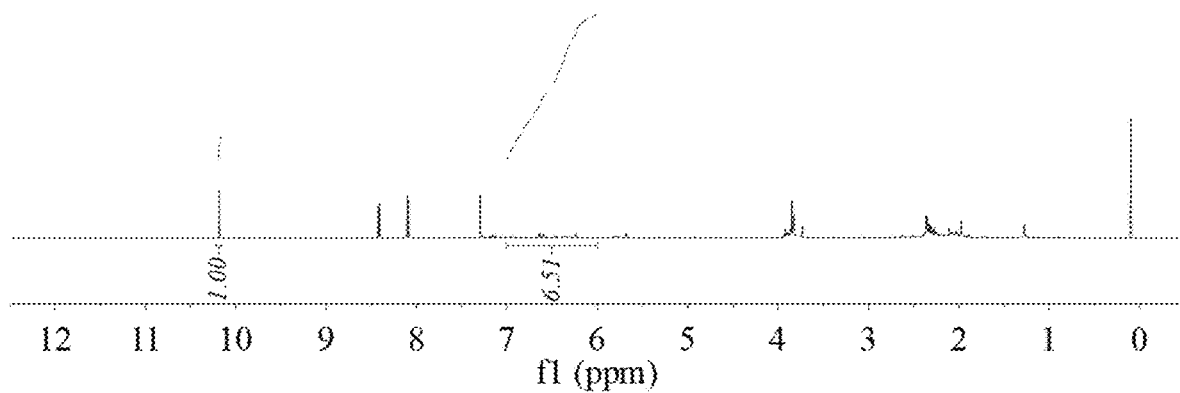
Figure 11:
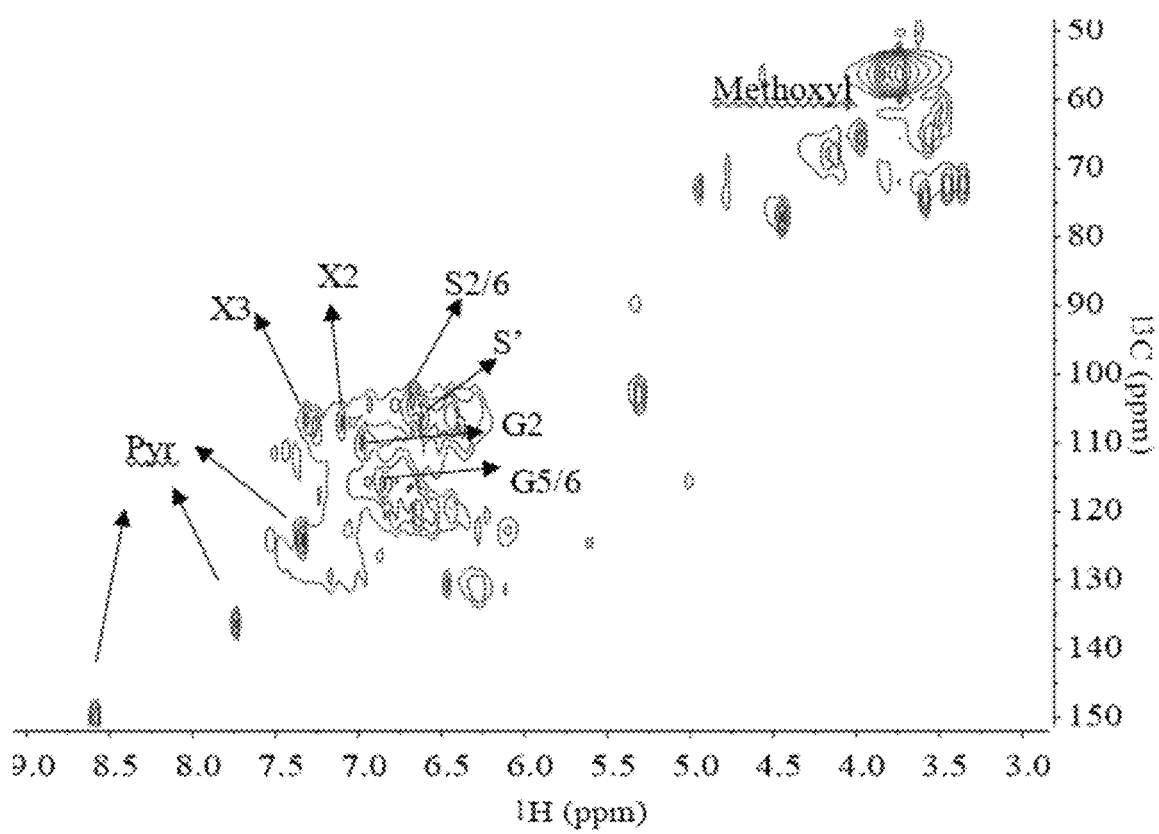
FIG. 11 is a $^1H$-$^{13}C$ correlation NMR (2D NMR) spectrum of the acetylated PL with DMSO as solvent.
Figure 11:
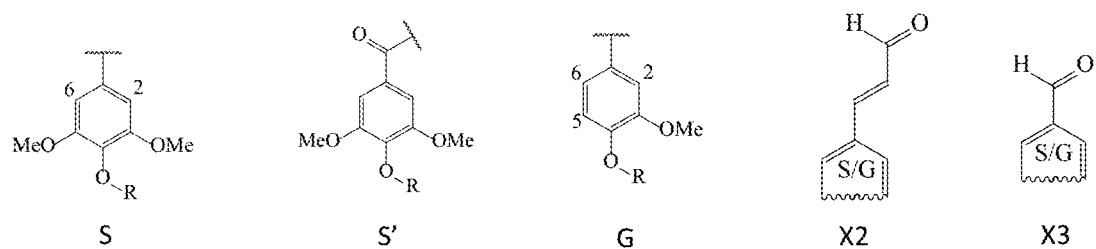

The amount of added C=C bonds for PLMAs were also quantified based on their $^1$H NMR spectra (FIGS. 10B-10D). As shown in Table 5, the C=C concentration was 3.58 mol/mol for PLMA1. Considering that the estimated OH concentration in PL was 3.04 mol/mol, this result implies that hydroxyls were fully methacrylated in PLMA1. However, the higher calculated C=C concentration than 3.04 mol/mol could be attributed to mass loss during the recovery of PLMA1 from the solvents or the discrepancy in calculating OH and C=C contents based on the NMR spectrum. For PLMA2, the C=C concentration was 0.78 mole/mole, despite methacrylating 1 mol/mol of OH is supposed to create the same mole of new C=C in PLMA2. The lower C=C concentration than expected suggests that some of partly methacrylated molecules stayed as DCM insoluble due to the high polarity of remaining hydroxyls. It should be noted that hydroxyl groups are not evenly distributed among individual the phenolic monomers and oligomers in PL. Some could contain more than three hydroxyls per molecule, while others could contain much fewer hydroxyls per molecule. For PLMA3, the C=C concentration was 1.26 mol/mol. PLMA3 could be fully recovered in DCM since its residual hydroxyls were captured with less polar acetyls.

RAFT Polymerization to PLMAPS

The polymer yield, $M_w$ and dispersity of PLMAPs after 4 h of polymerization are given in Table 6. During the reaction, PLMAP1 started to gel only after 30 min and its yield reached 89% after 4 h. Gelation is a result of extensive intermolecular crosslinking. During the polymerization, the chain propagation and branching occur simultaneously (Gao et al., "Determination of Gel Point During Atom Transfer Radical Copolymerization with CrossLinker," *Macromolecules* 40(22):7763-7770 (2007), which is hereby incorporated by reference in its entirety). Since excess functionalization led to the formation of multiple radically polymerizable C=C sites on the molecules of PLMA1, the rapid branching could surpass chain propagation and eventually form extensively crosslinked polymer that is insoluble.

TABLE 6

Yields of PLMAPs and GPC results

| | PLMAP1 | PLMAP2 | PLMAP3 |
|---|---|---|---|
| Yield (%) | 89.3 | 18.5 | 42.5 |
| $M_w$ (g/mol) | ∞ | 11282 | 15984 |
| $M_n$ (g/mol) | ∞ | 7276 | 10420 |
| Dispersity | — | 1.55 | 1.53 |

Figure 13:
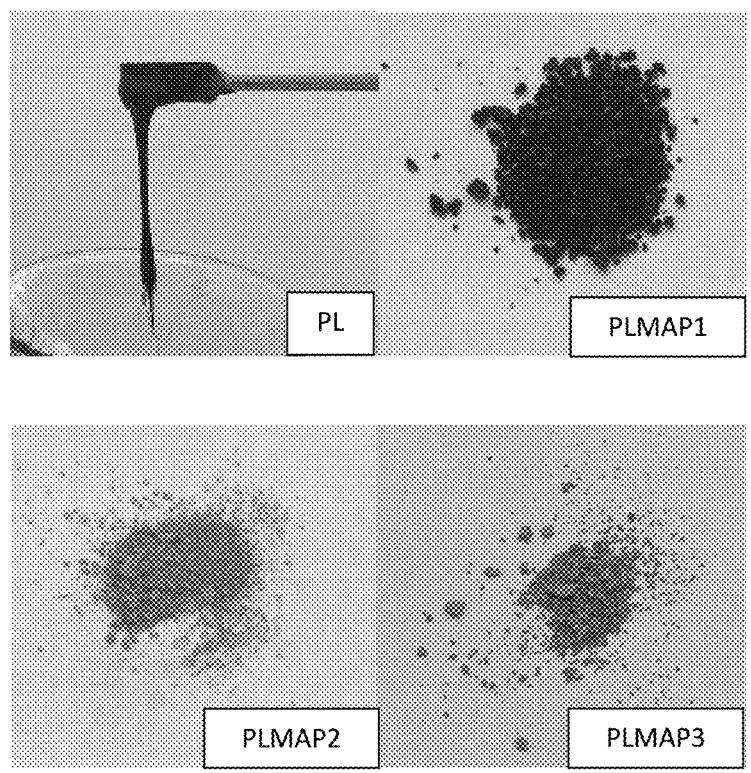
FIG. 13 shows the visual appearances of PL and the PLMAPs.

Gelation was not observed in either PLMAP2 or PLMAP3 during their respective synthesis processes, due to the reduced C=C sites in PLMA2 or PLMA3 that reduce the possibility for developing crosslinking. After 4 hrs, the $M_w$ of PLMAP2 reached 11282 g/mol and its dispersity remained low at 1.55 (the corresponding GPC chromatogram can be found in FIG. 5). The polymer yield of PLMAP2 was only 18.51%. Since hydroxyl groups were not fully functionalized, the residual hydroxyls could act as radical inhibitors to hinder the chain initiation and effective chain propagation. Also, recall that the concentration of C=C was only 0.78 mol/mol in PLMA2 (i.e., the DCM soluble fraction). Since there was an average less than one radically polymerizable site on each molecule, some individual molecules with no C=C could not participate in the radical polymerization process. On the other hand, the yield of PLMAP3 increased to 42.5%. The $M_w$ of PLMAP3 also increased to 15984 g/mol whereas corresponding dispersity further decreased to 1.53 (the GPC chromatogram is also included in FIG. 5). Since hydroxyl groups were either methacrylated or acetylated in PLMA3, the radical inhibitor effect was reduced. Higher C=C content in PLMA3 also promoted better chain initiation and propagation. Both PLMAP2 and PLMAP3 had dispersity well below 2, which is contributed by RAFT technique applied in this study. As shown in FIG. 13, PLMAP1 appeared to be dark brown color like it was seen with PL. In comparison, both PLMAP2 and PLMAP3 had much lighter color.

Figure 14A:
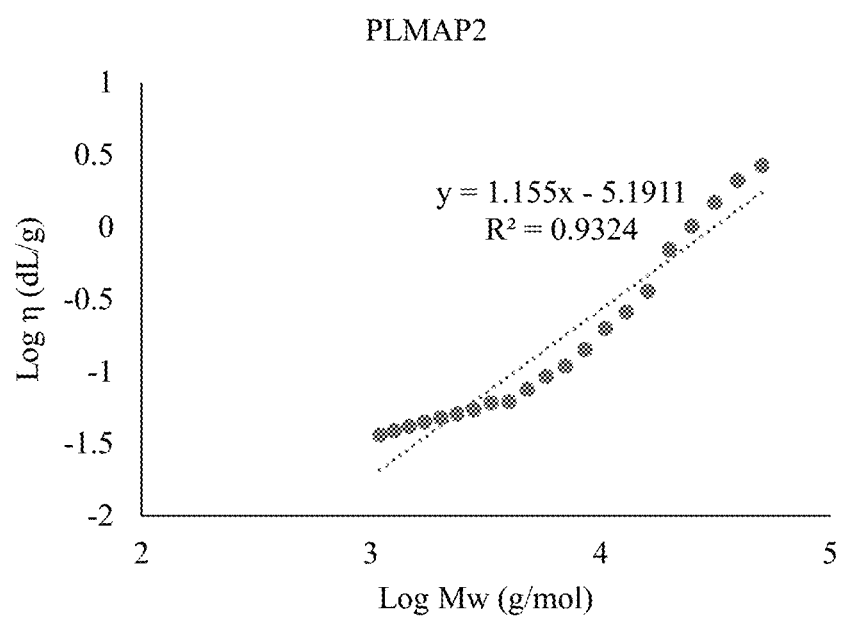
FIGS. 14A-14B are the Mark-Houwink plots of PLMAP2 and PLMAP3, respectively.
Figure 14B:
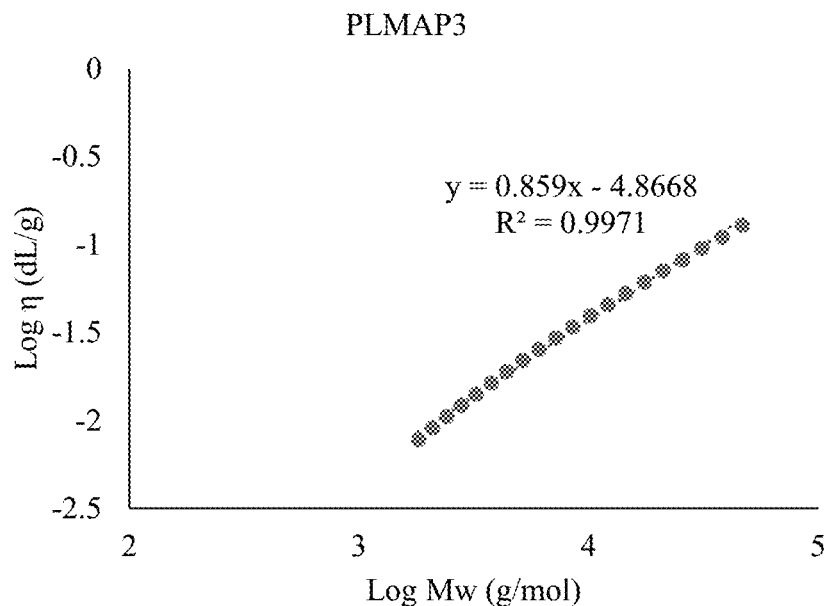

Owing to complex composition of PL, PLMAP2 and PLMAP3 have lightly branched methacrylate backbones and various pendant aromatic structures. The viscometry and GPC data of PLMAP2 and PLMAP3 were combined to generate Mark-Houwink plots (FIGS. 14A and 14B, respectively). The Mark-Houwink equation, $[\eta]=KM^\alpha$, is a classical result of polymer physics that relates the intrinsic viscosity of a polymer solution to its molecular weight through the hydrodynamic volume. The α value is characteristic of the conformational state of the polymers. M is the molecular weight of the polymer and η is the intrinsic viscosity of the polymer (Masuelli, M. A., "Mark-Houwink Parameters for Aqueous-Soluble Polymers and Biopolymers at Various Temperatures," (2014), which is hereby incorporated by reference in its entirety). The scaling exponent α generally ranges between 0.5 and 1.0 (but can reach as high as 2), and increases with solvent quality and polymer backbone stiffness; it is constant with respect to molecular weight for linear polymers and a decreasing function thereof for branched polymers. Plotting log[η] versus log M, generally produces a straight line with a slope of α. The value of α can be used to determine the conformational character of the polymer in solution. Id. A value of α ranging from 0.0-0.5 reflect a rigid sphere; those from 0.5-0.8 a random coil; and from 0.8-2.0 a rigid or rod like configuration (stiff chain). Id. For reference, a typical value for a linear poly (methyl methacrylate) (PMMA) standard would show values of α near 0.69 in THF at room temperature, typical of a linear flexible polymer in a good solvent.

Figure 15A:
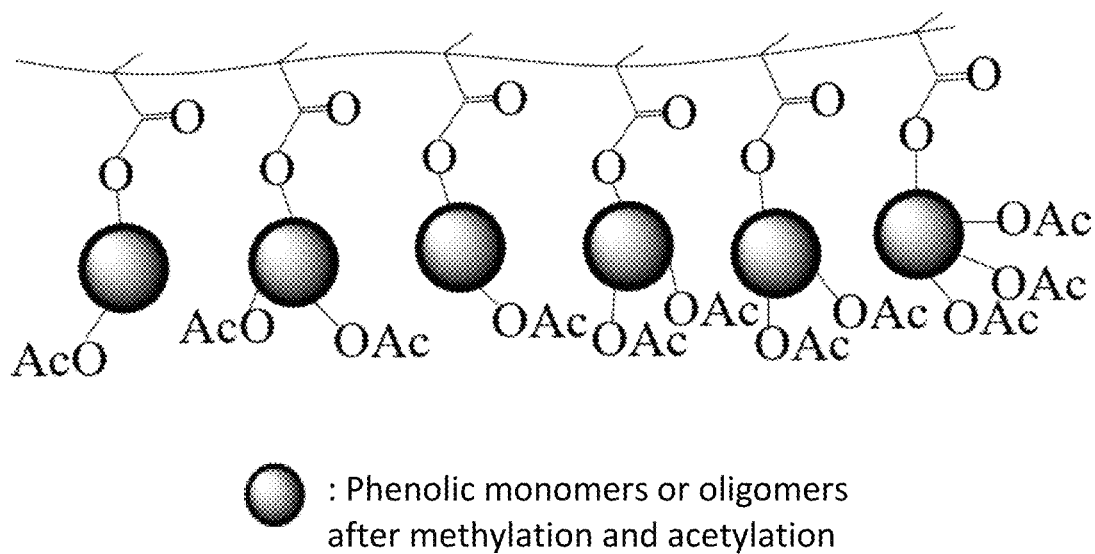
FIGS. 15A-15B are illustrative examples of the molecular structure of PLMAP3.
Figure 15B:
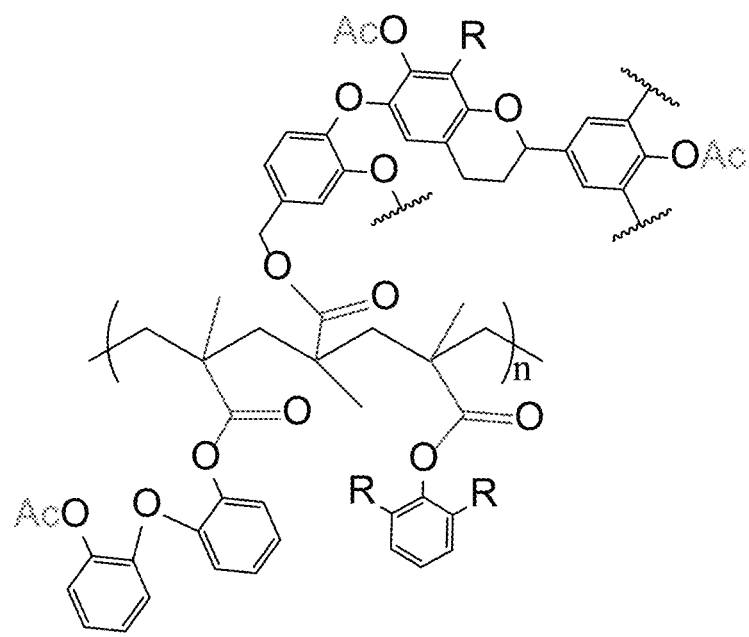

For most of the technical lignins, α is low at 0.14-0.25 pointing toward their spherical structures (Steudle et al., "Carbon Fibers Prepared from Melt Spun Peracylated Softwood Lignin: An Integrated Approach," *Macromol. Mater. Eng.* 302:1600441 (2017), which is hereby incorporated by reference in its entirety). In this study, α is 1.16 for PLMAP2 and 0.86 for PLMAP3, indicating both polymers have developed relatively linear and stretched structures as proposed. PLMAP2 is a more rigid polymer than PLMAP3, possibly because residual hydroxyls on pendants increase inter- or intra-molecular interactions through hydrogen bonding. The possible chain structure of PLMAP3 is illustrated in FIG. 15A to show the presence of molecular linearity, as well as to demonstrate how partial methacrylation combined with acetylation inhibits the formation of crosslinked network. In FIG. 15B, the methacrylate backbone with examples of some possible pendant structures were also given.

Thermal Properties of PPL

The DSC curves of PLMAPs are given in FIG. 6. No fluctuation was observed in the DSC curve of PLMAP1, indicating the absence of glass transition temperature below 200° C. Since PLMAP1 is highly crosslinked, the movement of molecular chains was severely restricted. The DSC curves of both PLMAP2 and PLMAP3 were similar to those observed with lignin or other lignin-based materials (Passoni et al., "Fractionation of Industrial Softwood Kraft Lignin: Solvent Selection as a Tool for Tailored Material Properties," *ACS Sustainable Chem. Eng.* 4(4):2232-2242 (2016); Sun et al., "A Study of Poplar Organosolv Lignin After Melt Rheology Treatment as Carbon Fiber Precursors," *Green Chem.* 18:5015-5024 (2016), which are hereby incorporated by reference in their entirety). Instead of sharp peaks commonly observed with well-defined polymer materials, only small dips representing transition from glassy state to rubbery state were observed. While PLMAP2 and PLMAP3 have linear orientation, their pendant structures are not uniform. The $T_g$ of PLMAL2 was 161° C., higher than that of many other biobased polymers (Holmberg et al., "Syringyl Methacrylate, a Hardwood Lignin-Based Monomer for High-Tg Polymeric Materials," *ACS Macro Lett.* 5(5):574-578 (2016), which is hereby incorporated by reference in its entirety). The formation of hydrogen bonding among the chains associated with residual hydroxyls could increase the $T_g$ of the polymer. The $T_g$ of PMAPL3 was 130° C. The substitution of residual hydroxyls by acetyls lowered the molecular interactions, and thus lowered the $T_g$ (Zhang, M. "Carbon Fibers Derived from Dry-Spinning of Modified Lignin Precursors" PhD Dissertation, Clemson University (2016), which is hereby incorporated by reference in its entirety). The $T_g$s of the methacrylate polymers can also be affected by the pendant structures. Previously, Holmberg et al. showed that the $T_g$s of the methacrylate polymers depended on the type of side chain functional groups on phenolic monomers, increasing in the order of ethyl guaiacol<guaiacol<cresol<vanillin<syringol (Holmberg et al., "Softwood Lignin-Based Methacrylate Polymers with Tunable Thermal and Viscoelastic Properties," *Macromolecules* 49(4):1286-1295 (2016); Holmberg et al., "Syringyl Methacrylate, a Hardwood Lignin-Based Monomer for High-Tg Polymeric Materials," *ACS Macro Lett.* 5(5):574-578 (2016), which are hereby incorporated by reference in their entirety). Also, the alkyl group lowered $T_g$ whereas aldehyde group increased $T_g$. In their study, syringol-based polymers had the highest $T_g$ possibly because symmetric methoxyl groups could restrict molecular rotation. As previously described, PL is much more complex and consists of a number of phenolic molecules that vary in molecular size and functionality. Therefore, the $T_g$ of the PL-based methacrylate polymer is a gross effect of multiple functionalities and likely to depend on the PL composition. The content of S-type phenolics in the PL may have contributed to the increased the $T_g$. In addition to PL composition, the $T_g$ can also be affected by polymer synthesis conditions (temperature, initiator ratio, reaction time, etc.) and molecular weights of the polymer.

Figure 7A:
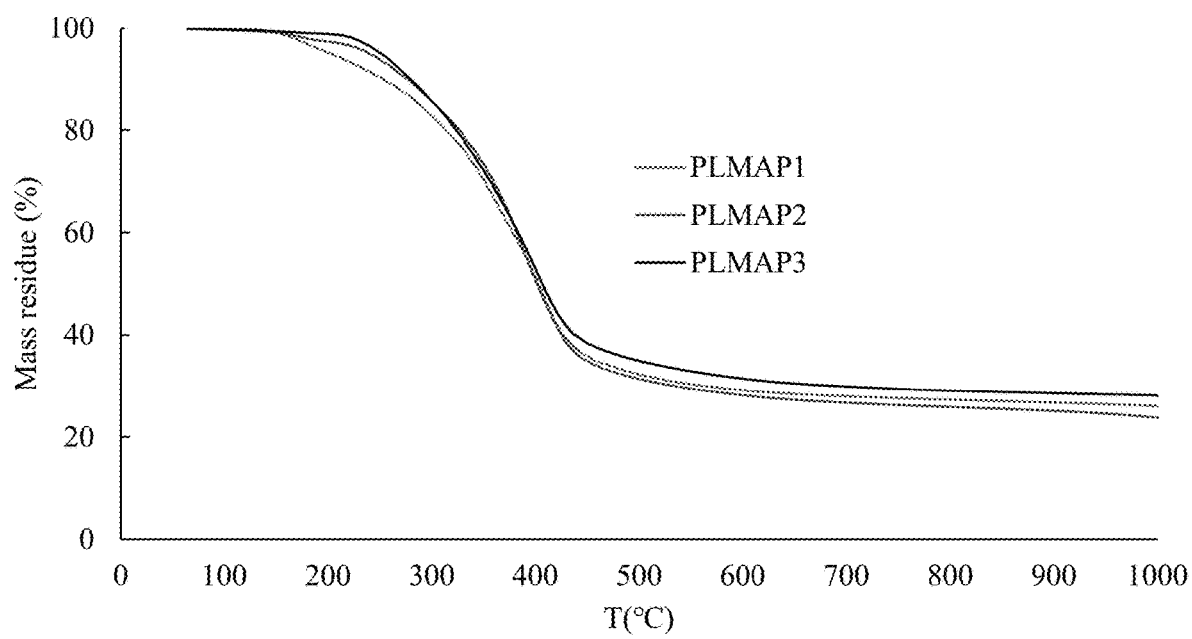
FIGS. 7A-7B are the thermogravimetric analysis (TGA) curves of the PLMAPs.
Figure 7B:
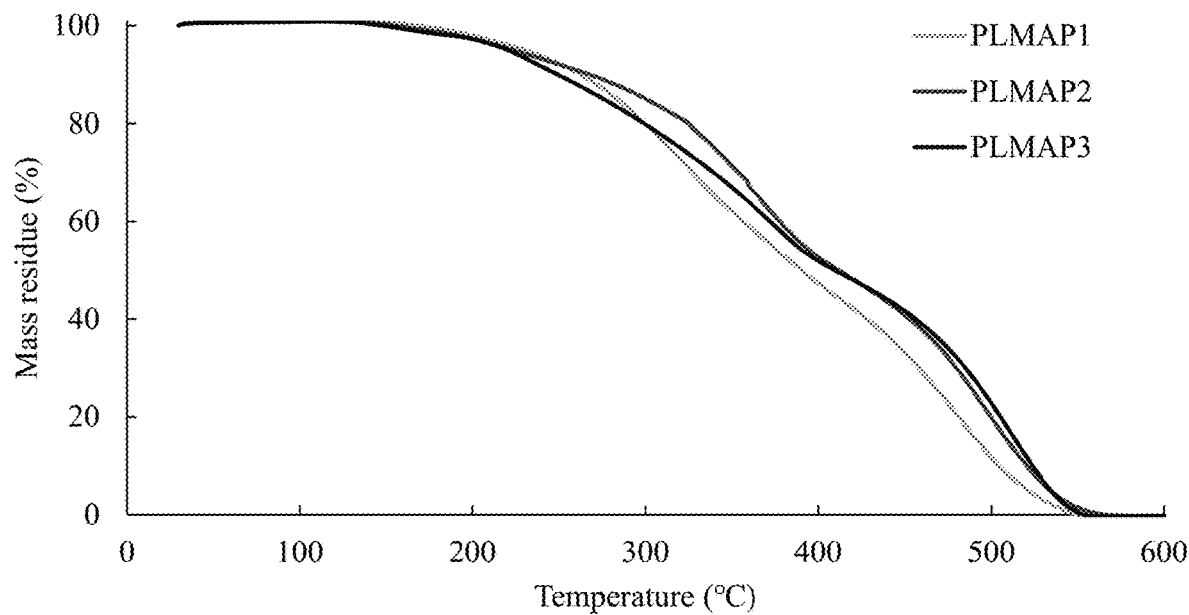

The results from thermogravimetric analysis (TGA) during pyrolysis with nitrogen gas are plotted in FIG. 7A. The TGA results under air can be found in FIG. 7B. PLMAP3 showed best thermal stability among all. Its $T_d$ was 250° C., much higher than its $T_g$. Thus, there is a sufficiently wide temperature range at where the polymer can be melt-processed without causing polymer degradation. The $T_d$ of PLMAP2 was slightly lower (241° C.) because of the absence of thermally stable acetyl groups. The $T_d$ of PLMAP1 was 203° C., which was the lowest. While the methyl groups in methyacrylate polymers could easily be cleaved at low temperatures, PLMAP1 contains more methyl groups than PLMAP2 or PLMAP3 because of its highest extent of methyacrylation.

The TGA results also showed that PLMAPs have extremely high temperature tolerance during pyrolysis. For all the polymers, the major mass losses occurred between their respective $T_g$s and the temperatures up to ~450° C. However, mass losses at temperatures above 450° C. were insignificant, retaining some of their masses even at 1000° C. Among the three polymers, highest residual mass of 28% was found with PLMAP3. In previous studies, methacrylate polymers synthesized using model phenolic monomers completely or nearly completely volatilized at temperature around 500° C. (Holmberg et al., "Softwood Lignin-Based Methacrylate Polymers with Tunable Thermal and Viscoelastic Properties," *Macromolecules* 49(4):1286-1295 (2016), which is hereby incorporated by reference in its entirety). Compared to such polymers derived from one or a few simple phenolic monomers with single polymerizable sites, the PLMAPs have much bulkier and complex pendants structures. When the PLMAPs degrade at elevated temperatures, the bulkier pendants are less likely to volatilize than smaller pendants made of small-sized monomers. Moreover, the pendants could interact with nearby pendants through their reactive functional groups to form thermally stable polyaromatic structures when the polymers degrade. As a result, heat tolerance was significantly improved at PLMAPs.

Melt Rheology of PLMAPS

Isochronal temperature sweeps of PLMAPs were conducted and the results are shown in FIG. 8. The storage modulus (G') measures the material's ability to store energy and represents elastic property of a material. The loss modulus (G") measures energy dispersed as heat and it represents the viscous property of a material. The G' of PLMAP1 was constantly higher than G", indicating this polymer is cross-linked and behaves as an elastic solid. It can also be found that there is not a significant decrease in the G' value along with increasing temperature even after the polymer started to degrade. On the other hand, the G" of PLMAP2 was higher than its G' at temperature below 228° C., indicating its viscous behavior at the given temperature range. The G' and G" crossed at higher temperatures where the polymer turned into an elastic material. As previously shown in the TGA results (FIG. 7A), the polymer degradation occurred at similar temperatures where the G' and G" crossed. Thus, this transition of viscous material to elastic material is related to the polymer degradation as a result of cross-linking. For PLMAP3, G' was lower than G" before they crossed at 230° C., demonstrating its viscous behavior at the corresponding temperature region. For all the polymers, the complex viscosity ($\eta^*$) decreased with increasing temperature before it reversed the trend to increase at higher temperatures. The $\eta^*$ was lowest with PLMAP3, since incorporating inert acetyls in PLMAP3 reduced molecular interactions and improved their chain mobility. The $\eta^*$ increase at higher temperatures is an indicative of the development of crosslinking within the polymers. The crosslinking temperatures $T_c$s, at where $\eta^*$ reverses its trend, were 230° C., 205° C. and 227° C. for PLMAP1, PLMAP2 and PLMAP3, respectively. The $T_c$ was lowest with PLMAP2 among the three polymers. Considering phenolic hydroxyls are highly reactive toward polycondensation reactions (Zhang, M., "Carbon Fibers Derived from Dry-Spinning of Modified Lignin Precursors," Ph.D. Dissertation, Clemson University (2016), which is hereby incorporated by reference in its entirety), the residual hydroxyls present in PLMAP2 could serve as the active sites to promote the crosslinking when the polymer degrades. Nevertheless, $T_c$s of PLMAP2 and PLMAP3 were both sufficiently higher than their respective $T_g$s. Prior to the crosslinking and degradation occur, PLMAP2 and PLMAP3 behave as thermoplastic polymers.

The rheology results confirm that PLMAP2 and PLMAP3 are both melt-processable. In comparison to PLMAP2, PLMAP3 exhibited much lower viscosity. At temperature range of 197~232° C., $\eta^*$ of PLMAP3 was between 100 and 1000 Pa·s. It was suggested that a polymer within this viscosity range is suitable for spinning continuous filament (Baker et al., "On the Characterization and Spinning of an Organic-Purified Lignin Toward the Manufacture of Low-Cost Carbon Fiber," Polym. Polym. Compos. 21:449-456 (2010), which is hereby incorporated by reference in its entirety). In the present study, melt-rheology of PLMAP3 was further investigated at a temperature of 210° C. According to the results of TGA and rheological analyses, neither the crosslinking reactions nor polymer degradation occur at this temperature. The result of frequency sweep is given in FIG. 9A. The G" was constantly higher than G', showing PLMAP3 remains as a viscous material at the entire frequency range. PLMAP3 also showed typical shear-thinning behavior of a lignin-based polymer (Steudle et al., "Carbon Fibers Prepared from Melt Spun Peracylated Softwood Lignin: An Integrated Approach," Macromol. Mater. Eng. 302:1600441 (2017), which is hereby incorporated by reference in its entirety). Its near zero shear $\eta^*$ was 3911 Pa·s and decreased at higher frequencies since the interaction between molecules due to chain entanglement was reduced as the frequency increases (Ouyang et al., "Fabrication of Partially Biobased Carbon Fibers from Novel Lignosulfonate-acrylonitrile Copolymers," J. Mater. Sci. 52(12): 7439-7451 (2017), which is hereby incorporated by reference in its entirety). The isothermal rheology of PLMAP3 is shown in FIG. 9B. The $\eta^*$ increase as increasing retention time was not significant after 10 mins (376 Pa·s to 878 Pa·s). The slight increase in viscosity at the extended time at the elevated temperature could be related to the reactivity of the pendant structures made of PL molecules. It is well-known that the polycondensation of PL molecules (also called bio-oil aging) can be accelerated at elevated temperatures (Kim et al., "Quantitative Investigation of Free Radicals in Bio-Oil and Their Potential Role in Condensed-Phase Polymerization," ChemSusChem 8(5):894-900 (2015), which is hereby incorporated by reference in its entirety).

Possibility of PLMAP3 as Precursor of Carbon Fiber

As demonstrated above, methacrylate polymers could be synthesized directly from crude lignin bio-oil by skipping costly extraction and purification for monomers. The derived polymers could join other biobased polymers in various applications. The polymers produced in this study had good thermal stability and high $T_g$s, thus could potentially be used in high temperature applications, such as machine parts, asphalt components, composites, and insulators (Olsson et al., "Carbon Fibres from Precursors Produced by Dry-Jet Wet-Spinning of Kraft Lignin Blended with Kraft Pulps," Holzforschung 71(4):275-283 (2017), which is hereby incorporated by reference in its entirety). Furthermore, it was found that PLMAP3 possess several attractive properties that are highly desirable toward carbon fiber production. Therefore, the applicability of PLMAP3 as a precursor of lignin-based carbon fiber is further discussed in below section.

Lignin-based carbon fiber is usually fabricated using three steps: first the precursor is spun into fiber, followed by oxidative stabilization to increase fiber rigidity, and then finally carbonized at high temperatures (1000° C. or above) to remove non-carbon atoms. Therefore, among others, two basic requirements of a carbon fiber precursor are its spinnability and the ability to carbonize. In most of previous studies, lignin was either directly melt processed or co-extruded with other polymers (Baker and Rials, "Recent Advances in Low-Cost Carbon Fiber Manufacture from Lignin," J. Appl Polym. Sci. 130(2):713-728 (2013), which is hereby incorporated by reference in its entirety). However, the mechanical properties of lignin-based carbon fibers so far is much inferior compared to polyacrylonitrile based carbon fiber. The limitations of lignin as the precursor material have been discussed in several articles (Baker and Rials, "Recent Advances in Low-Cost Carbon Fiber Manufacture from Lignin," J. Appl Polym. Sci. 130(2):713-728 (2013); Frank et al., "Carbon Fibers: Precursor Systems, Processing, Structure, and Properties," Angew. Chem., Int. Ed. 53(21):5262-5298 (2014), which are hereby incorporated by reference in their entirety). Baker et al. indicated that the lignin-based precursor should have higher molecular weights, narrower molecular weight distribution and low impurities. The $T_g$ of the precursor cannot be too high or too low in order to ensure both continuous spinning of uniform filament and stabilization at reasonable speed. More recently, Frank et al. compared carbon fibers derived from different precursor materials and concluded that it is critical for the precursor to have molecular orientation in order to produce high-quality carbon fiber (Frank et al., "Carbon Fibers: Precursor Systems, Processing, Structure, and Properties," Angew. Chem., Int. Ed. 53(21):5262-5298 (2014), which is hereby incorporated by reference in its entirety). The authors further pointed out that the molecular orientation of the precursor must be achieved before the fiber is stabilized or carbonized because high temperature processing cannot improve the molecular orientation. However, this critical requirement was impossible to meet with lignin, as lignin intrinsically lacks molecular orientation due to its three-dimensional, amorphous, and randomly cross-linked structure.

Figure 16:
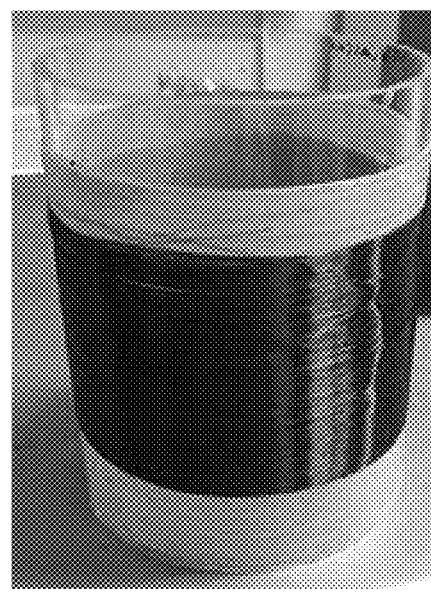
FIG. 16 is an image of an as-spun fiber of PLMAP3.

The present application showed that PLMAP3, the PL-based methacrylate polymer, could meet the aforementioned requirements and thus potentially be an ideal precursor of carbon fiber. The molecular weight of PLMAP3 is much higher than most technical lignins (Gordobil et al., "Assessment of Technical Lignins for Uses in Biofuels and Biomaterials: Structure-Related Properties, Proximate Analysis and Chemical Modification," Ind. Crops Prod. 83:155-165 (2016), which is hereby incorporated by reference in its entirety), whereas the dispersity is much lower (<2). Also, the $T_g$ of PLMAP3 lies in a suitable range for melt-spinning. The rheology results shown above suggest that there is a temperature range at where the polymer can be drawn into fibers continuously without being affected by significant crosslinking or degradation. It is important to avoid precursor degradation during the melt-spinning since it could result in carbon fibers with pores, therefore weakening mechanical strengths. Also, severe crosslinking during fiber spinning would increase the precursor viscosity and cause uneven fibers. On the other hand, crosslinking is desired at subsequent stabilization processing of spun-fibers since the precursor that does not crosslink is difficult to stabilize. As previously shown in FIG. 8, the viscosity increase of PLMAP3 was observed at temperatures above $T_c$, indicating certain functionalities in the polymer (mostly on the pendant structures) could become reactive at elevated temperatures to develop crosslinking. Therefore, the precursor fiber should be able to be stabilized and turn into rigid solid by oxidation. Moreover, PLMAP3 can be carbonized at 1000° C., thus further satisfying the requirement as a carbon fiber precursor. Furthermore, PLMAP3 is a lightly branched, linear polymer with the methacrylate backbone. Noteworthy, such superior molecular orientation has not been found in any other lignin-based precursors to date. As described previously, establishing molecular orientation in a precursor is critical to produce high-quality carbon fiber. FIG. 16 shows the as-spun fiber of PLMAP3 obtained from a preliminary study to confirm the continuous spinnability of the polymer. Further process development is underway to convert the as-spun PLMAP3 fiber to high quality carbon fiber. In the present study, PLMAP2 was also a linear thermoplastic polymer with melt-processability. Moreover, it could more easily be stabilized since residual hydroxyl groups intentionally left in the polymer promote crosslinking. However, the presence of hydrogen bonding between hydroxyls also increased both the $T_g$ and viscosity of PLMAP2, making it a less desirable for melt-spinning compared to PLMAP3.

In this application, crude lignin bio-oil (PL or LB) obtained from pyrolysis of red oak was synthesized to methacrylate polymers by employing a RAFT polymerization technique. Polymerization of fully methacrylated PL resulted in gelation due to the extensive crosslinking to form a polymer with undetectable $T_g$. On the other hand, polymerization of partly methacrylated PL inhibited gelation to yield a linear thermoplastic polymer with dispersity of 1.55, $T_g$ of 161° C. and $T_d$ of 241° C. However, the radical inhibitory effect of the residual hydroxyls was found to lower the $M_w$ and polymer yield. In comparison, partial methacryation of PL followed by acetylation eliminated inhibitory effect of hydroxyl to increase the polymer yield. As a result, the $M_w$ of PLMAP3 was around 16 k g/mol while dispersity was as low as 1.53. The $T_d$ of PLMAP3 was improved to 250° C., much higher than its $T_g$ of 130° C. Rheological results showed that the viscosity of PLMAP3 at a temperature range of 196 to 230° C. was between 100~1000 Pa·s, suggesting the polymer could be continuously spun into filament without causing polymer degradation. PLMAP3 also had extremely high heat tolerance, leaving 28% of residual mass when pyrolyzed at 1000° C. More significantly, PLMAP3 was a lightly branched, linear polymer. Therefore, the polymer could provide a desired molecular orientation that is critical for a precursor to produce high-quality carbon fiber. In summary, a strategy to produce methacrylate polymers from unpurified, multifunctional crude lignin bio-oil was developed, and further, the promising potentials of the resulting polymers were shown. In future studies, synthesis of the polymers with tailored properties and the polymer applications will be investigated.

Materials for Examples 10-19

The crude lignin bio-oil (LB) was provided by Biocentury Research Farm at Iowa State University and it was produced by fast pyrolyzing red oak in a fluidized bed reactor. The description of the pyrolysis reactor and bio-oil recovery method can be found in literature (Pollard et al., "Characterization of Bio-Oil Recovered as Stage Fractions with Unique Chemical and Physical Properties," *J. Anal. Appl. Pyrolysis* 93:129-138 (2012), which is hereby incorporated by reference in its entirety). Briefly, red oak was pyrolyzed at 500° C. using nitrogen as the carrier gas at atmospheric pressure. Bio-oil recovered from first condenser was washed with cold water to remove carbohydrate-derived compounds and obtain the LB as a water-insoluble fraction. The chemicals including 2,2'-Azobis(2-methylpropionitrile) (AIBN), acryloyl chloride, triethylamine, dichloride methylene (DCM) and acetyl chloride were purchased from Sigma-Aldrich. As received AIBN was recrystallized in methanol and then stored at −20° C. Chain transfer agent (2-cyanopropan-2-yl methyl carbonotrithioate, CYCART) was synthesized in the lab and stored at −20° C. Deuterated chloroform for NMR tests was purchased from Sigma-Aldrich and used as received Example 10—Pyrolytic Lignin Functionalization with Acrylate Prior to polymer synthesis, LB was subjected to two-step functionalization by combining partial acrylation and acetylation. The typical functionalization process is given as below: about 25 g of LB was dissolved in DCM in a sealed flask with a ratio of 1 g LB to 20 mL DCM. Triethylamine was added to the solvent mixture prior to adding an equal mole of acryloyl chloride. The degree of acrylation was controlled by adding acryloyl chloride equivalents to 0.5, 1 or 1.5 moles per mole of LB based on Mw of the LB. Acrylation was conducted at room-temperature overnight with constant agitating. Acetylation of the partly acrylated LB was conducted by addition of triethylamine and an excess of acetyl chloride (1 mol LB: 6 mols acetyl chloride). The acetylation was carried out overnight at room temperature with a constant stirring rate of 500 RPM. After the acetylation was completed, an excess of water was added to the beaker to remove water-insoluble solids. The liquid fraction was further washed with a sodium bicarbonate solution (8 g sodium bicarbonate: 200 mL water). The liquid product was then vacuum dried at 40° C. overnight to remove any residual DCM. In this study, the acrylated functionalized LBs monomer and oligomer mixture were denoted as LBA-0.5, LBA-1 and LBA-1.5 depending on the degree of acrylation. For example, LBA-0.5 stands for the LB functionalized using 0.5 moles acryloyl chloride per mole of LB followed by acetylation. The yields of the functionalized LBs were calculated based on the initial mass of the LB.

Example 11—Polymerization of Lignin Acrylate

The LBAs obtained from the above process were dissolved in 1,4-Dioxane at the ratio of 1 g of LBA to 3 ml of 1,4-Dioxane at room temperature. AIBN (0.1-5 wt %) and CTA were added to the solution. The molar ratio of LBA to CTA was 35. The polymerization was performed at 90° C.

for 4 hr under an oxygen-free environment with a constant agitation of 500 RPM. After the polymerization, the products were vacuum dried overnight to remove the 1,4-Dioxane and the remaining solids were washed with methanol at least two times before being vacuum dried again. The resulting polymers were denoted as LBAP-A-B. In the acronym, "A" indicates the degree of acrylation of the functionalized monomer, and "B" indicates the concentration of AIBN added during the polymerization. For example, LBAP-1-0.5 stands for a polymer obtained after the LB was functionalized with 1 mole acryloyl chloride per mole LB (followed by acetylation), and then polymerized in the presence of 0.5 wt % of AIBN and CTA. The LBA-1.5 was also polymerized with 5 wt % of AIBN in the absence of CTA.

Characterization Methods

Example 12—Gel Permeation Chromatography (GPC)

Gel permeation chromatography (GPC) analysis was conducted using Dionex Ultimate 3000 series high performance liquid chromatography (HPLC) equipped with a Shodex Refractive Index (RI) and Diode Array Detectors (DAD). A UV detector (254 nm) was used to detect the peaks. A GPC column was calibrated with six monodisperse polystyrene standards ranging from 162 g/mol to 45120 g/mol. Tetrahydrofuran (THF) was used as both the solvent and eluent in the column.

Example 13—Nuclear Magnetic Resonance (NMR) Spectroscopy

A Bruker Biospin Advance 600 MHz was used to conduct $^1$H NMR analysis. The samples were dissolved in CDCl$_3$, and 4-nitrobenzaldehyde was used as the internal standard (IS). To analyze LB, it was first acetylated with an excessive amount of acetyl chloride at room temperature prior to the analysis. The OH content in the LB was calculated based on the peak area between 2-2.3 ppm. For LBAs, their peak areas between 6-7 ppm were subtracted by the corresponding peak area of the LB to determine the C=C bond concentrations.

Example 14—Gas Chromatography/Mass Spectrometry (GC/MS)

An Agilent 7890B gas chromatograph (GC) with Agilent 5977A mass-selective detector (MSD) and flame ionization detector (FID) was used to identify and quantify the monomers. The capillary column used in the GC was ZB-1701 (60 m×250 mm×0.25 mm). The flow rate of the front inlet was 156 ml/min with a split ratio 100:1, and the temperature at the GC inlet was 250° C. During the analysis, the oven temperature ramped from 40° C. to 280° C. with a 6° C./min heating rate and hold for additional 3 min. The compounds were identified by the MS based on NIST library database and quantified by the FID. The standard chemicals with five different concentrations were injected to the GC to create calibration curves.

Example 15—Fourier Transform Infrared (FTIR) Spectroscopy

Fourier Transform Infrared (FTIR) analysis was conducted using a Thermo Scientific Nicolet iS10 (Thermo Fisher Scientific Inc., Waltham, MA) equipped with a Smart iTR accessory. The wave numbers of the FTIR analysis ranged from 750 cm$^{-1}$ to 4000 cm$^{-1}$. Each sample was scanned 32 times at a resolution of 4 cm$^{-1}$ and interval of 1 cm$^{-1}$.

Example 16—Fourier Transform Electron Paramagnetic Resonance (FT-EPR) Spectroscopy A Bruker ELEXYS E580 FT-EPR spectrometer at the X-band (9.5 GHZ) microwave frequency with a magnetic field modulation of 100 kHz at room temperature was applied to conduct Electron Paramagnetic Resonant (EPR) analysis. The sample was dissolved in 1,4-dioxane with a ratio of 100 mg:1 mL. After the sample was fully dissolved, the liquid was transferred to a quartz tube and kept in cool environment. The standard used in the EPR was DPPH (2,2-diphenyl-1-picrylhydrazyl). EPR parameters were given as following: center field of 3340 G, sweep width of 200 G, sweep time of 83.9 s and receiver gain of 30-50 dB and modulation amplitude of 2 G.

Example 17—Thermogravimetric Analysis (TGA)

A TGA-DSC 1 STARe (Mettler Toledo) system was used to conduct thermal stability tests on the polymers under both nitrogen and air environment. The flow rates of the gases were both 100 mL/min. During the tests, about 20 mg of sample was heated from room temperature up to 900° C. with the heating rate of 10° C./min.

Example 18—Differential Scanning Calorimetry (DSC)

A differential scanning calorimeter (DSC, Q2000, TA instruments) was applied to detect the glass transition temperature ($T_g$) of polymers. The sample was first rapidly heated to 120° C., held for 2 min and then cooled down to remove any moisture. The sample was then reheated to 250° C. with a heating rate of 20° C./min and then held for 2 min. Nitrogen with a flow rate of 50 mL/min was used as the purge gas. The midpoint $T_g$ of the precursor was determined using a TA software.

Example 19—Melt-State Rheological Study

A Discovery Hybrid Rheometer (DHR-2, TA Instruments) with 25 mm parallel-plate geometry was used to perform rheology tests. For isochronal temperature scan, the temperature increased from 90° C. to 250° C. at a heating rate of 10° C./min. The angular frequency was fixed at 10 rad/s and the strain was 1.25%. The frequency sweep scan was conducted at 200° C., and strain was fixed at 1.25%. The initial angular frequency was 100 rad/s, and decreased to 0.01 rad/s.

Discussion of Examples 10-19

Characterizations of Pyrolytic Lignin

Figure 17A:
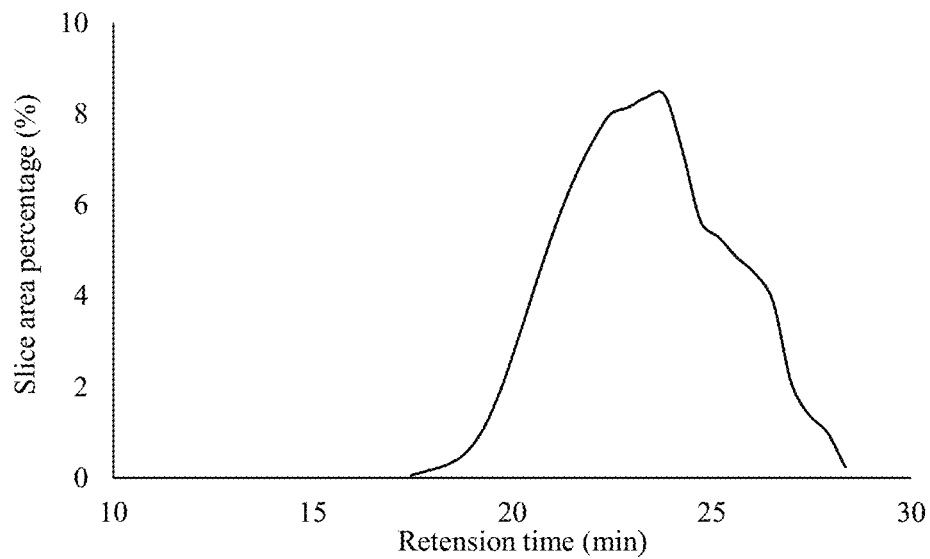
FIGS. 17A-17B show the characterization of lignin bio-oil.
Figure 17B:
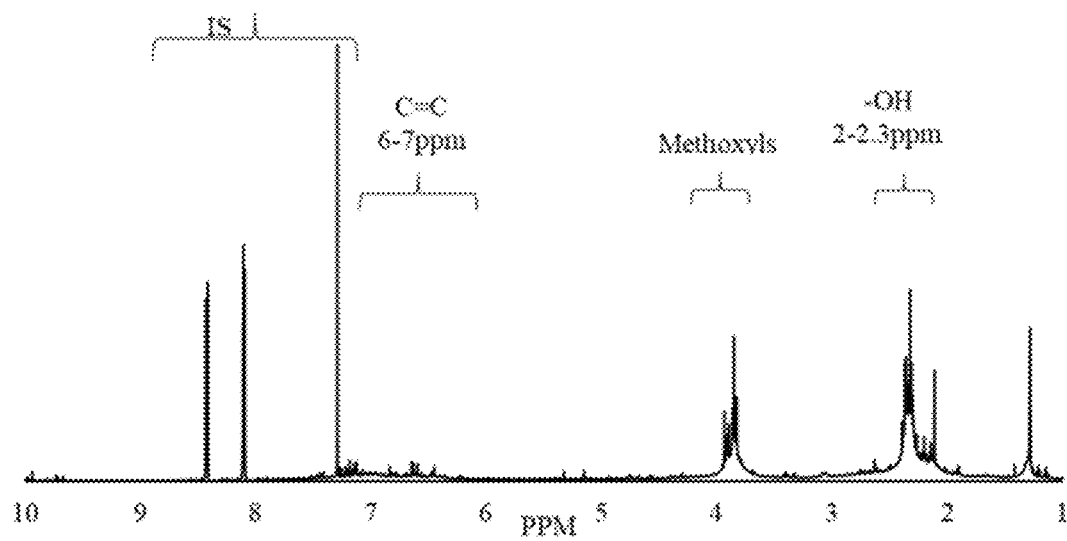

FIG. 17A shows the GPC results of the LB, and a broad molecular distribution was observed, which supports the complex composition of the LB. The weight average molecule weight (Mw) and number average molecule weight (Mn) of LB were 653 g/mol and 388 g/mol, and polydispersity index (PDI) was 1.68. Three basic units constructing lignin are paracoumaryl alcohol (P unit), coniferyl alcohol (G unit) and sinapyl alcohol (S unit) and the molecular weights are 180, 190 and 210 g/mol, respectively. Therefore, the average degree of polymerization (DP) in the molecules in the LB is roughly 3-4. Based on the GPC result and 1H-NMR result of the LB (FIG. 17B), average hydroxyl content is calculated to be 5.6 moles OH per mole of LB.

Functionalization of Lignin Bio-Oil to LBAs

Figure 18:
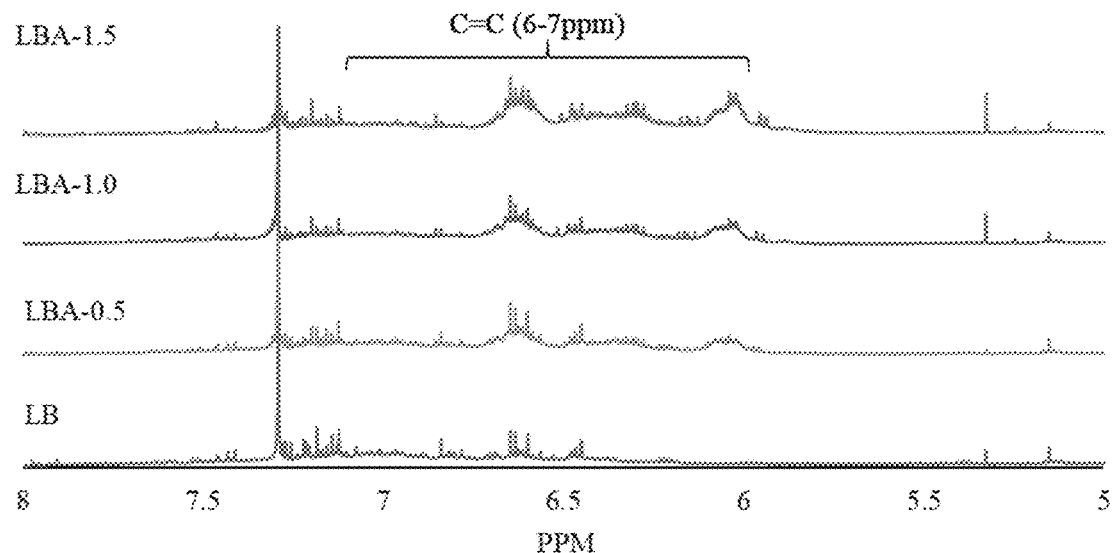
FIG. 18 shows the $^1H$-NMR spectra of lignin bio-oil and the functionalized LBAs for the quantification of vinyl C═C concentration.

Three LBAs with different degrees of acrylation were obtained depending on the amount of acryloyl chloride added. Based on the NMR analysis (FIG. 18), the concentrations of newly generated C=C bonds due to acrylation were 0.586, 0.944 and 1.625 mol/mol LB for LBA-0.5, LBA-1 and LBA-1.5, respectively. Since each mole of acryol chloride added to the LB is supposed to generate one mole of new vinyl C=C, the increased C=C concentrations in the LBAs were close to their theoretical values.

Figure 19A:
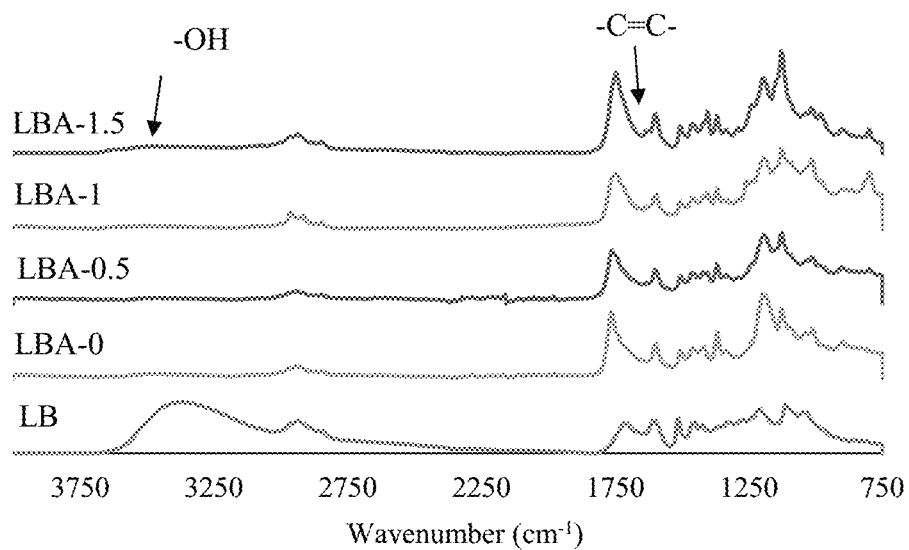
FIGS. 19A-19B show the FTIR spectra of lignin bio-oil, the functionalized LBAs, and the polymerized LBAP.

The FTIR spectra of the LB and LBAs are compared in FIG. 19A. The peak at 1510 cm$^{-1}$ is representative of an aromatic skeleton vibration and it was used as a reference to compare the different FITR spectra. The boarder peak centered at 3500 cm$^{-1}$ from the hydroxyl groups decreased in all LBAs since the hydroxyls were eliminated either by acrylation or acetylation. The new peaks appeared at 1670 cm$^{-1}$ in all LBAs, which correspond to vinyl C=C stretching due to acrylation. As expected, the peak intensity became stronger in the order of LBA-0.5<LBA-1<LBA-1.5. The yields of LBA-0.5, LBA-1 and LBA-1.5 were 67.4%, 70.3% and 76.5%, respectively, as they became higher as the degree of acrylation increases.

Polymerization of LBAs to LBAPs

Figure 19B:
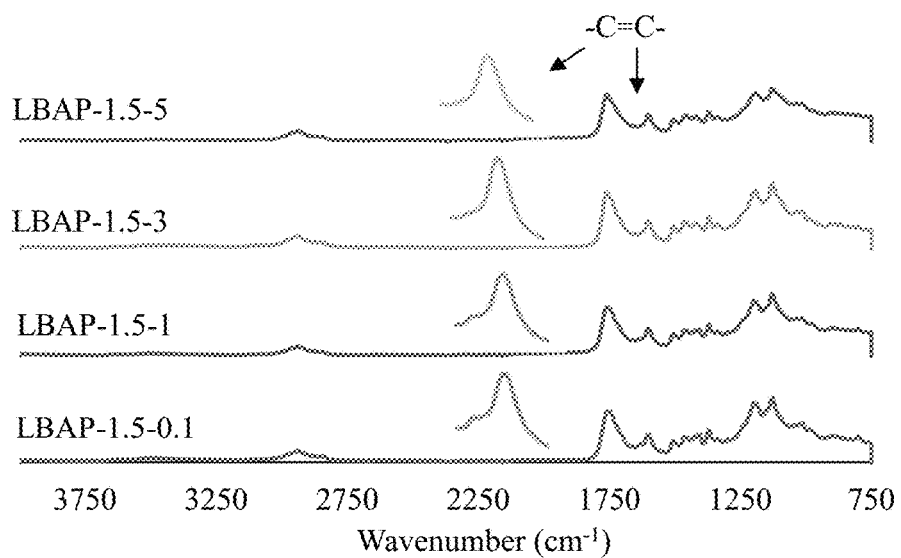

Gelation was not observed when the LBAs were polymerized in the presence of CTA regardless of the AIBN concentration. As given in Table 7, higher AIBN concentrations were beneficial in achieving higher polymer yields. Comparing the three polymers with same degree of acrylation, the yield of LBAP-1.5-0.1 (0.1% AIBN) was only 27.2%, which increased to 46.1% for LBAP-1.5-1 (1% AIBN) and 63.2% for LBAP-1.5-3 (3% AIBN). Further increasing the AIBN concentration to 5% only slightly improved the yield to 68.8% for LBAP-1.5-5. The same trend was also observed for LBAP-1-3 and LBAP-1-5. In the FTIR spectra of the polymers shown in FIG. 19B, the peak at 1670 cm$^{-1}$ indicating vinyl C=C bonds was absent in LBAP-1.5-3 and LBAP-1.5-5, whereas it was still visible in LBAP-1.5-0.1 and LBAP-1.5-1. Clearly, low AIBN concentrations were insufficient to ensure all vinyl C=C bonds in the acrylated LBs were polymerized, which could lower polymer yields. On the other hand, with a fixed AIBN concentration, the LB functionalized with a lower degree of acrylation had a lower polymer yield. The yield of LBAP-0.5-5 was 46%, which is lower than the 65.3% for LBAP-1-5 and 68.8% for LBAP-1.5-5. Since vinyl C=C bonds serve as radically polymerizable sites, increasing the degree of acrylation improves polymer yield. Nevertheless, there were no significant increases in the polymer yield when the degree of acrylation exceeds 1 mole/mole LB.

TABLE 7

The yield and molecular distributions of LBAPs synthesized under different conditions

| | LBAP-1.5-0.1 | LBAP-1.5-1 | LBAP-1.5-3 | LBAP-1.5-5 | LBAP-1-3 | LBAP-1-5 | LBAP-0.5-5 |
|---|---|---|---|---|---|---|---|
| Yield (%) | 27.2 | 46.1 | 63.2 | 68.8 | 60.6 | 65.3 | 46.0 |
| $M_w$ (g/mol) | 4260 | 6840 | 21395 | 22150 | 11710 | 11666 | 4641 |
| $M_n$ (g/mol) | 1461 | 1632 | 4429 | 5277 | 3266 | 3737 | 1328 |
| PDI | 2.91 | 4.19 | 4.83 | 2.37 | 3.59 | 3.12 | 3.49 |

The molecular weights of the LBAPs also presented in Table 7. Overall, the polymers with higher molecular weights were obtained with higher AIBN concentrations. The effect of AIBN concentration on increasing molecular weights of the polymers was significant up to a concentration of 3% AIBN. For instance, the Mw was 4260 g/mol with LBAP-1.5-0.1 and it increased to 6840 g/mol with LBAP-1.5-1 and 21395 g/mol with LBAP-1.5-3. In comparison, the $M_w$ of LBAP-1.5-5 was 22150 g/mol, only a slight increase from that with LBAP-1.5-3. As shown previously, increasing AIBN concentration to above 3% also did not increase the polymer yield noticeably. Higher degrees of acrylation also lead to polymers with higher molecular weights. Among the polymers synthesized using 5% AIBN, the $M_w$ was 4641 g/mol with LBAP-0.5-5, and increased to 11666 g/mol with LBAP-1-5 and 20320 g/mol with LBAP-1-5. Overall, the effects of AIBN concentration and the degree of acrylation on the polymer yield and their molecular weights were similar. The higher AIBN content provides a higher number of radical initiators, while a higher degree of acrylation provides an increased number of radically polymerizable sites.

During RAFT polymerization, the presence of CTA is supposedly to reduce the polydispersity index (PDI) of the resulting polymer by mediating the radical polymerization process to allow the chains to grow homogenously. In this study, the PDIs of LBAPs ranged from 2.37 up to 4.83. These values are higher than the PDIs of methacrylate LB polymers, which were below 1.5 (Qu et al., "Controlled Radical Polymerization of Crude Lignin Bio-Oil Containing Multihydroxyl Molecules for Methacrylate Polymers and the Potential Applications," *ACS Sustain. Chem. Eng.* 7(9): 9050-9060 (2019), which is hereby incorporated by reference in its entirety). To evaluate the effect of the CTA, LBA-1.5 was polymerized with 5% of AIBN in the absence of CTA. As a result, gelation was observed during the polymerization. Therefore, it was confirmed that a CTA is necessary in order to inhibit over-crosslinking reactions and prevent gelation.

It is also worth noting that in the present study, the RAFT polymerization had also been conducted under reaction times longer than 4 hr (up to 24 hr), and with differing reaction temperatures (65° C., 70° C., 80° C. and 100° C.), and higher sample concentration in the solvent (up to 1 g LBA in 1.5 ml 1,4-dioxane) for further optimizations. However, it was found that there were no increases in molecular weights or that lower molecule weights of the polymers were obtained compared to the results discussed supra. When the higher sample to solvent ratio was employed, cross-linking and gelation occurred even in the presence of CTA. Therefore, the polymerization condition used supra (i.e., 90° C., 4 hr, 1 g LBA: 3 ml dioxane) was an optimal condition in the present application in terms of the polymer yields and their Mws. The results also suggested that LB as the feedstock is much different than other RAFT based polymer syntheses using simpler monomer feedstocks (Holmberg et al., "Softwood Lignin-Based Methacrylate Polymers with Tunable Thermal and Viscoelastic Properties," *Macromolecules* 49(4):1286-1295 (2016), which is hereby incorporated by reference in its entirety).

Functionalization of Multi-Hydroxyl Compounds in Lignin Bio-Oil

Figure 20:
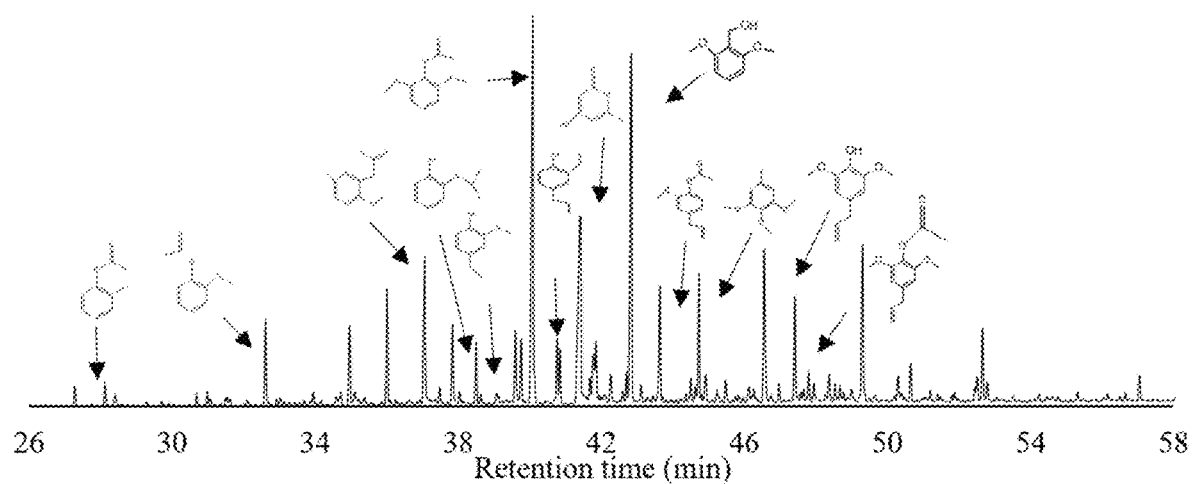
FIG. 20 is the GC-MS chromatogram of the residue methanol solution after LBAP-1.5-5 was precipitated out.

As described previously, the LBs produced from actual lignin conversions are very different from those bio-oil mimics or a few extracted monomers used in previous studies. Crude LBs have compositions and properties that cannot be duplicated by simply mixing a few monomers. While converting OH to vinyl C═C via (meth)acrylation and therefore creating radically polymerizable sites is the basic synthetic approach for the phenolic-based molecules, many molecules in LBs contain multi-OHs (e.g., average 5.16 moles OH/mole LB in this study). Due to their heterogeneity, some of the molecules will have more than the average number of OHs, whereas others will have lower than the average numbers of OHs. If acrylation is homogenous among different molecules, each individual molecule would gain same amount of vinyl C═C. For example, in the case 1 mole of acryolol chloride is added to per mole of LB, theoretically, one OH in each individual molecule should be acrylated. Afterward, the remaining, unarylated OHs in the molecules will be substituted by acetylation in the two-step functionalization process describe above. In this way, each molecule can be radically polymerized to form relatively linear polymer chains. However, such an ideal scenario occurs only if different OHs in different LB molecules have same reactivity toward acrylation. To evaluate the actual acrylation process of the LB, the methanol solution remaining after a polymer (LBAP-1.5-5) was recovered was subjected to GC/MS analysis and the chromatogram is given in FIG. 20. The compounds remaining in the solution are the portion of the two-step functionalized LB (i.e., LBA-1.5) that could not be polymerized into the polymer chain. As shown, most of the monomer compounds detected in the GC/MS had ester groups but no vinyl C═C group, suggesting that the monomers could not be acrylated in the first step, but were acetylated in the subsequent step. Since the vinyl C═C was absent, these acetylated monomers could not be polymerized. It was also observed that some phenolic monomers were neither acrylated nor acetylated. Although their concentration in the LBAs is very low, these compounds could act as radical inhibitors during polymerization due to their phenolic OHs. Despite acrylation among different molecules being non-uniform, the total added C═C bonds in the LB were close to the stoichiometric numbers, as described above. Therefore, the results also imply that some phenolic molecules are more easily acrylated than others to gain higher than the stoichiometric numbers of vinyl C═C bonds, although it is difficult to determine which molecular structures prefer the acrylation in this study. Not only the location of the OH (e.g., either it is a phenolic OH, primary or secondary aliphatic OH), but other neighboring non-OH functionalities in the molecules may also influence the selectivity and rate of acrylation. Nevertheless, the molecules containing higher numbers of OH definitely have higher probability for acrylation than the monomers with single OH.

Thermal Properties of LBAPs

Figure 21:
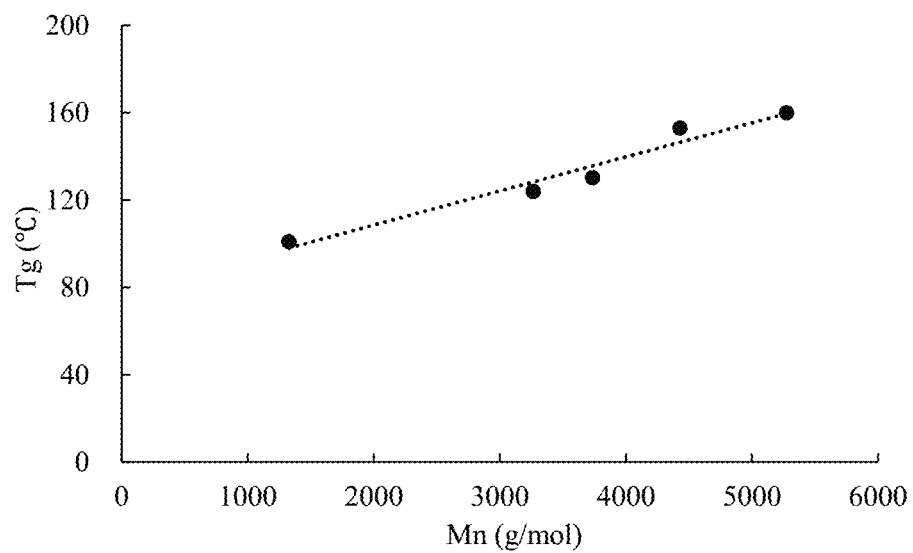
FIG. 21 is a graphical representation of the number average molecular weight (Mn) of the polymerized LBAPs plotted against their Glass transitions ($T_g$).
Figure 22A:
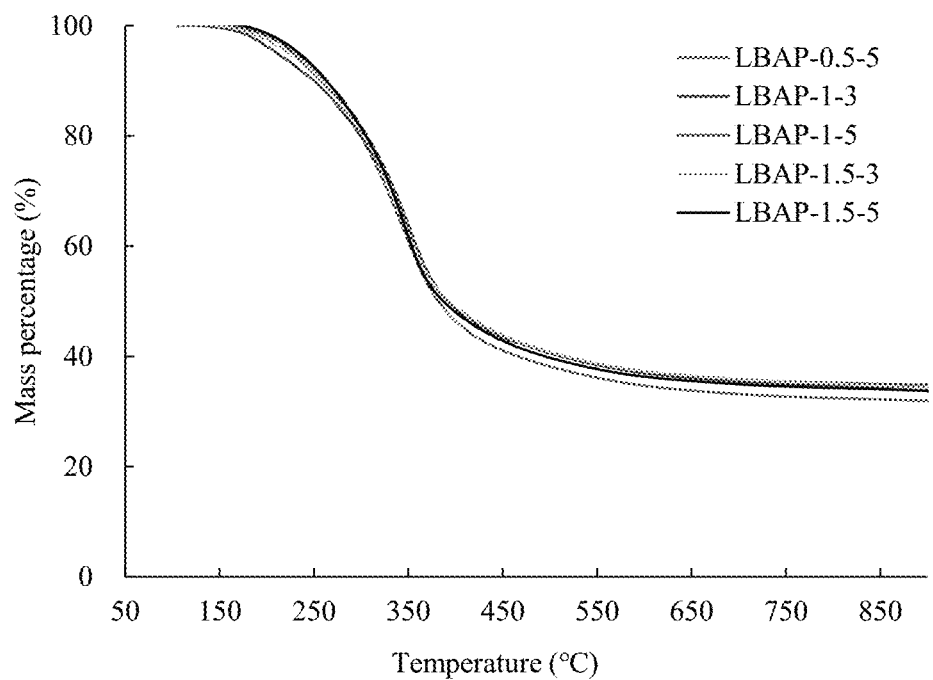
FIGS. 22A-22D show the thermal stability of the polymerized LBAPs.
Figure 22B:
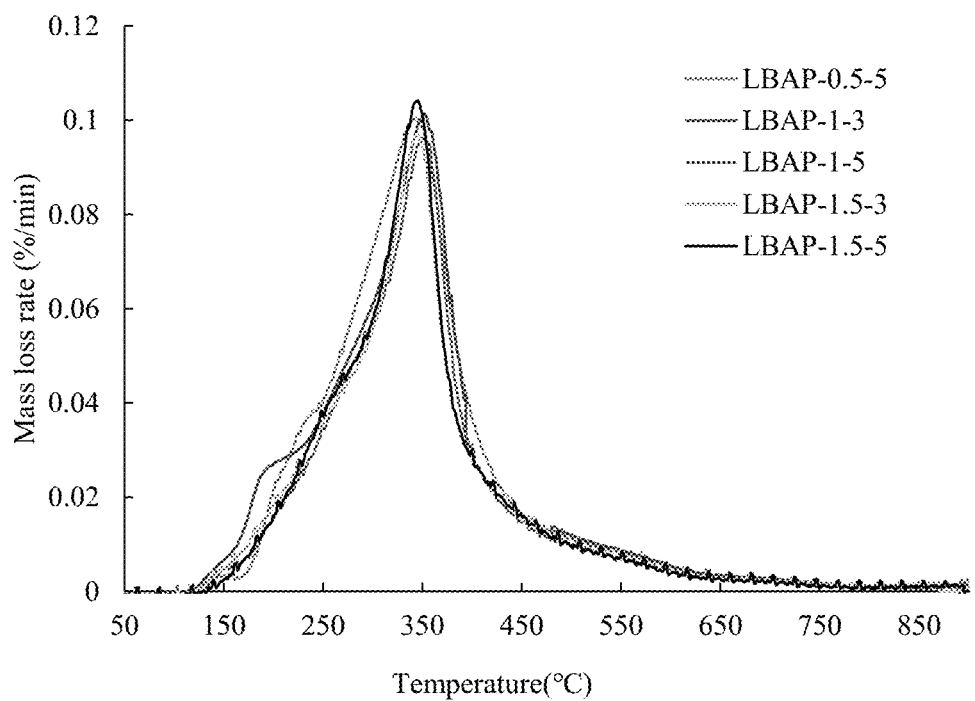
Figure 22C:
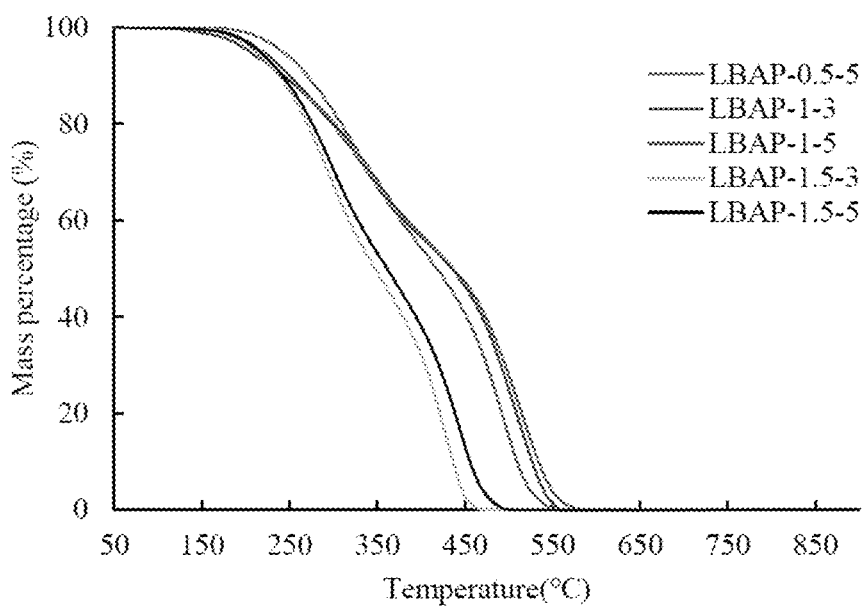
Figure 22D:
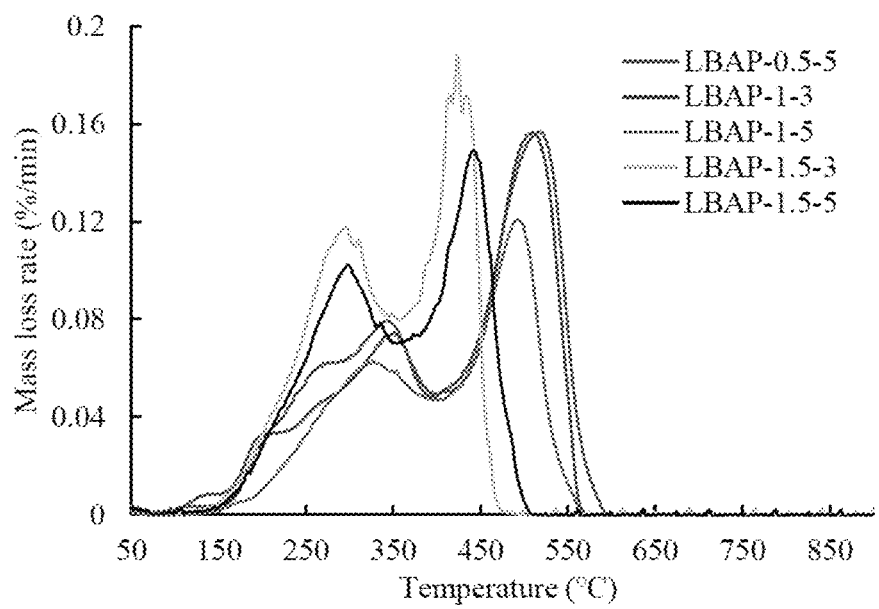

In the present application, five acrylate polymers (LBAP-0.5-5, LBAP-1-3, LBAP-1.5-1, LBAP-1.5-3 and LBAP-1.5-5) were further characterized. LBAP-1.5-0.1 was excluded from the characterization since its yield and Mw were both the lowest. As given in Table 8, glass transition temperatures ($T_g$) were between 93.6 and 160.6° C. for the different polymers. Overall, the polymers with higher degrees of acrylation or higher AIBN concentrations had higher $T_g$s. The $M_n$s of the LBAPs and their $T_g$s could not be related using the Flory-Fox equation, suggesting the LBAPs cannot be described using same polymer system. However, when the $T_g$s of the LBAPs were plotted against their corresponding $M_n$s in FIG. 21, a linear increasing trend was observed.

TABLE 8

Glass transition temperature ($T_g$) of selected LBAP polymers.

| | LBAP-0.5-5 | LBAP-1-3 | LBAP-1-5 | LBAP-1.5-3 | LBAP-1.5-5 |
|---|---|---|---|---|---|
| $T_g$ (° C.) | 93.7 | 124.4 | 130.0 | 153.2 | 160.6 |

Thermal stability of the LBAPs was evaluated using TGA and derivative thermogravimetric (DTG) analysis, the results are given in FIGS. 22A-22D. When the TGA was conducted under $N_2$ environment (FIG. 22A), all five LBAPs showed similar mass loss trends, which was unexpected. The $T_d$ (for 5% mass loss) was ~225° C. and $T_{max}$ (for maximum mass loss rate) was ~350° C. The polymers were relatively stable at temperatures above 450° C. The solid residues remaining after pyrolysis to 900° C. were between 32.5% and 35.9%, with the lowest yield obtained with LBAP-0.5-5 and the highest yield observed with LBAP-1.5-5. It is expected that the LB-derived acrylate polymers have slightly crosslinked pendant structures made of the oligomers attached on acrylate backbones, and they are less likely to decompose than pendants made of monomers. On the other hand, when the TGA was conducted using the air, distinctively different mass loss profiles among the polymers were observed in FIG. 22C. Both LBAP-1.5-3 and LBAP-1.5-5 had much lower thermal stability than the rest polymers that had lower degrees of acrylation. The LBAP-1-3 was most stable at lower temperature regions up to 380° C., and LBAP-0.5-5 had the better thermal stability at higher temperature region above 380° C. Higher degree of acrylation introduces more aliphatic bonds to molecules, causing the polymers to become more susceptible for oxidative degradation.

Rheological Properties of LBAPs

Figure 23A:
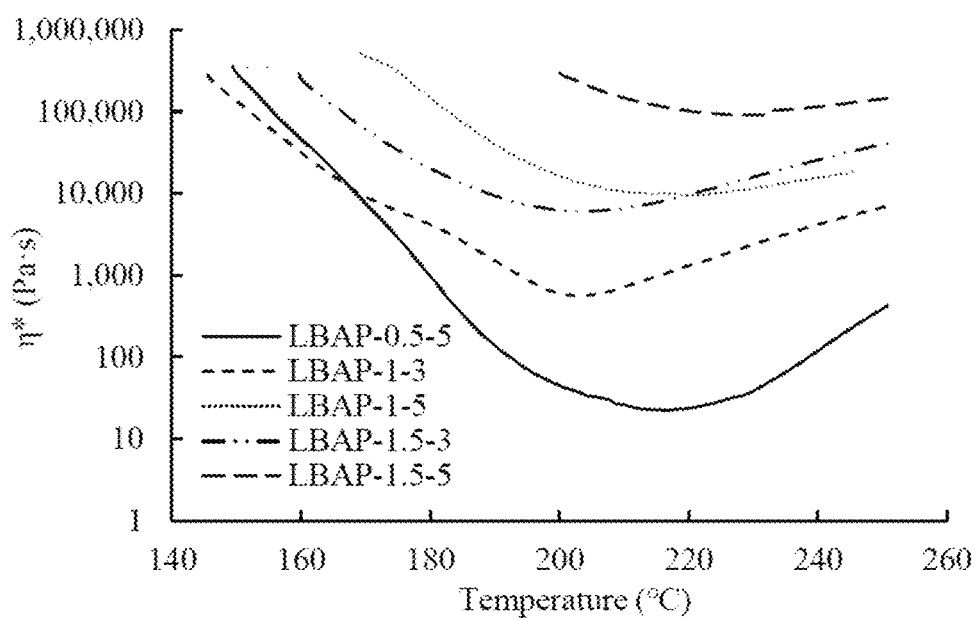
FIGS. 23A-23C show the rheological results of the polymerized LBAPs.
Figure 23B:
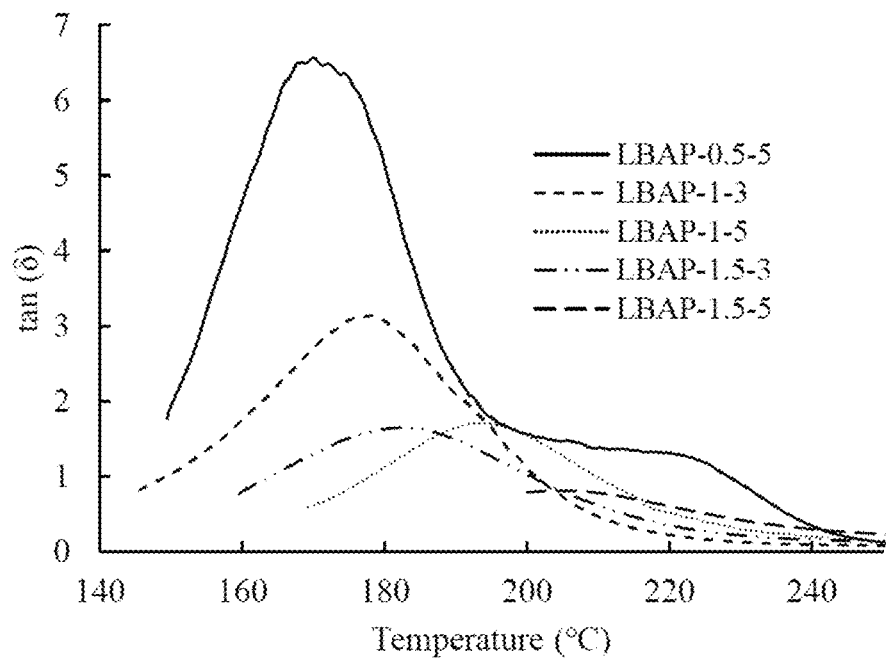
Figure 23C:
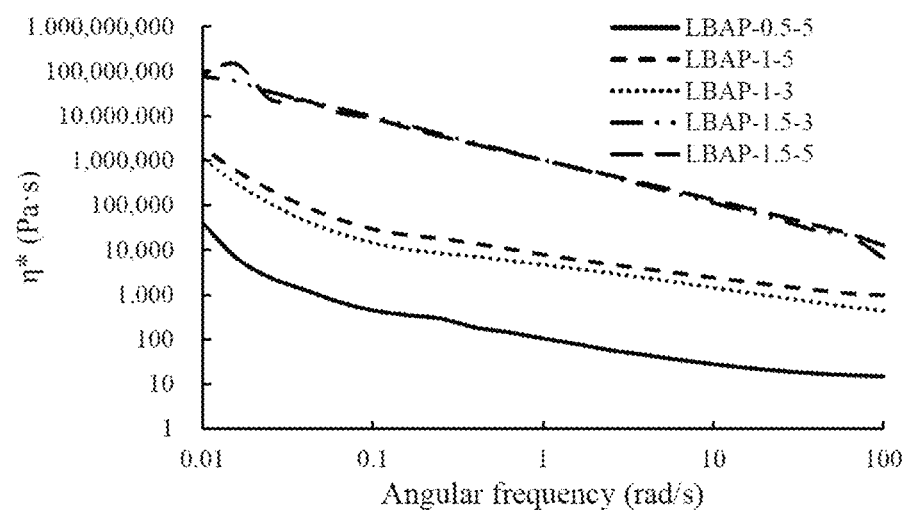

The rheological properties of the LBAPs are given in FIGS. 23A-23C. During the isochronal temperature scan tests, the complex viscosity ($\eta^*$) of the polymers decreased with increasing temperatures before it reversed the trend (FIG. 23A). The increase of $\eta^*$ at higher temperatures is associated with crosslinking during the polymer degradation. Overall, a higher degree of acrylation or higher AIBN concentration led to the formation of more rigid polymers that have both higher viscosity and $T_r$ (i.e., the temperature where $\eta^*$ reversed the trend). Among the polymers, LBAP-0.5-5 had the fastest viscosity drop along with increasing temperature. Its viscosity decreased to 22 Pa·s at 215° C. before the viscosity started to increase at higher temperatures.

The tan ($\delta$) profiles versus increasing temperatures are plotted in FIG. 23B. The tan ($\delta$) of LBAP-1.5-5 was constantly lower than 1, indicating it behaves as an elastic material at the tested temperature range. This result corresponds to its high $\eta^*$ values at FIG. 23A. In comparison, other polymers all had temperature ranges where tan ($\delta$) is higher than 1. As shown, the polymers become viscous materials at wider temperature ranges as the degree of acrylation or the AIBN concentration decreased. The melt-processable temperature range was from 145° C. to 200° C. for LBAP-1-3, and 130° C. to 230° C. for LBAP-0.5-5.

The frequency sweep of the polymers plot is shown in FIG. 23C. For all the polymers, $\eta^*$ decreased with increasing frequency for shear shinning effect. The $\eta^*$ of LBAP-0.5-5 was lowest, and it increased for other polymers with higher acrylation degrees. The $\eta^*$s of LBAP-1-3 and LBAP-1-5, or LBAP-1.5-3 and LBAP-1.5-5 showed similar trends, suggesting the effect of AIBN concentration was not significant.

RAFT polymerization of a red oak-derived crude LB based on partial acrylation and subsequent acetylation was investigated. It has been demonstrated that increasing either acrylation degree or AIBN concentration enhances both the molecular weights and yields of the acrylate polymers. Even with controlled acrylation, a CTA was still required to suppress gelation especially for polymers with a higher degree of acrylation. The effects of intrinsic properties of the LB on the polymer synthesis were also investigated. It was found that some of the LB compounds with single OHs were not acrylated but acetylated, or neither acrylated nor acetylated, which suggest that the compounds with multi-OHs are preferentially acrylated to gain more than stoichiometry numbers of polymerizable sites during the partial acrylation. It was also found that the intrinsic free radicals in the LB could combine AIBN radicals or chain propagation radicals during the radical polymerization to become non-radical species. The $T_g$s of the acrylate polymers obtained in the present study were between 93.7 and 160.6° C. A higher degree of acrylation and a higher AIBN concentration both resulted in a higher $T_g$ of corresponding polymer. While the $M_n$s of the acrylate polymers and their $T_g$s could not be related using the Flory-Fox equation, there was a linear increasing trend between them. The thermal stability of all acrylate polymers was similar during pyrolysis, leaving about 32.5-35.9% of carbon residues at 900° C. However, the polymers with lower degrees of acrylation were much more resistant to oxidative thermal degradation in the air. The polymers with lower degree of acrylation also had lower $\eta^*$s during rheology tests and could be melt-processed at wider temperature ranges.

Further contemplated in this application is the production of high service temperature thermoplastic hard segment amorphous polymers akin to polystyrene (PS) or poly(m-ethyl methacrylate) ("PMMA"). Like these petrochemical analogs, it is anticipated that many applications may be enabled as a stand-alone material: e.g., low cost packaging, "Styrofoam" etc. The main innovations beyond the current state of the art is to transform lignin into long chain molecules that enjoy freedom from aggregation and macrophase separation, toughening from chain entanglements, and the integration of rubbery blocks to enable engineering thermoplastics and thermoplastic elastomer characteristics such as impact modification and elastic behavior.

Amorphous polymers like PS or PMMA are typically brittle and are excluded from high performance applications without further modification. For example, ABS plastic, a quintessential example of an engineering thermoplastic, is a brittle/high modulus styrene/acrylonitrile copolymer that is impact-modified with polybutadiene to add the requisite toughness. Similarly, PS can be compounded with styrenic block or graft copolymers and rubbers like polybutadiene or polyisoprene to yield the HIPS, or high-impact polystyrene. When the rubber content greatly exceeds the hard segment content, the properties shift from toughened structural materials to elastomers. Termed thermoplastic elastomers, at service temperature the rubber chains are physically cross-linked by vitreous hard segment domains, which are ideally mesoscale. Poly(styrene-block-butadiene-block-styrene), or SBS, is a common thermoplastic elastomer that is used in asphalt modification, adhesives, sealants, consumer care products, soft-touch covers for electronics, tubing, cabling covers and many other applications. It is produced via anionic polymerization, which enables the sequential addition of styrene segments followed by butadiene segments, followed by coupling to yield the triblock copolymer architecture.

The polymers of the present application mimic the development of HIPS and SBS materials using RAFT-produced thermoplastic poly(meth)acrylate lignin ("P(M)AL") materials in place of PS. Like anionic polymerization, RAFT polymerization enables the sequential construction of block copolymer architecture. As a model rubbery material, poly (n-butyl acrylate) ("PNBA") will be used due to its ease of polymerization using the RAFT process and low glass transition temperature ($T_g \approx -45°$ C.). Future adaptions could use other rubbers including biomass-derived rubbers either through the RAFT process or chain-coupling reactions as has been demonstrated in the past (International Patent Application No. PCT/US2017/041033 to Hernandez et al., which is hereby incorporated by reference in its entirety). Blends and block copolymers of P(M)AL and PNBA will be produced to encompass a range of formulations spanning impact-modified P(M)AL as an exemplar engineering thermoplastic and P(M)AL/PNBA triblock copolymers as thermoplastic elastomers. Due to the intrinsically heterogeneous nature of these materials, self-assembly processes are expected to form mesoscale domains of P(M)AL and PNBA. The morphology of these materials will be investigated with small angle x-ray scattering (SAXS) and transmission electron microscopy (TEM). Thermal properties, melt rheology, dynamic mechanical analysis, tensile properties and impact strength will provide the information necessary to develop structure-property relationships. Success in this will yield the first chain-molecule thermoplastic elastomers and engineering thermoplastic derived from lignin-based monomers. Knowledge of the properties and potential properties achievable with optimization will form the foundation for future application and market development for P(M)AL-based materials. Advantages over thermoplastic lignin composites include: less dependence of final product performance on the lignin source used, higher overall lignin utilization efficiency, absence of phase separation/aggregation/interfacial adhesion issues, and compatibility with existing polymer production and processing infrastructure.

Although preferred embodiments have been depicted and described in detail herein, it will be apparent to those skilled in the relevant art that various modifications, additions, substitutions, and the like can be made without departing from the spirit of the application and these are therefore considered to be within the scope of the application as defined in the claims which follow.

What is claimed:

1. A method of forming carbon fibers, said method comprising:
   providing a depolymerized lignin product comprising monomers and oligomers;
   producing lignin (meth)acrylate monomers and oligomers from the depolymerized lignin product;
   forming a thermoplastic lignin (meth)acrylate polymer by free radical polymerization of the lignin (meth)acrylate monomers and oligomers;
   producing a carbon fiber precursor by subjecting the thermoplastic lignin (meth)acrylate polymer to a thermal treatment; and
   extruding the thermally treated carbon fiber precursor to form carbon fibers.

2. The method of claim 1, wherein said producing a carbon fiber precursor comprises:
   heating the lignin (meth)acrylate polymer at a temperature of 100 to 230° C.

3. The method of claim 1, wherein said extruding is carried out at a temperature of 100 to 230° C.

4. The method of claim 1 further comprising:
   oxidizing and carbonizing the carbon fibers.

5. The method of claim 1, wherein said providing a depolymerized lignin product comprises:
   processing lignin by a method selected from the group consisting of fast pyrolyzing, solvolysis processing, hydrothermal liquefaction, kraft cooking, soda pulping, hydrolysis, super critical hydrolysis, organosolv processing, and sulfite cooking, to produce the depolymerized lignin product comprising monomers and oligomers.

6. The method of claim 1, wherein said provided depolymerized lignin product is dissolved in a solvent.

7. The method of claim 6, wherein said solvent is selected from the group consisting of methylene chloride, toluene, dioxane, THF, chloroform, cyclohexane, dimethyl sulfoxide, dimethyl formamide, acetone, acetonitrile, n-butanol, n-pentanol, chlorobenzene, diethylether, tert-butanol, 1,2,-dichloroethylene, diisopropylether, ethanol, ethylacetate, ethylmethylketone, heptane, hexane, isopropylalcohol, isoamylalcohol, methanol, pentane, n-propylalcohol, pentachloroethane, 1,1,2,2,-tetrachloroethane, 1,1,1,-trichloroethane, tetrachloroethylene, tetrachloromethane, trichloroethylene, water, xylene, benzene, nitromethane, glycerol, and mixtures thereof.

8. The method of claim 1, wherein said producing lignin (meth)acrylate monomers and oligomers is carried out by reacting the depolymerized lignin product with a compound having a (meth)acryloyl group.

9. The method of claim 8, wherein lignin acrylate monomers and oligomers are produced by reacting the depolymerized lignin product with a compound having an acryloyl group.

10. The method of claim 1 further comprising:
    transforming alcohol groups in the lignin (meth)acrylate monomers and oligomers into acetate groups prior to said forming a lignin (meth)acrylate polymer.

11. The method of claim 10, wherein said transforming is carried out by reacting the lignin (meth)acrylate monomers and oligomers under esterification conditions with an acetyl chloride, acetic acid, or an acetyl ester, prior to said forming a lignin (meth)acrylate polymer.

12. The method of claim 1, wherein the lignin acrylate oligomers have a number average acrylic content of 1.001 to N acrylic units per oligomer, wherein N is the number average content of alcohol, ester, and phenolic groups in the mixture of the depolymerized lignin monomers and oligomers.

13. The method of claim 1, wherein the lignin methacrylate oligomers have a methacrylic content of 1 to N methacrylic units per oligomer, wherein N is the number average content of alcohol, ester, and phenolic groups in the mixture of the depolymerized lignin monomers and oligomers.

14. The method of claim 1, wherein the free radical polymerization is a RAFT process.

15. The method of claim 1, wherein the free radical polymerization is an ATRP process.

* * * * *